US009645871B2

(12) United States Patent
Shimbo et al.

(10) Patent No.: US 9,645,871 B2
(45) Date of Patent: May 9, 2017

(54) SOFT-ERROR-RATE CALCULATING DEVICE

(71) Applicant: Hitachi, Ltd., Chiyoda-ku, Tokyo (JP)

(72) Inventors: Kenichi Shimbo, Tokyo (JP); Tadanobu Toba, Tokyo (JP); Takumi Uezono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 55 days.

(21) Appl. No.: 14/787,559

(22) PCT Filed: May 24, 2013

(86) PCT No.: PCT/JP2013/064453
§ 371 (c)(1),
(2) Date: Oct. 28, 2015

(87) PCT Pub. No.: WO2014/188577
PCT Pub. Date: Nov. 27, 2014

(65) Prior Publication Data
US 2016/0085605 A1 Mar. 24, 2016

(51) Int. Cl.
*G06F 11/00* (2006.01)
*G06F 11/07* (2006.01)
*G06F 17/50* (2006.01)

(52) U.S. Cl.
CPC .......... *G06F 11/076* (2013.01); *G06F 11/008* (2013.01); *G06F 11/0736* (2013.01); *G06F 17/5045* (2013.01); *G06F 2217/70* (2013.01)

(58) Field of Classification Search
USPC .......................................................... 714/1
See application file for complete search history.

(56) References Cited

U.S. PATENT DOCUMENTS 5,022,027 A * 6/1991 Rosario ............... G06F 11/1415
376/245
7,166,847 B2 * 1/2007 Hannah .................. G06F 11/00
250/370.01

(Continued)

FOREIGN PATENT DOCUMENTS

JP 2004-125633 A 4/2004
JP 2006-134938 A 5/2006

(Continued)

OTHER PUBLICATIONS

JEDEC Standard No. 89A (JESD89A), "Measurement and Reporting of Alpha Particle and Terrestrial Cosmic Ray-Induced Soft Errors in Semiconductor Devices," JEDEC Solid State Technology Association, 2006, pp. 1-84 (ninety-three (93) pages).

(Continued)

*Primary Examiner* — Amine Riad
(74) *Attorney, Agent, or Firm* — Crowell & Moring LLP

(57) ABSTRACT

For a soft error of an electronic device, a technique capable of ensuring high reliability because of a low soft error rate (SER) is provided. By using building data including information of a structural object of a building and facility data including information of a plurality of facilities including an electronic device arranged in the building, a SER calculating device calculates a model including an attenuation index value representing a degree of attenuation of radiation entering the building attenuated by the structural object of the building until the radiation reaches a position of the facility arranged in the building, calculates a SER at each position of the facility arranged in the building by using the model including the attenuation index value, and outputs information including the SER at each position of the facility.

15 Claims, 26 Drawing Sheets

(56) References Cited

U.S. PATENT DOCUMENTS

| | | | |
|---|---|---|---|
| 7,684,232 B1* | 3/2010 | Lesea | G11C 11/4125 365/106 |
| 7,875,854 B2* | 1/2011 | Cannon | H01L 31/115 250/370.02 |
| 8,120,131 B2* | 2/2012 | Cannon | H01L 23/552 257/443 |
| 8,179,694 B2* | 5/2012 | Bransford | H02H 5/005 174/350 |
| 8,935,566 B2 | 1/2015 | Matsui et al. | |
| 2003/0097606 A1* | 5/2003 | Bernadat | G06F 11/073 714/2 |
| 2003/0234430 A1* | 12/2003 | Friend | G11C 11/4125 257/428 |
| 2005/0211890 A1* | 9/2005 | Ibe | G01R 31/31816 250/269.6 |
| 2008/0273393 A1* | 11/2008 | Chen | G01R 31/31816 365/185.21 |
| 2013/0132056 A1 | 5/2013 | Toba et al. | |
| 2014/0095928 A1* | 4/2014 | Ogasawara | G06F 11/0721 714/15 |

FOREIGN PATENT DOCUMENTS

| | | |
|---|---|---|
| JP | 2008-39453 A | 2/2008 |
| JP | 2011-257898 A | 12/2011 |
| JP | 2013-37473 A | 2/2013 |

OTHER PUBLICATIONS

International Search Report (PCT/ISA/210) issued in PCT Application No. PCT/JP2013/064453 dated Jul. 30, 2013 with English-language translation (three (3) pages).

Japanese-language Written Opinion (PCT/ISA/237) issued in PCT Application No. PCT/JP2013/064453 dated Jul. 30, 2013 (three (3) pages).

* cited by examiner

FIG. 11

34: SER DATA

| ID | TYPE | BUILDING | FLOOR | AREA | DIVISION AREA | FACILITY | TARGET SER | SER | JUDGMENT RESULT | ... |
|---|---|---|---|---|---|---|---|---|---|---|
| 1 | BUILDING | BUILDING A1 | — | — | — | — | 2000 | 1862 | OK | ... |
| 2 | BUILDING | BUILDING B1 | — | — | — | — | 2000 | 2023 | NG | ... |
| 3 | FLOOR | BUILDING A1 | F1 | — | — | — | 800 | 643 | OK | ... |
| 4 | FLOOR | BUILDING A1 | F2 | — | — | — | 1200 | 1380 | NG | ... |
| 5 | AREA | BUILDING A1 | F1 | X | — | — | 400 | 311 | OK | ... |
| 6 | AREA | BUILDING A1 | F1 | Y | — | — | 400 | 332 | OK | ... |
| ... | ... | ... | ... | ... | — | ... | ... | ... | ... | ... |
| 11 | FACILITY | BUILDING A1 | F1 | X | B11 | A001 | 100 | 95 | OK | ... |
| 12 | FACILITY | BUILDING A1 | F1 | X | B12 | A002 | 100 | 105 | NG | ... |
| ... | ... | ... | ... | ... | ... | ... | ... | ... | ... | ... |
| 21 | FACILITY | BUILDING A1 | F1 | Y | B21 | B001 | 100 | 91 | OK | ... |
| 22 | FACILITY | BUILDING A1 | F1 | Y | B22 | B002 | 100 | 87 | OK | ... |
| ... | ... | ... | ... | ... | ... | ... | ... | ... | ... | ... |
| 31 | FACILITY | BUILDING A1 | F2 | Z | B31 | C001 | 150 | 131 | OK | ... |
| 32 | FACILITY | BUILDING A1 | F2 | Z | B32 | C002 | 150 | 138 | OK | ... |
| ... | ... | ... | ... | ... | ... | ... | ... | ... | ... | ... |
| 41 | FACILITY | BUILDING A1 | F2 | W | B41 | D001 | 50 | 24 | OK | ... |
| 42 | FACILITY | BUILDING A1 | F2 | W | B42 | D002 | 50 | 19 | OK | ... |
| ... | ... | ... | ... | ... | ... | ... | ... | ... | ... | ... |

FIG. 16

```
┌─ □ SETTING                                                              [x] ─┐
│                                                          1611                │
│ 1601 — ■BUILDING SER                                                         │
│         TARGET VALUE :      [ 2,000 ]  [FIT]          (CHANGEABLE            │
│                                                         OR NOT)              │
│ 1602 — ■FLOOR SER TARGET VALUE :                                             │
│                                                       [CHANGEABLE ▽]         │
│                  [ 2F ] :   [ 1,200 ]  [FIT]                                 │
│                                             1612      [CHANGEABLE ▽]         │
│                  [ 1F ] :   [  800  ]  [FIT]                                 │
│                                         (IMPORTANCE   (CHANGEABLE            │
│ 1603 — ■FACILITY SER TARGET VALUE :       DEGREE)        OR NOT)             │
│                                                                              │
│         FACILITY A :SERVER:    [ 100 ]  [FIT]  [LEVEL 2 ▽]  [CHANGEABLE ▽]   │
│                                                                              │
│         FACILITY B:STORAGE:    [ 100 ]  [FIT]  [LEVEL 2 ▽]  [CHANGEABLE ▽]   │
│         FACILITY C:                                             NOT          │
│         COMMUNICATION APPARATUS: [ 150 ] [FIT] [LEVEL 1 ▽]  [CHANGEABLE ▽]   │
│         FACILITY D:BACKUP POWER                                              │
│         SUPPLY DEVICE:         [  50 ]  [FIT]  [LEVEL 1 ▽]  [CHANGEABLE ▽]   │
│                                                                              │
│                                    (ATTENUATION        (CHANGEABLE           │
│ 1604 — ■STRUCTURE PROPERTY (MATERIAL) COFFICIENT)         OR NOT)            │
│         STRUCTURE A                                             NOT          │
│          (FLOOR):      [CONCRETE ca ▽]    [ ... ]       [CHANGEABLE ▽]       │
│         STRUCTURE B                                                          │
│          (WALL):       [CONCRETE cb ▽]    [ ... ]       [CHANGEABLE ▽]       │
│                                                                              │
│ 1605 — ■DIVISION AREA SETTING                                                │
│            SIZE:  [ 2m × 2m × 2m      ▽]                                     │
│                                                                              │
│ 1606 — ■DESIGN CHANGE                                                        │
│            ● FACILITY ARRANGEMENT CHANGE   [ SETTING OF CHANGEABLE RANGE ]   │
│                                                                              │
│            ○ BUILDING STRUCTURE CHANGE     [ SETTING OF CHANGEABLE RANGE ]   │
│                                                                              │
│                                                      [  OK  ]  [ CANCEL ]    │
└──────────────────────────────────────────────────────────────────────────────┘
```

FIG. 23

☐ DESIGN CHANGE

2301 — ■ BEFORE CHANGE  DESIGN DATA

| DESIGN DATA | BUILDING DATA | FACILITY DATA | SER DATA | ... |
|---|---|---|---|---|
| DESIGN DRAFT 0 | FILE f1 | FILE f2 | FILE f3 | ... |

2302 — ■ TARGET VALUE

BUILDING SER  TARGET VALUE : 2,000 [FIT]   [CHANGE]

2303 — ■ TARGET CLEAR LIST

| DESIGN DATA | BUILDING DATA | FACILITY DATA | SER DATA | SER REDUCTION EFFECT |
|---|---|---|---|---|
| DESIGN DRAFT 1 | FILE F1 | FILE F2 | FILE F3 | ···% |
| DESIGN DRAFT 2 | ...... | ...... | ...... | ···% |
| DESIGN DRAFT 3 | ...... | ...... | ...... | ···% |
| ...... | ...... | ...... | ...... | |

PRIORITY ORDER:  [ASCENDING ORDER OF BUILDING SER ▽]

2304 — ■ AFTER CHANGE  DESIGN DATA

| DESIGN DATA | BUILDING DATA | FACILITY DATA | SER DATA | SER REDUCTION EFFECT |
|---|---|---|---|---|
| DESIGN DRAFT 1 | FILE F1 | FILE F2 | FILE F3 | ···% |

[APPLICATION]

[OK] [CANCEL]

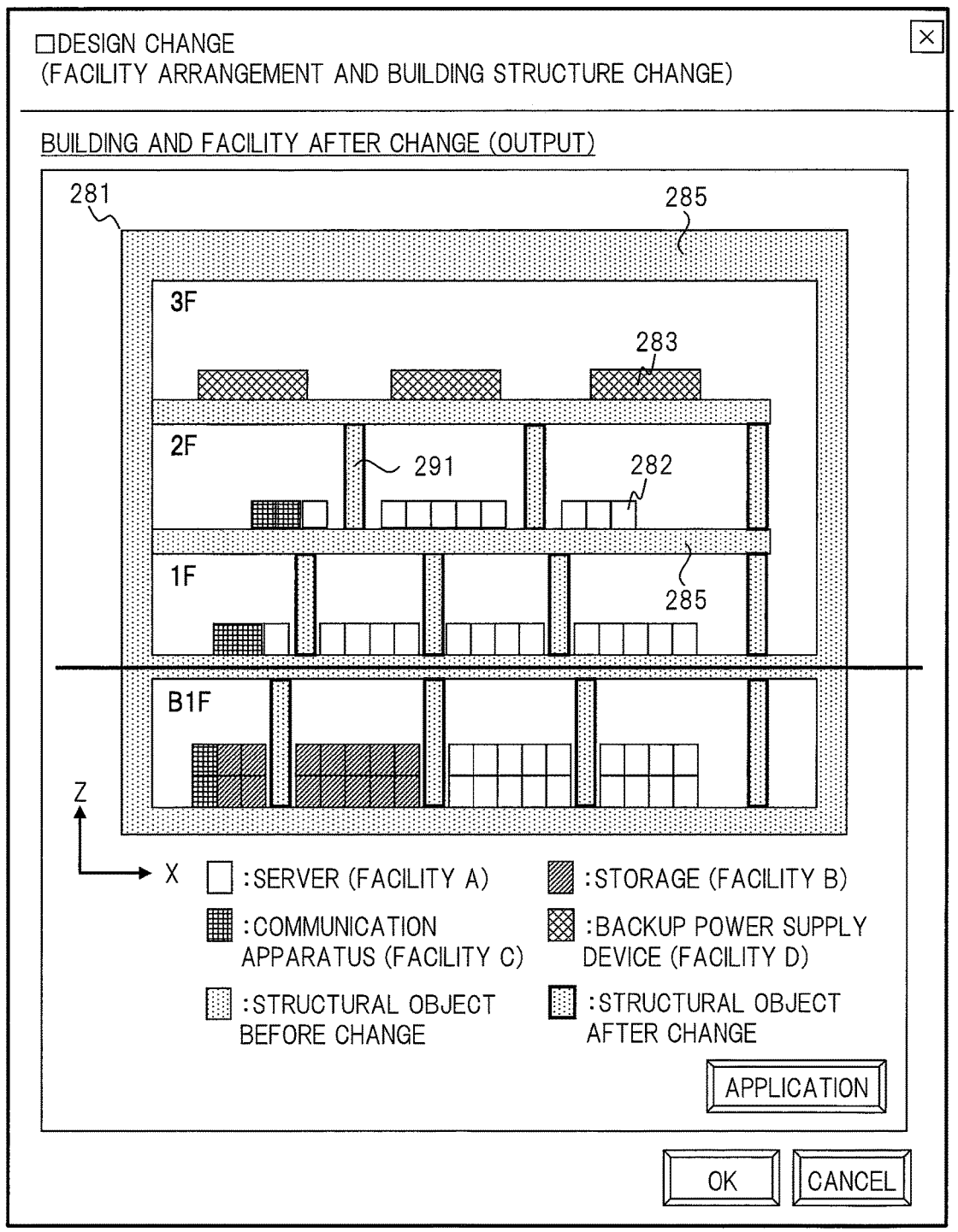

SOFT-ERROR-RATE CALCULATING DEVICE

TECHNICAL FIELD

The present invention relates to a technique of a calculating device and an information processing. Also, the present invention relates to a technique of calculating a soft error rate of an electronic device.

BACKGROUND ART

Along with miniaturization and high integration of a semiconductor device, a soft error problem such as a neutron soft error has been expanded. The neutron soft error means a phenomenon that retained data of a memory of a semiconductor device is inverted when neutron rays in the nature enters the semiconductor device. In various electronic devices such as a server on which a plurality of semiconductor devices are mounted, an intermittent failure caused by the neutron soft error increases. In a system such as a data center, many facilities including various electronic devices are arranged in a building, and therefore, a measure against the soft error is urgently required.

As an example of the measure against the soft error, a redundant method such as hardware duplexing of an electronic device is cited. By the redundant method, a failure caused by the soft error is not brought out, so that the reliability of the electronic device and system is ensured.

As an index about the soft error including the neutron soft error, a soft error rate (SER: Soft Error Rate) is cited. The soft error rate has been an important index that represents the reliability of the electronic device.

As a prior art technique examples about the soft error, Japanese Patent Application Laid-Open Publication No. 2006-134938 (Patent Document 1) and Japanese Patent Application Laid-Open Publication No. 2008-39453 (Patent Document 2) are cited.

Patent Document 1 describes a method of simple aggregation of the soft error rates of respective components as a method of examining the soft error rates of the semiconductor device.

Patent Document 2 describes that neutrons in a low energy band can be attenuated by concrete or polyethylene.

PRIOR ART DOCUMENTS

Patent Documents

Patent Document 1: Japanese Patent Application Laid-Open Publication No. 2006-134938
Patent Document 2: Japanese Patent Application Laid-Open Publication No. 2008-39453
Non-Patent Document 1: JEDEC Standard No. 89A (JESD89A), Measurement and Reporting of Alpha Particle and Terrestrial Cosmic Ray-Induced Soft Errors in Semiconductor Devices, page 69, 2006, JEDEC SOLID STATE TECHNOLOGY ASSOCIATION

SUMMARY OF THE INVENTION

Problems to be Solved by the Invention

For an electronic device on which a semiconductor device is mounted and a system and a building such as a data center in which a facility including the electronic device is arranged, it is required to ensure reliability by a measure against the soft error including the neutron soft error. Moreover, since the number of facilities arranged in a building is large in a data center, cost and electric power consumption increase in the redundant method.

An object of the present invention is to provide a technique which can calculate the soft error of the electronic device, and which can ensure high reliability because of a low soft error rate. Another object of the present invention is to provide a technique which can achieve a system and a building such as a data center having high reliability because of a low soft error rate and having low cost and electric power consumption.

Means for Solving the Problems

A typical embodiment of the present invention is a soft-error-rate calculating device which is a calculating device of calculating a soft error rate and has a feature having the following configuration.

A soft-error-rate calculating device of an embodiment has: a building data storing unit that stores building data including information of a structural object of a building; a facility data storing unit that stores facility data including information of a plurality of facilities including an electronic device arranged in the building; a model calculating unit that uses the building data and the facility data and calculates a model including an attenuation index value representing a degree of attenuation of radiation entering the building attenuated by the structural object of the building until the radiation reaches a position of the facility arranged in the building; a soft-error-rate calculating unit that uses the model including the attenuation index value and calculates a soft error rate at each position of the facility arranged in the building; and an output controlling unit that outputs information including the soft error rate at each position of the facility.

Effects of the Invention

According to the typical embodiment of the present invention, a soft error of an electronic device can be calculated, and high reliability because of a low soft error rate can be ensured. Moreover, according to the typical embodiment of the present invention, a system and a building such as a data center having the high reliability because of the low soft error rate and having low cost and electric power consumption can be achieved.

BRIEF DESCRIPTIONS OF THE DRAWINGS

FIG. 11 is a diagram showing a configuration example of soft-error-rate data of the first embodiment;

FIG. 16 is a diagram showing a setting screen example of the first embodiment and second embodiment;

FIG. 23 is a diagram showing a screen example of design change of the second embodiment;

FIG. 29 is a diagram showing a screen example displaying a state after the design change of the second embodiment.

BEST MODE FOR PERFORMING THE INVENTION

Hereinafter, embodiments of the present invention will be described in detail with reference to the accompanying drawings. Note that the same components are denoted by the same reference symbols throughout all the drawings for describing the embodiment in principle, and the repetitive description thereof will be omitted. Note that the soft error rate is appropriately abbreviated as SER on explanation.

First Embodiment

An SER calculating device 1 of a first embodiment of the present invention will be explained by using FIG. 1 to FIG. 19. The SER calculating device 1 of the first embodiment shown in FIG. 1, etc. provides a function to calculate an SER about a soft error including a neutron soft error about a facility including a plurality of electronic devices arranged in a building such as a data center. The function calculates an SER of each facility, an SER of the entire building, etc. in consideration of the effect of attenuation caused by shielding of radiation including neutron rays by a structural object such as a floor and a wall of the structural body of the building.

[Calculating System]

Figure 1:
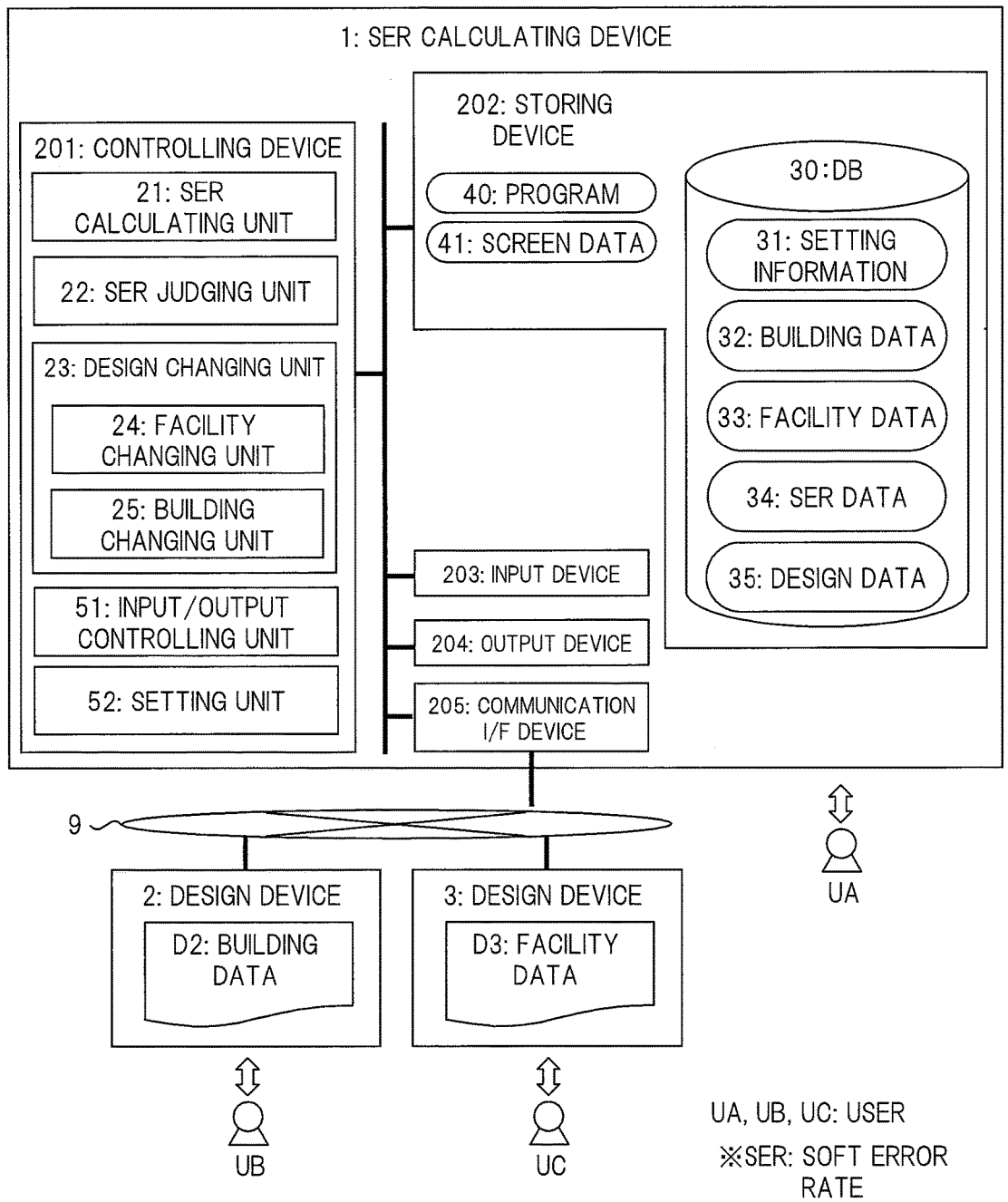
FIG. 1 is a diagram showing a configuration of a calculating system including soft-error-rate calculating devices of a first embodiment and a second embodiment of the present invention.

FIG. 1 shows a configuration of a calculating system including the SER calculating device 1 of a first embodiment and a second embodiment. In the calculating system, the SER calculating device 1, a design device 2, and a design device 3 are connected through a network 9. A user UA operates the SER calculating device 1. A user UB operates the design device 2. A user UC operates the design device 3. Each of the SER calculating device 1, the design device 2, and the design device 3 is configured of, for example, a calculator such as a PC. Note that a design changing unit 23 and design data 35 of FIG. 1 are provided in the configuration of the second embodiment described later.

The design device 2 has a function to design a structure of a building such as a data center, is provided with a design software such as a CAD which is publicly known, and creates, stores, and manages building data D2, etc. by the user UB. The building data D2 includes three-dimensional CAD data, drawing data, etc. representing the structural body of the building.

The design device 3 has a function to design a system such as a data center having facilities including a plurality of electronic devices as components, is provided with a design software such as a CAD which is publicly known, and creates, stores, and manages facility data D3, etc. by the user UC. The facility data D3 includes data of each facility serving as the component as the data representing a logical configuration of an objective system. The facility data D3 may include design information of arrangement of the facility in the building. The user UC may create the facility data D3 including the design information of the arrangement of the facility in the building based on reference of the building data D2.

Note that the users UA, UB, and UC may be the same person. The SER calculating device 1, the design device 2, and the design device 3 may be an integrated device. For example, the design device 2 and the design device 3 may be integrated, and the users UB and UC may be the same person. The design device 3 and the SER calculating device 1 may be integrated, and the users UC and UA may be the same person. A design of the building data D2 and a design of the facility data D3 may be integrated as one design. The user UA of the SER calculating device 1 may design the arrangement of facility in the building, and create the facility arrangement information based on the building data D2 and the facility data D3.

The SER calculating device 1 has a controlling device 201, a storing device 202, an input device 203, an output device 204, a communication I/F device 205 (I/F: interface), a bus, a power supply device, etc. The controlling device 201 is configured of a CPU, a RAM, a ROM, etc.

The controlling device 201 has a SER calculating unit 21, a SER judging unit 22, an input/output controlling unit 51, and a setting unit 52. The controlling device 201 achieves a function and a process of each unit such as the SER calculating unit 21 by reading and executing a program 40 of the storing device 202.

The storing device 202 stores various pieces of data information such as the program 40, screen data 41, a DB (database) 30, and input/output data. The DB 30 stores various pieces of data information such as setting information 31, building data 32, facility data 33, and SER data 34.

The input device 203 includes a keyboard, a mouse, and an input/output controlling unit thereof. The output device 204 includes a display, a printer, and an input/output controlling unit thereof. The communication I/F device 205 performs a communication interface processing with the network 9.

The building data 32 is input data based on a copy of the building data D2 of the design device 2 or is data directly inputted in the SER calculating device 1. The facility data 33 is input data based on a copy of the facility data D3 of the design device 3 or is data directly inputted in the SER calculating device 1. The SER calculating device 1, for example, receives and acquires the building data D2 of the design device 2 and the facility data D3 of the design device 3 via the network 9, and stores and manages the data in the DB 30 as the building data 32 and the facility data 33, respectively.

The SER data 34 is data including soft error rates of a building and a facility caused by the results of calculation and analysis in the SER calculating device 1. The SER data 34 includes data of a table as shown in FIG. 11 described later.

The input/output controlling unit 51 performs input/output control processing of the SER calculating device 1. The input/output controlling unit 51 configures a screen which serves as a graphical user interface (GUI) for the user UA by using the screen data 41, and displays the screen on a display device of the output device 204. The screen data 41 is data for configuring a GUI screen created by the input/output controlling unit 51. The screen data 41 includes data for enabling the information of the building, the facility, and the SER to be displayed in a plurality of formats.

The setting unit 52 performs a processing of receiving input from the user UA through the GUI screen or others created by the input/output controlling unit 51 and setting the setting information 31. The setting information 31 includes setting information of the function of the program 40 of the SER calculating device 1, and includes, for example, setting information set by the SER calculating device 1 or by a business operator which provides the program 40 and information set by the user UA. The setting information 31 includes information such as a target value about the SER and conditions in calculations and information set on a setting screen as shown in FIG. 16 described later.

The user UA may operate another terminal device connected to the SER calculating device 1 to access the SER calculating device 1, and use the functions thereof. That is, the SER calculating device 1 may be in a form of a server or others. The program 40 of the SER calculating device 1 may be downloaded and installed through the network 9.

[Configuration (1) of SER Calculating Device]

Figure 2:
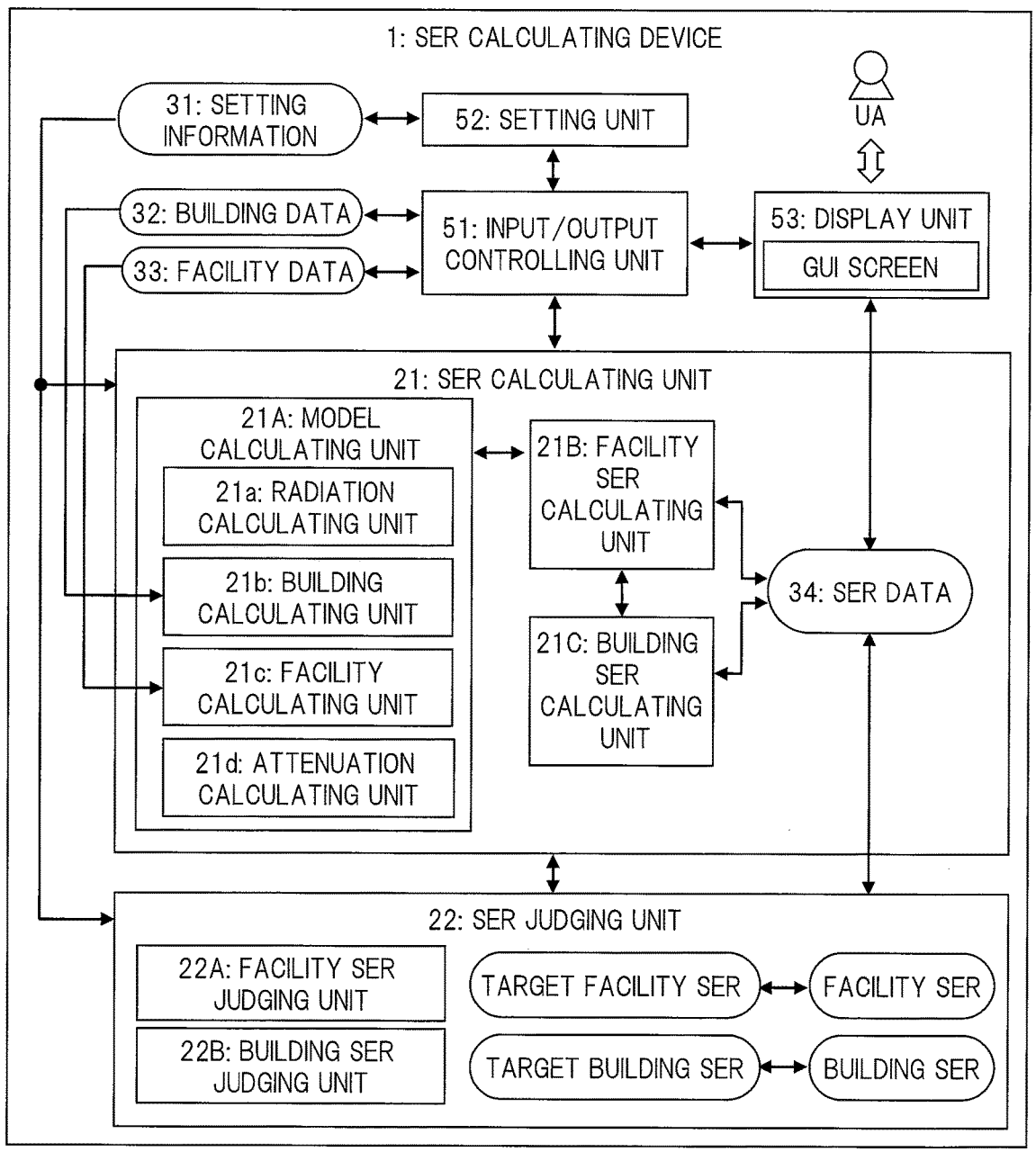
FIG. 2 is a diagram showing an outline of a configuration of the soft-error-rate calculating device of the first embodiment.

FIG. 2 shows an outline of a configuration of the SER calculating device 1 of the first embodiment of FIG. 1. The input/output controlling unit 51 displays a GUI screen on the display unit 52 using the display device of the output device 204. The input/output controlling unit 51 performs a control processing of input and output of various pieces of data through the GUI screen. The user UA performs an operation while watching the GUI screen of the display unit 53. A menu of the GUI screen provides commands corresponding to functions such as data input, data output, setting, SER calculation, SER judgement, and later-described design change, and can be selected and executed by the user UA.

The setting unit 52 stores the information inputted on the GUI screen as the setting information 31. Through the GUI screen, the input/output controlling unit 51 stores the building data D2 from the design device 2 or the information directly inputted by the user UA as the building data 32. Through the GUI screen, the input/output controlling unit 51 stores the facility data D3 from the design device 3 or the information directly inputted by the user UA as the facility data 33.

The SER calculating unit 21 performs a processing of calculating the SER, etc. of the facility arranged in the building by using the setting information 31, the building data 32, the facility data 33, etc., and saving and outputting a result of the calculation as the SER data 34. The SER judging unit 22 performs a processing of judging whether the set condition is satisfied or not in comparison between the above-described calculated SER, etc. of the facility and the target value, and saving and outputting a result of the judgment as the SER data 34. The input/output controlling unit 51 generates the GUI screen which outputs various pieces of information including the above-described SER calculation and the processing result of the judgement, and displays the GUI screen on the display unit 53.

The SER calculating unit 21 has a model calculating unit 21A, a facility SER calculating unit 21B, and a building SER calculating unit 21C. The model calculating unit 21A performs a calculation processing of creating a model for calculating the SER. The model calculating unit 21A has a radiation calculating unit 21a, a building calculating unit 21b, a facility calculating unit 21c, and an attenuation calculating unit 21d. The model calculating unit 21A may set a model by using the setting information 31.

The radiation calculating unit 21a performs a calculation processing of creating a model about radiation such as neutron rays. The building calculating unit 21b performs a calculation processing of creating a model of the building by using the building data 32. The facility calculating unit 21c performs a calculation processing of creating a model of the facility including the arrangement of the facility in the building by using the facility data 33.

The attenuation calculating unit 21d performs a calculation processing of creating a model for calculating the SER by using a model including the above-described radiation, building, and facility. This model is a model including an index value representing the degree of attenuation caused by shielding of the radiation shielded by the structural object of the building when the radiation that enters the building reaches and penetrates through the position of the facility arranged in the building.

Based on the models created by the model calculating unit 21A, the facility SER calculating unit 21B performs a processing of calculating the SER for each of a plurality of facilities arranged in the building as a facility SER. Also, based on the above-described models and the above-described facility SERs, the building SER calculating unit 21C performs a processing of calculating a SER in an entire building unit as a building SER. The above-described calculated facility SERs and building SER are stored as the SER data 34.

The SER judging unit 22 has a facility SER judging unit 22A and a building SER judging unit 22B. The SER judging unit 22 judges that the various types of SERs are, for example, either good or not good or either valid or invalid by using the SER data 34 which is the result of calculations by the SER calculating unit 21, and the target value of the setting information 31, and outputs a result of the judgment as a part of the SER data 34.

The facility SER judging unit 22A compares a facility SER value (assumed to be "Ri") of the SER data 34 with a target facility SER value (assumed to be "Ti") of the target values, and judges that the SER value is good (OK) if a relation of "Ri≤Ti" is established, or judges that the SER value is not good (NG) if a relation of "Ri>Ti" is established.

The building SER judging unit 22B compares a building SER value (assumed to be "Rall") of the SER data 34 with a target building SER value (assumed to be "Tall") of the target values, and judges that the SER value is valid if a relation of "Rall≤Tall" is established, or judges that the SER value is invalid if a relation of "Rall>Tall" is established.

The input/output controlling unit 51 generates a GUI screen on which the information including the SER data 34 calculated by the SER calculating unit 21 is outputted to the user UA, and displays the screen on the display unit 53. Also, the input/output controlling unit 51 generates a GUI screen on which the information of the judgement result in the SER judging unit 22 is outputted to the user UA, and displays the screen on the display unit 53. The input/output controlling unit 51 displays, for example, the SER calculation value and the SER judgement result together on the screen of the above-described SER calculation result.

[Configuration (2) of SER Calculating Device]

Figure 3:
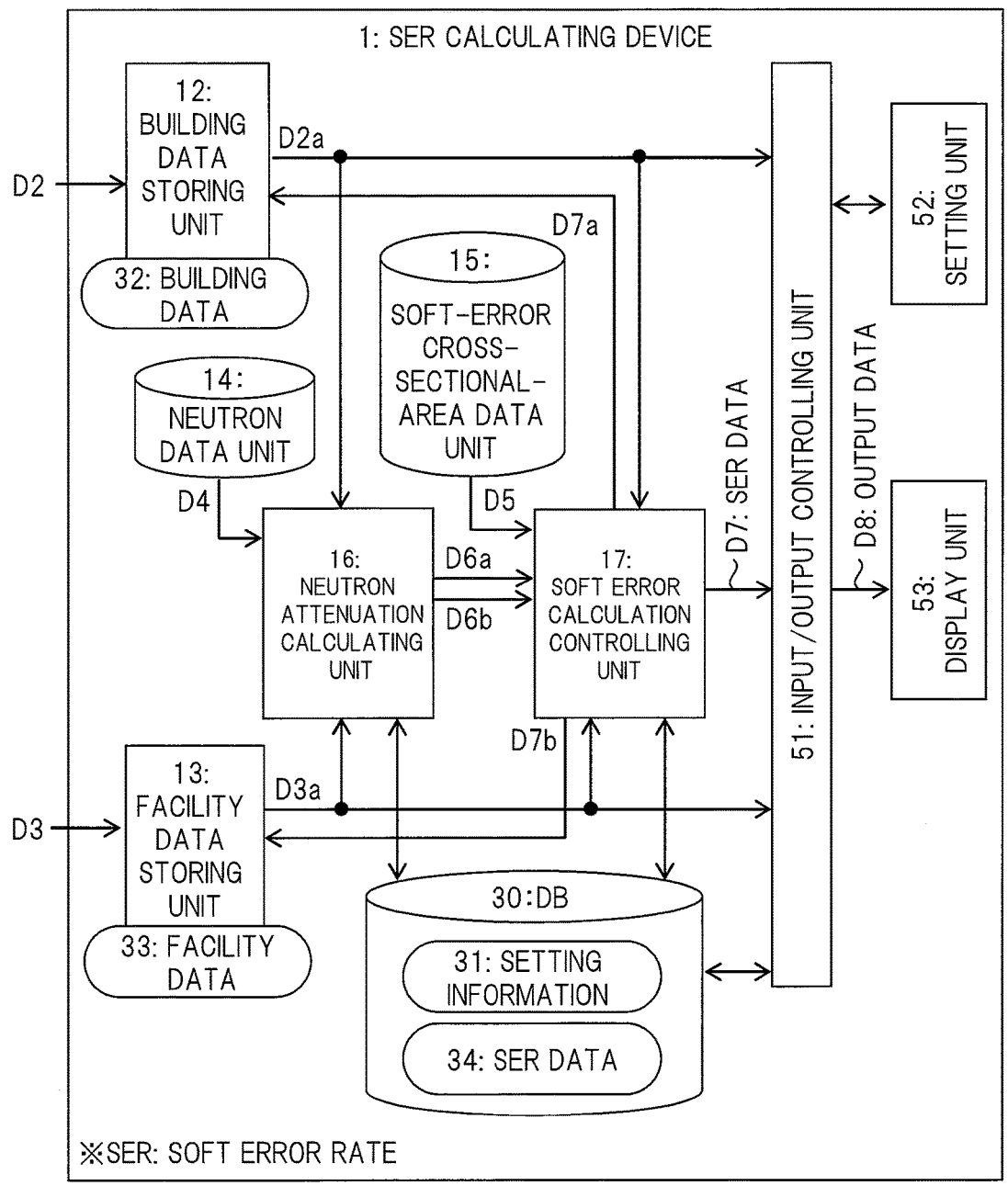
FIG. 3 is a diagram showing a configuration example of the soft-error-rate calculating device of the first embodiment.

FIG. 3 shows a detailed configuration example of the SER calculating device 1 of the first embodiment of FIG. 2. In the configuration of FIG. 3, a configuration example provided with a function of the SER calculation about the neutron soft error is particularly shown. The SER calculating device 1 has a building-data storing unit 12, a facility-data storing unit 13, a neutron data unit 14, a soft-error cross-sectional-area data unit 15, a neutron attenuation calculating unit 16, a soft-error-calculation controlling unit 17, the input/output controlling unit 51, the setting unit 52, the display unit 53, and the DB 30, etc. The SER calculating device 1 stores and manages data information such as the building data 32, the facility data 33, neutron data D4, soft-error cross-sectional-area data D5, the SER data 34, and output data D8.

The building-data storing unit 12 stores the building data D2 which is inputted from outside, as the building data 32. The facility-data storing unit 13 stores the facility data D3 which is inputted from outside, as the facility data 33.

The neutron data unit 14 stores the neutron data D4. The neutron data D4 includes nature neutron spectrum data which is the data of the neutron rays of nature which radiates onto the earth. As the neutron data D4, publicly-known data may be used, or data calculated or set in the SER calculating device 1 may be stored.

The soft-error cross-sectional-area data unit 15 stores the soft-error cross-sectional-area data D5. The soft-error cross-sectional area represents the energy property indicating to what extent easiness of the soft error of the electronic device is. As the soft-error cross-sectional-area data D5, publicly-known data may be used, or data calculated or set in the SER calculating device 1 may be stored.

The neutron attenuation calculating unit 16 calculates and outputs geographically-corrected neutron spectrum data D6a and attenuated neutron spectrum data D6b by using building data D2a, facility data D3a, and the neutron data D4, etc.

The geographically-corrected neutron spectrum data D6a is data obtained before the attenuation serving as a reference of the attenuation calculation. The geographically-corrected neutron spectrum data D6a is obtained by computing of geographical correction using the neutron spectrum data at a geographical position serving as a reference and using the building positional information of the target building. The geographically-corrected neutron spectrum data D6a corresponds to the nature neutron rays that enter the building in a calculation model.

The attenuated neutron spectrum data D6b is spectrum data representing a state of the neutron rays obtained after the attenuation at each position of the arrangement of the facilities in the building. The attenuated neutron spectrum data D6b indicates to what extent the spectrum data of the nature neutron rays entering the building is shielded and attenuated by the structural object of the building until the neutron rays reach the position of the facility arranged in the building.

The soft-error calculation controlling unit 17 controls a processing of calculating various SERs based on the geographically-corrected neutron spectrum data D6a, the attenuated neutron spectrum data D6b, the soft-error cross-sectional-area data D5, the building data D2a, the facility data D3a, etc. Also, the soft-error calculation controlling unit 17 controls a SER judgement processing of comparing the calculated SER and the target value and judging that the SER is either good or not good. The soft-error calculation controlling unit 17 saves the calculations of the SER and the result of the judgement in the DB 30 as the SER data 34, and outputs them to the input/output controlling unit 51 as SER data D7.

By using the screen data 41, the building data D2a, the facility data D3a, the SER data D7, etc., the input/output controlling unit 51 generates a screen including information such as a configuration of the building, a configuration of the arrangement of the facility, the calculations of the SER, and the result of the judgement, and displays them on the display unit 53. The input/output controlling unit 51 generates the screen for displaying the above-described information in a format specified or set by the user UA. This format of the display can be selected or set by the user UA from a plurality of formats including a two-dimensional display format and a three-dimensional display format as shown in a screen example of later-described FIG. 13, etc.

[Processing of SER Calculating Device]

Figure 4:
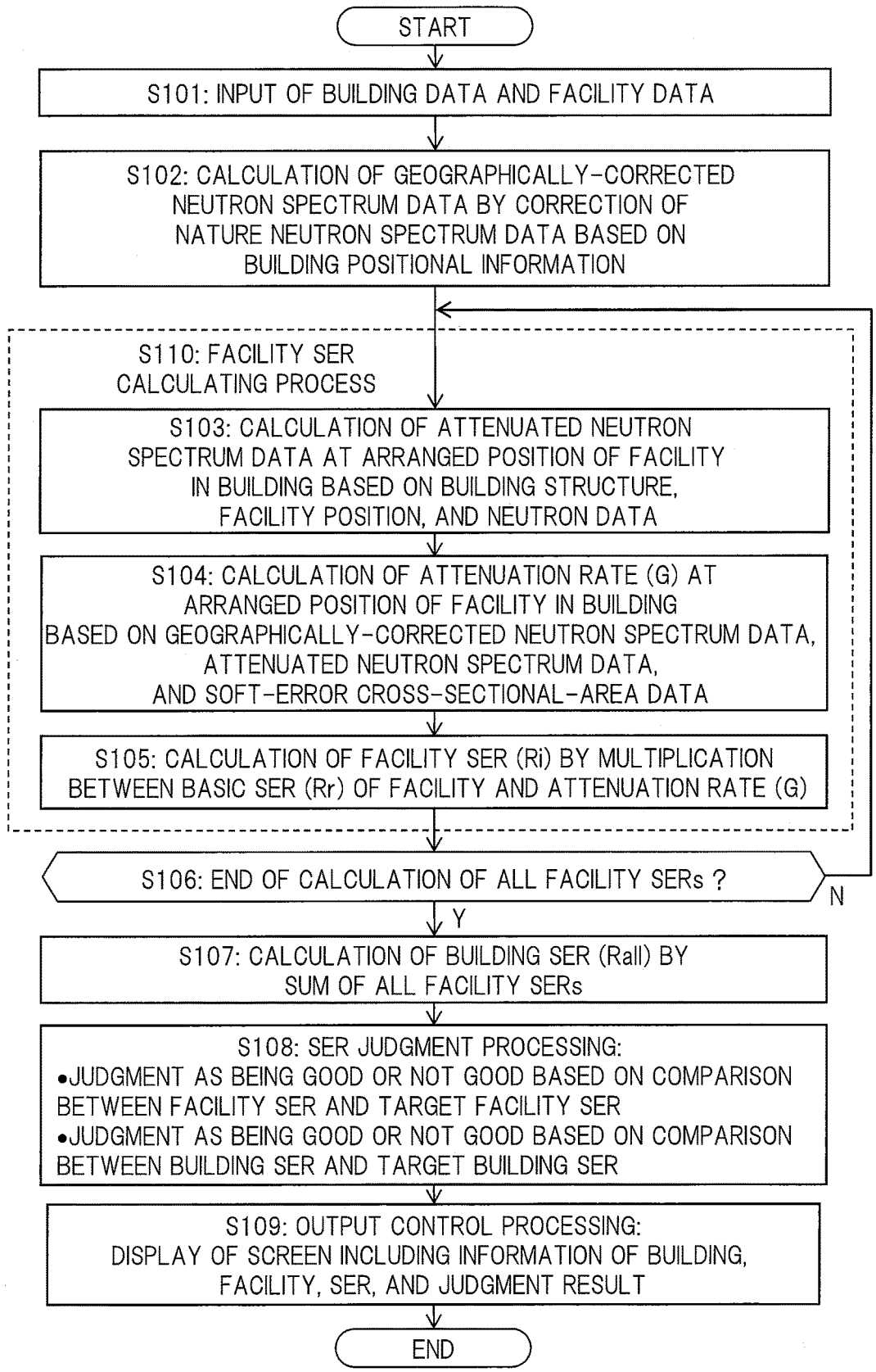
FIG. 4 is a flowchart of processing of the soft-error-rate calculating device of the first embodiment.

FIG. 4 shows a processing flow of the SER calculating device 1 of the first embodiment of FIG. 3. S101 and others show processing steps. For example, when execution of the SER calculation is selected by an operation of the user UA from the menu of the screen, the SER calculating device 1 starts the following processing.

(S101) In S101, the SER calculating device 1 inputs the building data D2, and stores the data in the building-data storing unit 12 as the building data 32, and the SER calculating device 1 inputs the facility data D3, and stores the data in the facility-data storing unit 13 as the facility data 33.

(S102) In S102, based on the building positional information included in the building data 32, the SER calculating device 1 calculates the geographically-corrected neutron spectrum data D6a by causing the neutron attenuation calculating unit 16 to correct the nature neutron spectrum data of the neutron data unit 14.

(S110) S110 including S103 to S105 is a processing of calculating a facility SER which is a SER of each facility. The SER calculating device 1 performs a processing of S110 about all of the facilities in the building.

(S103) In S103, based on the building structure information of the building data 32, the facility positional information of the facility data 33, the neutron data D4, etc., the SER calculating device 1 calculates the attenuated neutron spectrum data D6b at the position of the arrangement of the facility in the building by using the neutron attenuation calculating unit 16.

(S104) In S104, based on the geographically-corrected neutron spectrum data D6a, the attenuated neutron spectrum data D6b, the soft-error cross-sectional-area data D5 of the soft-error cross-sectional-area data unit 15, etc., the SER calculating device 1 calculates an attenuation rate about the SER at the position of the arrangement of the facility in the building by using the soft-error calculation controlling unit 17. The attenuation rate is represented by G.

(S105) In S105, the SER calculating device 1 calculates a facility SER (Ri) which is an effective SER of a facility by causing the soft-error calculation controlling unit 17 to perform computation of multiplying a basic SER of the facility based on the facility data 33 or the setting information 31 by the attenuation rate G obtained in S104. The attenuation rate G can be calculated by a relation of "Ri=Rr× G" by using the basic SER (assumed to be "Rr") of the facility. The soft-error calculation controlling unit 17 stores the calculated facility SER in the SER data 34.

(S106) In S106, the SER calculating device 1 checks whether the facility SER calculation processing of S110 for all the facilities in the target building has been finished or not, and similarly repeats the processing of S110 while changing a target facility until it is finished. The SER calculating device 1 stores the information including the facility SERs of all the facilities, which are calculation results of S110, in the SER data 34.

(S107) In S107, by using the facility SERs of all the facilities in the target building, the SER calculating device 1 calculates a building SER (Rall) which is a SER in an entire building unit by computation such as summation of the facility SERs. The SER calculating device 1 stores the information including the building SER, which is the calculation result, in the SER data 34.

Note that a floor SER which is a floor unit SER, an area SER which is an area unit SER, etc. can be also calculated as similar to that described above. For example, the floor SER can be calculated by summation of all the facility SERs on a target floor or others. The area SER can be calculated by summation of all the facility SERs in a target area or others.

(S108) In S108, the SER calculating device 1 performs a SER judgement processing by using the soft-error calculation controlling unit 17. For each of the facilities in the building, the SER judgement processing compares the above-described calculated facility SER and a target facility SER which is a target value corresponded to each of them, and judges that the soft error is either good or not good. Moreover, for the building, the SER judgement processing compares the above-described calculated building SER and a target building SER which is a target value corresponded to that, and judges that the soft error is either good or not good. The unit of the floor, etc., can be similarly judged.

The soft-error calculation controlling unit 17 stores result information of the above-described SER judgement processing as the SER data 34. The SER judgement result is stored in the SER data 34 as, for example, "0" if being good (OK) or "1" if being not good (NG) as flag information. As being good/not-good as the above-described SER judgement result, the degree of easiness of occurrence of the soft error is represented by a binary value. The target facility SER and the target building SER which are the above-described target values are set as the setting information 31 or a part of the building data 32 and the facility data 33.

(S109) In S109, as an output control processing, the SER calculating device 1 generates a screen including the result information of the calculation and the judgement of the SER obtained up to S108 and displays the screen on the display unit 53 by using the input/output controlling unit 51. This screen includes the structure of the target building, the arrangement of the facilities in the building, the information of the calculated SERs such as the facility SER and the building SER, the SER judgement result information, etc.

[Building-Data Storing Unit]

Figure 5:
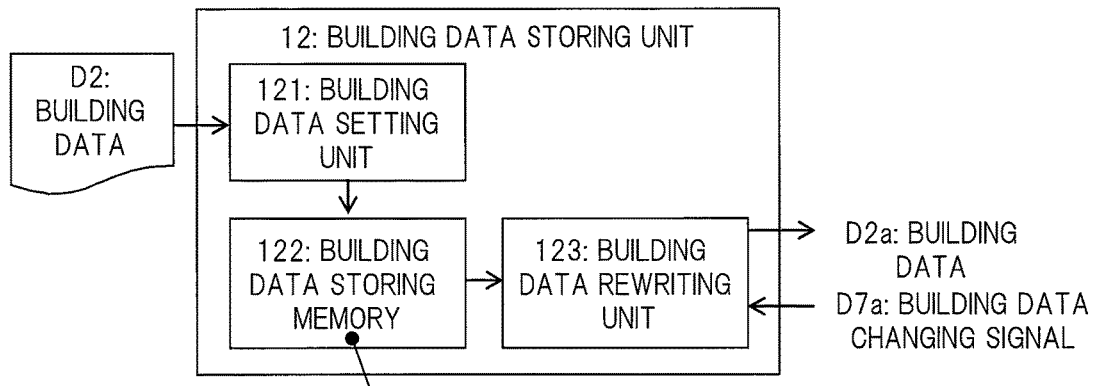
FIG. 5 is a diagram showing a configuration example of a building data storing unit and building data of the first embodiment.

FIG. 5 shows a configuration example of the building-data storing unit 12 and the building data 32. The building-data storing unit 12 has a building-data setting unit 121, a building-data storing memory 122, and a building-data rewriting unit 123. The building data 32 includes building information 32a, building positional information 32b, building structure information 32c, and structural-object property information 32d. The building structure information 32c includes structural-object data of each of a plurality of structural objects configuring a structural body of the building.

The building-data setting unit 121 sets and stores the building data D2 which is inputted from the external design device 2, etc., in the building-data storing memory 122 as the building data 32. As the building data 32, all data are previously stored before the SER calculation, or individual data may be read from outside at the timing of the SER calculation.

The building-data storing memory 122 is configured of a table memory, etc. As the building data 32 stored in the building-data storing memory 122, the data of each building and the data of each structural object configuring the building are managed by a number, etc. which becomes identification information. Note that the building data 32 may be stored in the DB 30.

The building-data rewriting unit 123 reads each building data and/or each structural-object data as the building data D2a from the building-data storing memory 122 based on the identification information, and outputs the data to the neutron attenuation calculating unit 16, etc. Moreover, in accordance with a building-data changing signal D7a, the building-data rewriting unit 123 rewrites the building data and/or the structural-object data specified in the building-data storing memory 122, and changes the building data and/or the structural-object data read from the building-data storing memory 122.

In the building data 32, the building information 32a includes basic information such as identification information, a type, a size, a floor, and an area information of a building such as a data center. Note that a building structure which becomes the target can be any three-dimensionally-shaped building structure including a tall building, a building having an underground floor and others. The floor and area information is configuration information of each floor and area in the building. Note that the building data 32 may include configuration information of a later-described division area.

The building positional information 32b is geographical positional information of the building, and includes information of a latitude, a longitude, and an altitude of a construction location of the building. The building positional information 32b is used for geographical correction calculation. The building positional information 32b may be obtained by conversion based on address information or GPS positioning information of the construction location of the building.

The structural-object data in the building structure information 32c includes identification information and information such as a type, a position, a size, quantity, a weight, and a material of the structural object. The building structure information 32c may include three-dimensional CAD object data created by the design device 2. Each size of the building and the structural object includes information such as a width and a height of a shape in a three-dimensional space of (X, Y, Z). The positional information of the structural object includes the identification information of the floor, the area, etc., where the structural object in the building is arranged, and positional coordinates in a coordinate system of the three-dimensional space of the building. The material can be various types such as concrete, iron and steel, and others.

The structural-object property information 32d is the information of property about the shielding of radiation in the structural object, and includes a later-described attenuation coefficient in the present example. The attenuation coefficient is a coefficient of each structural object used for calculating the attenuation rate G. The structural-object property information 32d can be set by, for example, the user UA.

[Facility-Data Storing Unit]

Figure 6:
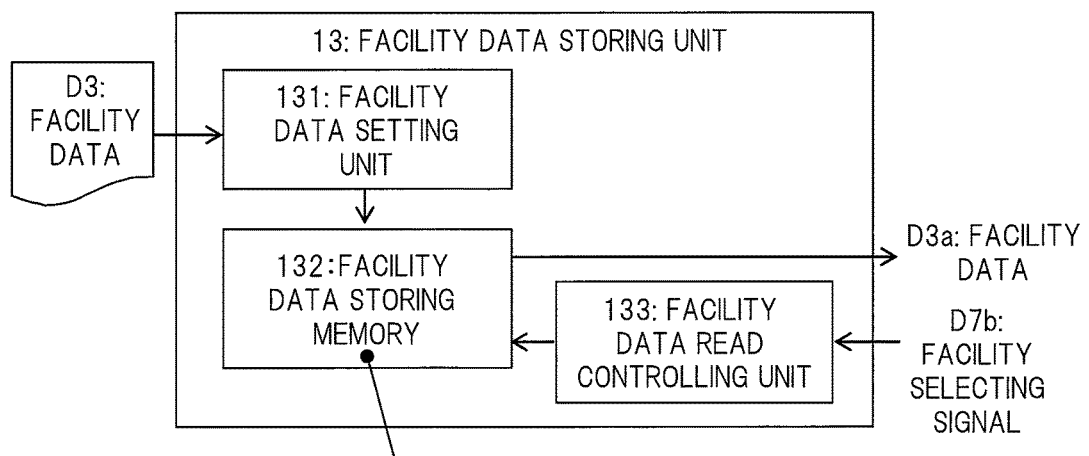
FIG. 6 is a diagram showing a configuration example of a facility data storing unit and facility data of the first embodiment.

FIG. 6 shows a configuration example of the facility-data storing unit 13 and the facility data 33. The facility-data storing unit 13 has a facility-data setting unit 131, a facility-data storing memory 132, and a facility-data reading controlling unit 133. The facility data 33 includes facility information 33a, facility positional information 33b, and facility property information 33c.

The facility-data setting unit 131 sets and stores the facility data D3, which is inputted from the external design device 3, in the facility-data storing memory 132 as the facility data 33. The facility-data reading controlling unit 133 reads the facility data D3a, which is stored in the facility-data storing memory 132 by using a number which becomes the identification information or others, and outputs the data to the neutron attenuation calculating unit 16 and/or the soft-error calculation controlling unit 17. In accordance with a facility selecting signal D7b from the soft-error calculation controlling unit 17, the facility-data reading controlling unit 133 reads the specified facility data D3a from the facility-data storing memory 132, and outputs the data.

In the facility data 33, the facility information 33a is data of each of the plurality of facilities arranged in the building, and includes information such as the identification information, the type, the size, the quantity, the weight, etc. The facility is an electronic device, etc. including a semiconductor device. The type of the facility represents a type such as a server, a storage, a communication device and a backup power supply device. The size of the facility includes information such as a width and a height of a three-dimensional shape. The facility information 33a may include three-dimensional CAD object data created by the design device 3. The facility positional information 33b is information representing the arrangement position of the facility in the building. This positional information is represented by, for example, the identification information of the building, the floor, the area, the division area, etc., and the positional coordinate information in a three-dimensional coordinate system of (X, Y, Z) of the building.

The facility property information 33c is property information about the soft error of the facility, and includes, for example, information of the basic SER. The basic SER is a SER depending on the type of the facility or others, and represents the degree of easiness of occurrence of the soft error in a case that the shielding caused by the building is not taken into consideration. The specification information or actually measured data provided by a manufacturer or a test facility as the publicly-known information may be used as the basic SER if there is such information or data, or the basic SER may be set by the user UA or the business operator if there is not.

When the basic SER is set, the basic SER can be set, for example, with reference to publicly-known basic SER information of a typical or similar electronic device. In that case, the basic SER of the target facility can be calculated by an estimation calculation based on the publicly-known basic SER. For example, when a plurality of semiconductor devices are mounted on a target facility and when the basic SER in the semiconductor device unit is publicly known, the basic SER of the facility can be calculated by, for example, multiplication of the basic SER with the number of mounted devices or summation of the values of respective types of the semiconductor devices.

Alternatively, the basic SER may be calculated by collecting failure information of the facility in actual operation or test of the facility by the business operator and obtaining a failure occurrence rate excluding hardware failure by using the failure information. Alternatively, the facility property information 33c such as the basic SERs of various typical facilities may be configured in a DB format by a business operator, and may be stored in the SER calculating device 1 or on the network 9.

Furthermore, the facility data 33 may include information of a rack, etc. which houses the facility or a component thereof. For example, in a data center, a rack which houses many electronic devices such as serves at high density is used often. Accordingly, the facility data 33 may manage information such as identification information, a position, a size, quantity, and a SER of the rack as rack-unit data. And, the SER calculating device 1 may calculate a SER in a rack unit by using the rack-unit data. The rack-unit SER can be calculated by, for example, summation of the SERs of the plurality of electronic devices housed in the rack.

[Neutron Attenuation Calculating Unit]

Figure 7:
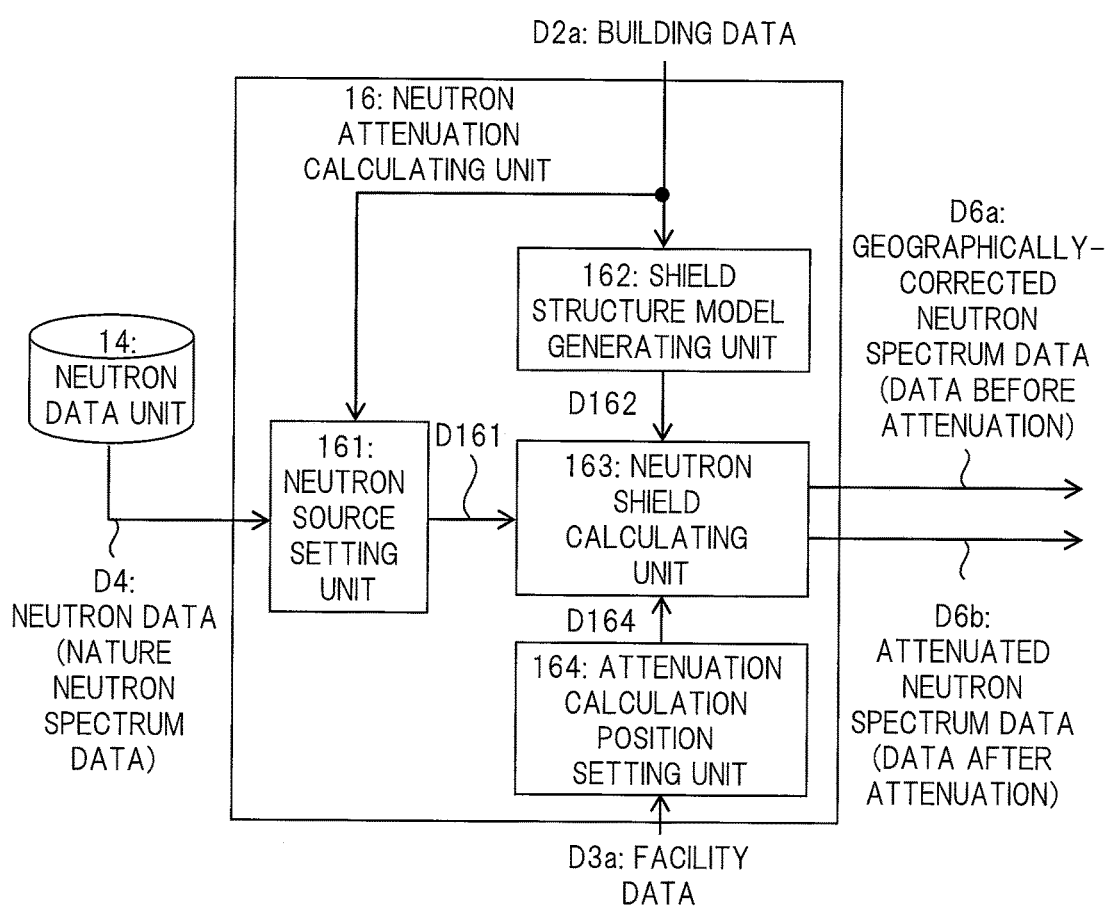
FIG. 7 is a diagram showing a configuration example of a neutron attenuation calculating unit of the first embodiment.

FIG. 7 shows a configuration example of the neutron attenuation calculating unit 16. The neutron attenuation calculating unit 16 has a neutron source setting unit 161, a shield structure model generating unit 162, a neutron shield calculating unit 163, and an attenuation calculation position setting unit 164. Based on the nature neutron spectrum data of the neutron data D4 of the neutron data unit 14, the building data D2a, and the facility data D3a, the neutron attenuation calculating unit 16 calculates the geographically-corrected neutron spectrum data D6a and the attenuated neutron spectrum data D6b and outputs the data to the soft-error calculation controlling unit 17.

The geographically-corrected neutron spectrum data D6a is the neutron spectrum data obtained before the attenuation at the position of the building, which is obtained by using the nature neutron spectrum data at a reference geographical position based on the building positional information 32b and the neutron data D4. In comparison with the geographically-corrected neutron spectrum data D6a that enters the building from outside, the attenuated neutron spectrum data D6b is the neutron spectrum data in a state after the attenuation because of the structural object of the building at each position of the facility in the building.

By using the neutron data D4 and the building data D2a, the neutron source setting unit 161 calculates and sets a radiation model including information of a neutron source, etc., which is required for neutron attenuation calculation in the neutron attenuation calculating unit 163. Moreover, by using the building positional information included in the building data D2a, the neutron source setting unit 161 obtains the geographically-corrected neutron spectrum data D6a through a geographical correction calculation of correcting the nature neutron spectrum data at the reference geographical position included in the neutron data D4. The neutron source setting unit 161 outputs information D161 including the information of the calculated neutron source and the geographically-corrected neutron spectrum data D6a to the neutron shield calculating unit 163. The neutron source may be set as the neutron data D4 or the setting information 31 by the user UA or the business operator.

By using the building data D2a, the shield structure model generating unit 162 generates a model of a shield structure of the neutron rays because of the structural body of the building required for the neutron shield calculation in the neutron shield calculating unit 163. The shield structure model is generated in a format matching a method of the neutron shield calculation in the neutron shield calculating unit 163. The shield structure model generating unit 162 outputs information D162 including the generated shield structure model to the neutron shield calculating unit 163.

By using the facility data D3a, the attenuation calculation position setting unit 164 sets the positional information of the arrangement of the facility in the building which becomes an attenuation calculation position required for calculating the attenuated neutron spectrum data D6b in the neutron shield calculating unit 163. The attenuation calculation position is specified by the identification information of the building, floor, area, division area, etc., the position coordinate information, etc. The attenuation calculation position setting unit 164 outputs information D164 of the attenuation calculation position to the neutron shield calculating unit 163.

The neutron shield calculating unit 163 calculates the attenuated neutron spectrum data D6b based on the information D161 including the information of the neutron source and the geographically-corrected neutron spectrum data D6a, the information D162 including the shield structure model, and the information D164 of the attenuation calculation position. The neutron shield calculating unit 163 outputs the geographically-corrected neutron spectrum data D6a and the calculated attenuated neutron spectrum data D6b to the soft-error calculation controlling unit 17. The neutron attenuation calculating unit 16 may store and manage the calculated geographically-corrected neutron spectrum data D6a and the attenuated neutron spectrum data D6b in the DB 30 or in the neutron data unit 14, and the data may be reused.

The neutron shield calculating unit 163 performs attenuation calculation of a neutron dose while changing the conditions of the entering of the neutron ray by using the neutron source setting unit 161, and a result of the calculation is set as the attenuated neutron spectrum data D6b. Also, the neutron shield calculating unit 163 calculates an average value of the attenuated neutron spectrum data at each attenuation calculation position set at the plurality of facilities in the building, and the value is set as the attenuated neutron spectrum data D6b.

In the geographical correction calculation in the neutron source setting unit 161 of the first embodiment, a neutron flux correction coefficient at each location on the earth determined by Non-Patent Document 1 (JEDEC89A) is used. This neutron flux correction coefficient represents a difference in the neutron flux at each location on earth having a reference value in New York which is a reference geographical position as 1.0. The neutron flux correction coefficients are, for example, 0.64 in Tokyo, Japan, and 3.96 in Mexico City which is at a high altitude. The geographical correction at any geographical position can be calculated by using an expression A.2 described in Non-Patent Document 1. The geographically-corrected neutron spectrum data D6a is the neutron spectrum data obtained after the above-described geographical correction calculation.

The neutron attenuation calculation of the neutron attenuation calculating unit 16 and the neutron shield calculation of the neutron shield calculating unit 163 of the first embodiment are performed by particle transport calculation using a publicly-known radiation transport calculation code. In the neutron attenuation calculating unit 16, by the above-described particle transport calculation, information of how much radiation is attenuated at a position in the building when the reference value of the radiation that enters the building from outside is set to 1.0 is calculated by the above-described particle transport calculation.

[Soft-Error Calculation Controlling Unit]

Figure 8:
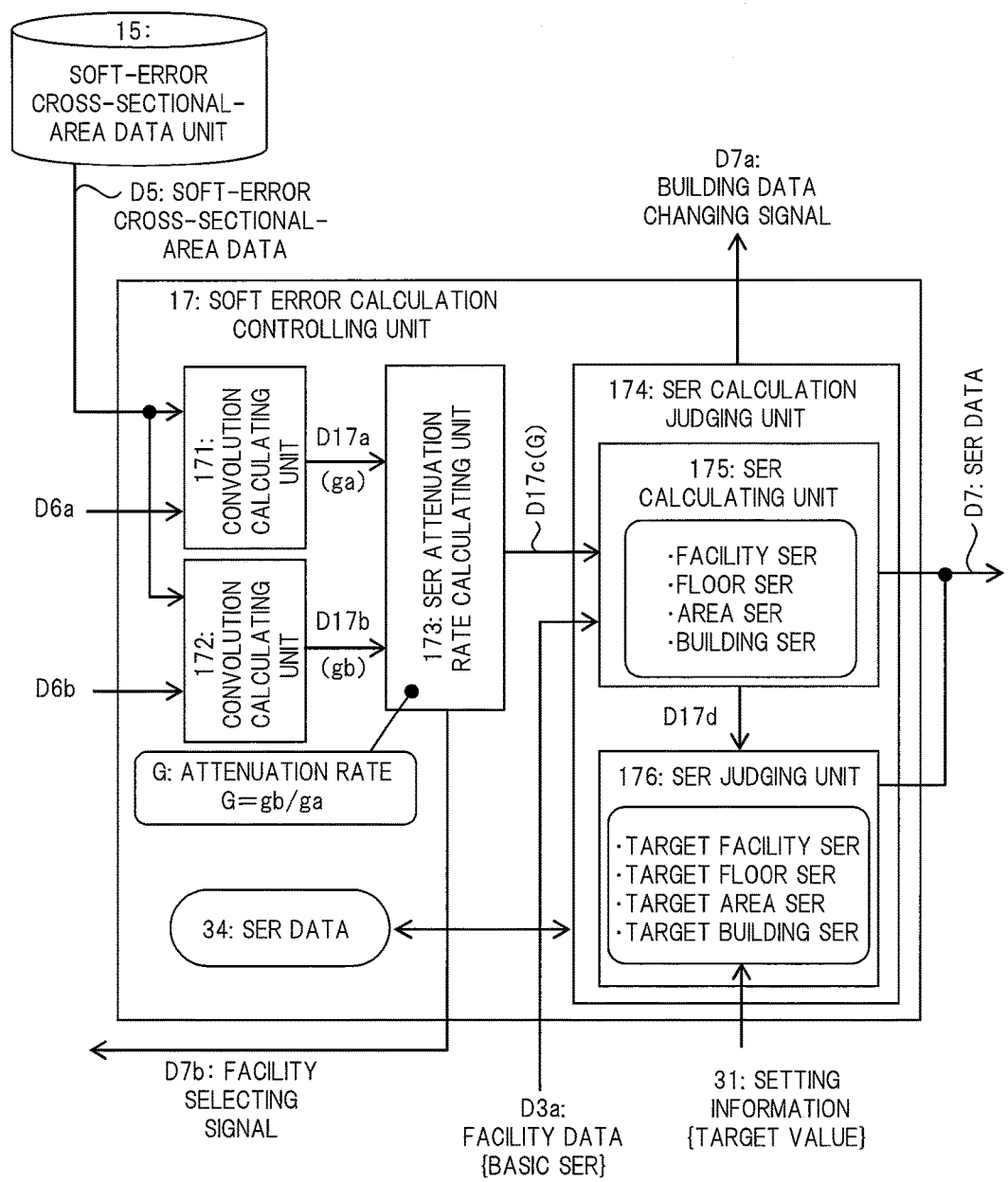
FIG. 8 is a diagram showing a configuration example of a soft-error calculation controlling unit of the first embodiment.

FIG. 8 shows a configuration example of the soft-error calculation controlling unit 17. The soft-error calculation controlling unit 17 has a first convolution calculating unit 171, a second convolution calculating unit 172, a SER attenuation-rate calculating unit 173, and a SER calculation judging unit 174. The SER calculation judging unit 174 includes a SER calculating unit 175 and a SER judging unit 176.

By using the geographically-corrected neutron spectrum data D6a, the attenuated neutron spectrum data D6b, and the soft-error cross-sectional-area data D5 of the soft-error cross-sectional-area data unit 15, the soft-error calculation controlling unit 17 calculates an attenuation rate "G" which is required for the SER calculation and which is an index value of the attenuation at the arranged position of the facility in the building. And, the soft-error calculation controlling unit 17 calculates the facility SER, etc., which is the SER at each arranged position of the facility in the building by using the attenuation rate G, the basic SER information of the facility data D3a, etc.

Moreover, the soft-error calculation controlling unit 17 calculates the building SER by computation such as summation of the facility SERs of all the facilities in the building. The soft-error calculation controlling unit 17 stores the information of the calculated facility SER, building SER, etc., as the SER data 34, and outputs the information to the input/output controlling unit 51 as the SER data D7. The soft-error calculation controlling unit 17 judges whether or not the calculated value of each of the various SERs is equal to or smaller than the set value of the target SER as being good or not good, and the judgement result information thereof is stored as the SER data 34, and is outputted to the input/output controlling unit 51 as the SER data D7.

The first convolution calculating unit 171 performs a convolution calculation of the geographically-corrected neutron spectrum data D6a with the soft-error cross-sectional-area data D5, and outputs information D17a including a pre-attenuation convolution calculation value "ga" which is the result of the calculation. The second convolution calculating unit 172 performs a convolution calculation of the attenuated neutron spectrum data D6b with the soft-error cross-sectional-area data D5, and outputs information D17b including a post-attenuation convolution calculation value "gb" which is the result of the calculation.

The SER attenuation-rate calculating unit 173 calculates the attenuation rate G about the SER by using the information D17a of the pre-attenuation convolution calculation value ga and the information D17b of the post-attenuation convolution calculation value gb. The attenuation rate G is calculated as "G=gb/ga" by taking gb/ga, which is the ratio of the pre- and post-attenuation convolution calculation values. The SER attenuation-rate calculating unit 173 outputs information D17c including the calculated attenuation rate G to the SER calculation judging unit 174. In the SER attenuation-rate calculating unit 173, the data of the calculated attenuation rate G may be stored and reused in the DB 30.

By using the information D17c including the attenuation rate G and the information of the basic SER of each facility included in the facility data D3a or the setting information 31, the SER calculating unit 175 calculates the facility SER (Ri) corresponding to the position of the facility in the building by "Ri=R×G". Based on the facility positional information 33b of the facility data D3a, the SER calculating unit 175 similarly repeats the calculation of the facility SER for all the target facilities in the building. When the SER calculation is repeated while changing the target structural object, the SER calculating unit 175 outputs the building-data changing signal D7a to the building-data storing unit 12.

The SER calculating unit 175 calculates the building SER by computation of summation of the facility SERs of all the facilities in the building. Moreover, the SER calculating unit 175 similarly calculates a floor SER which is the SER of each floor, an area SER which is the SER of each area, etc., by using the facility SER.

By using information D17d including the various SERs calculated by the SER calculating unit 175, the SER judging unit 176 performs good/not-good judgement by comparing each of the calculated values of the various SERs with the target value SER which is a judgement threshold value. The target SER is set for, for example, the setting information 31, the building data 32, or the facility data 33 by the user UA. The target SERs include a target facility SER, a target floor SER, a target area SER, a target building SER, etc.

The SER judging unit 176 compares the facility SER (Ri) of each of the plurality of facilities in the building with the target facility SER (Ti) of the facility, and determines that the SER is good if a relation of "Ri≤Ti" is established, and determines that the SER is not good if a relation of "Ri>Ti" is established. Moreover, the SER judging unit 176 compares the building SER (Rall) with the target building SER (Tall) of the building, and determines that the SER is good if a relation of "Rall Tall" is established, and determines that the SER is not good if a relation of "Rall>Tall" is established. The floor SER and the area SER can be also similarly judged.

[Neutron Data Unit]

Figure 9:
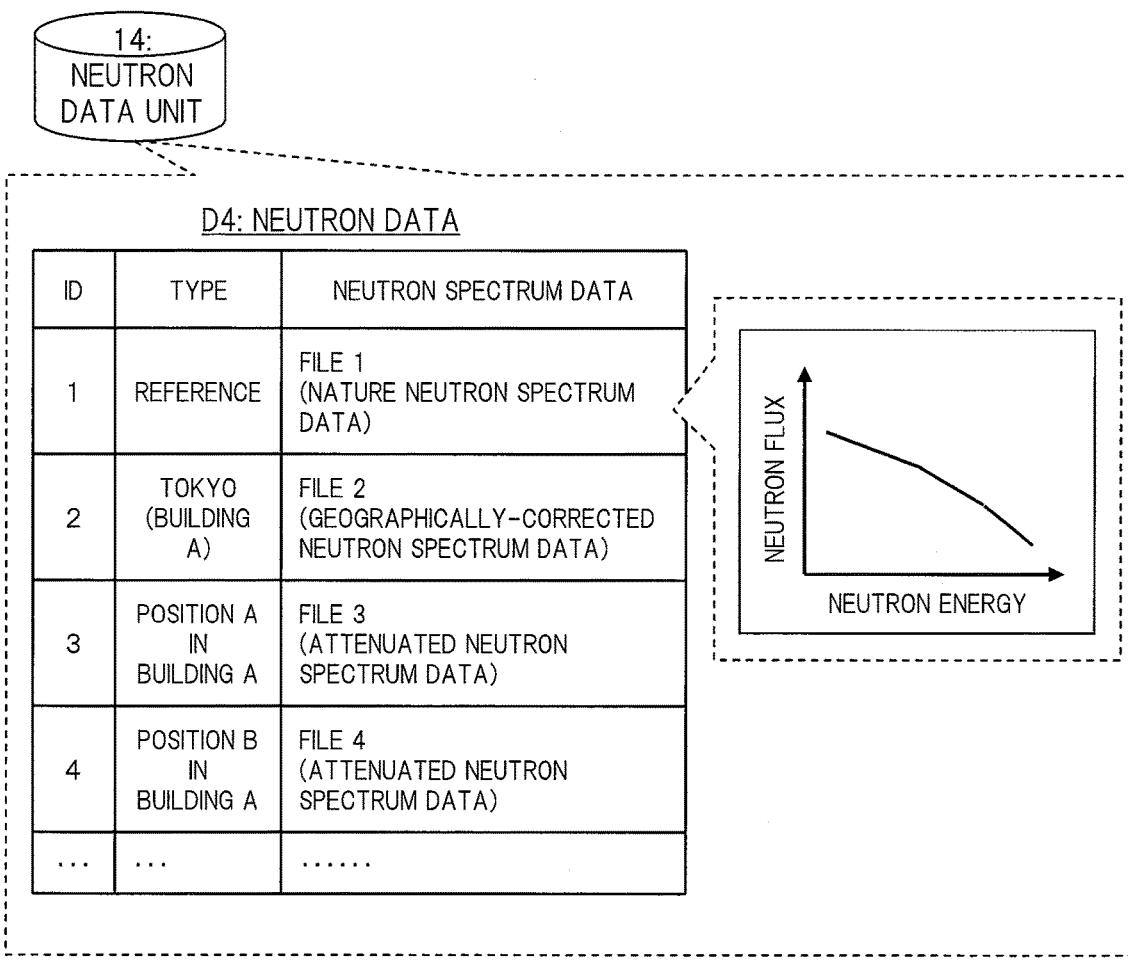
FIG. 9 is a diagram showing a configuration example of a neutron data unit of the first embodiment.

FIG. 9 shows a configuration example of the neutron data unit 14 and the neutron data D4. The neutron data unit 14 stores and manages various pieces of neutron spectrum data in, for example, a DB and a table as the neutron data D4. The table of the neutron data D4 manages, for example, an ID, a type, file information, etc., which are the identification information of the neutron spectrum data so that they are in association with one another. The type represents a type of the neutron spectrum data.

The neutron spectrum data represented by "ID=1" is the nature neutron spectrum data at the above-described reference geographical position. The neutron spectrum data is, for example, data having neutron energy on a horizontal axis and neutron flux on a vertical axis. The nature spectrum data has such a property that the higher the neutron energy is, the lower the neutron flux is.

The neutron spectrum data represented by "ID=2" shows data corresponding to the geographically-corrected neutron spectrum data D6a about, for example, a building A in Tokyo as the geographical position. The neutron spectrum data represented by "ID=3" shows data corresponding to the attenuated neutron spectrum data D6b at a position A in the building A. The neutron spectrum data represented by "ID=4" shows data corresponding to the attenuated neutron spectrum data D6b at a position B in the building A.

Note that the nature neutron spectrum data of the neutron data unit 14 may be previously stored or may be acquired from outside at the timing of the SER calculation. Note that this is not limited to neutron rays, but can be also similarly applied to radiation of other types such as alpha rays and beta rays.

The neutron spectrum will be supplementarily explained. The neutron spectrum shows energy property of a neutron dose or differential flux per unit time and unit area. In the neutron spectrum data, for example, an electron volt is used as the unit of the neutron energy on a horizontal axis, and a neutron flux is taken on a vertical axis as a counted value of neutrons. The neutron flux shows the number of neutrons which pass through a certain space during certain time. The unit of the neutron flux is shown by, for example, the number of neutrons which pass through an area of 1 $cm^2$ per 1 second. The neutron spectrum is changed by a geographical condition, position, etc.

In the first embodiment, as the nature neutron spectrum data, reference neutron spectrum data of 46 points described in Non-Patent Document 1 (JESD89A) is used. Also, the spectrum data calculated by the following Expression 1 described in Non-Patent Document 1 may be used.

$$d\phi_0(E)/dE = 1.006 \times 10^{-6} \exp[-0.35 \times (In(E))^2 + 2.1451 \times In(E)] + 1.011 \times 10^{-3} \exp[-0.4106 \times (In(E))^2 - 0.667 \times In(E)]$$

Expression 1

In Expression 1, "E" represents the neutron energy. An item "$d\phi_0(E)/dE$" represents reference neutron differential flux. An item "exp[x]" represents a base (e) to the power of "x" in a natural logarithm. An item "In(x)" represents a natural logarithm of x.

[Soft-Error Cross-Sectional-Area Data Unit]

Figure 10:
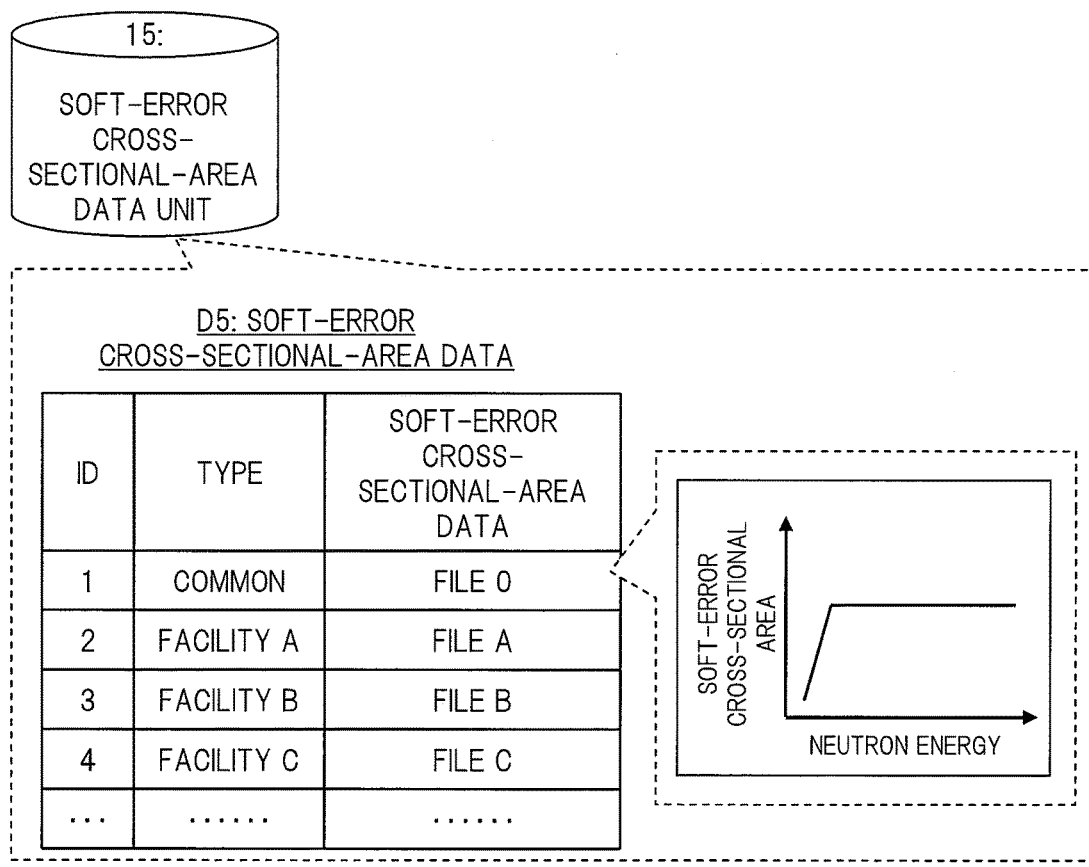
FIG. 10 is a diagram showing a configuration example of a soft error cross-sectional-area data unit of the first embodiment.

FIG. 10 shows a configuration example of the soft-error cross-sectional-area data unit 15 and the soft-error cross-sectional-area data D5. The soft-error cross-sectional-area data unit 15 stores and manages the various pieces of the soft-error cross-sectional-area data D5 in, for example, a DB and a table. In the table of the soft-error cross-sectional-area data D5, an ID, a type, and file information, which are the identification information of the soft-error cross-sectional-area data are managed in association with one another.

A type of the soft-error cross-sectional-area data represented by "ID=1" is "common", and the data is data in commonly applying regardless of the facility. The SER can be easily calculated at a high speed by applying the common soft-error cross-sectional-area data to all the facilities in the building.

A type of the soft-error cross-sectional-area data represented by "ID=2" is a "facility A", and the data is data which is applied to an individual facility or facility type (for example, server) represented by "facility A". Similarly, a type of the soft-error cross-sectional-area data represented by "ID=3" is a "facility B", and the data is the data which is applied to an individual facility or facility type (for example, storage) represented by "facility B".

The SER calculating device 1 can set the soft-error cross-sectional-area data of each of the individual facilities or facility types in the soft-error cross-sectional-area data unit 15, and the unique soft-error cross-sectional-area data can be applied to each facility in the SER calculation. If the soft-error cross-sectional-area data of each facility is used in the SER calculation, the soft-error calculation controlling unit 17 reads the soft-error cross-sectional-area data D5 corresponding to the target facility from the soft-error cross-sectional-area data unit 15 and uses the data. In this manner, the SER calculation can be performed at a high accuracy.

The soft-error cross-sectional-area data D5 may be integrated with the facility data 32, etc. In the soft-error cross-sectional-area data unit 15, the soft-error cross-sectional-area data of each typical electronic device and semiconductor device may be previously set.

The soft-error cross-sectional areas will be supplementarily explained. The soft-error cross-sectional area is an index showing energy property of easiness of occurrence of the soft error of the facility which is the electronic device. The soft-error cross-sectional area is represented by, for example, a soft-error occurrence probability such as bit inversion caused by collision of neutrons per unit area. The soft-error cross-sectional-area data is, for example, data having the neutron energy on a horizontal axis and having the soft-error cross-sectional area on a vertical axis.

[SER Data]

FIG. 11 shows a configuration example of a table of the SER data 34 of the SER calculation result of the SER calculating device 1. The input/output controlling unit 51 may display a table of the SER data 34 as shown in FIG. 11 as the SER calculation and judgement results on a screen. The table of the SER data 34 has a column having an ID which is the identification information of the SER data and a row, respective identification information of the type of the SER data, the building, the floor, the area, and the division area, the identification information of the facility, the target SER, the SER of the calculation result, and the SER judgement result.

The column of the type shows, for example, a building SER in a case of "building", a floor SER in a case of "floor", an area SER in a case of "area", and a facility SER in a case of "facility". The columns of the building, floor, area, and division area show targets of the SER calculation, and a column in a case of the facility SER is information showing the position of the facility in the building. In the present example, note that the area and the division area are different from each other. The area is any section, etc., on the floor. The division area shows an area which is set for the SER calculation and which is divided by a mesh or others shown in FIG. 14 described later. The table of the SER data 34 may further have a column of position coordinates, etc.

In the column of the target SER, the values of each target SER based on the setting information 31 is stored. For example, in a case of the building SER, the value of a target building SER is stored therein. In the column of the SER, the value of the SER which is the calculation result of the corresponding type is stored. In the column of the judgement result, a flag value of being good (OK) or not good (NG), which is a result of the SER judgement processing is stored.

[Neutron Soft Error and SER]

The soft error including the neutron soft error and the SER will be supplementarily explained. By the entering of the radiation such as neutron rays existing in the nature into a semiconductor device, the soft error stochastically occurs. The soft error is a temporary error and is distinguished from a hardware error such as hardware malfunction. A conventional soft error is mainly a phenomenon of inversion of single bit of a memory element. However, recently, a phenomenon of inversion of a plurality of bits at one time, a phenomenon of inversion of retained data of a logical element, etc., have become obvious. The phenomenon of inversion of single bit is also referred to as SEU (Single Event Upset).

The radiation such as neutron rays enters many electronic devices such as servers arranged in a building such as a data center from outside of the building. In this manner, the neutron soft error in semiconductor devices which are components of the electronic devices are stochastically generated. Intermittent failure due to the neutron soft error affects the reliability and performance of facilities and systems.

In the neutron rays, for example, neutron rays in a low energy band can be attenuated by the shielding by the structural object of the building. The structural object is a wall, a floor, etc., made of a material such as concrete. The SER calculating device 1 performs the SER calculation in consideration of the effect of this attenuation. If the neutron rays which enter the building and the electronic device can be attenuated by a shielding object such as concrete, the neutron soft error rate of the electronic device can be reduced.

Also, about a difference in the neutron dose between inside and outside of the building, it is known that the neutron dose is attenuated by the building. Particularly, it is known that the dose rate of neutrons on the same floor of a building is gradually reduced from the outer periphery of the building or outdoors toward center of the building.

JEDEC Standard No. 89A (JESD89A), which is Non-Patent Document 1, describes a calculation of neutron flux shielding by concrete of a building in A.5 (Effects of shielding by buildings and other material (cont'd)) on page 69. The following Expression 2 is described as Expression A.12 in A.5, on page 69.

$$\phi = \phi_0 \exp(-x/0.37) \qquad \text{Expression 2}$$

In Expression 2, "$\phi_0$" represents initial neutron flux, "$\phi$" represents attenuated neutron flux, and "$x$" represents a thickness of the concrete. Expression A.12 shows that the thicker the concrete which is the shielding object is, the more the neutron flux is attenuated in the property based on an exponential function.

In consideration of the above-described publicly-known information, for the facility arranged in the building, the SER calculating device 1 calculates the SER reduced by the attenuation effects by the radiation shielding by the structural object between the facility and the outside of the building. In the first embodiment, FIT (Failures-In-Time) is used as the unit of the SER. The FIT is an occurrence rate of failure, etc., per time. "1 FIT" represents an occurrence rate of one time in $10^9$ hours.

[Data Input Screen]

Figure 12:
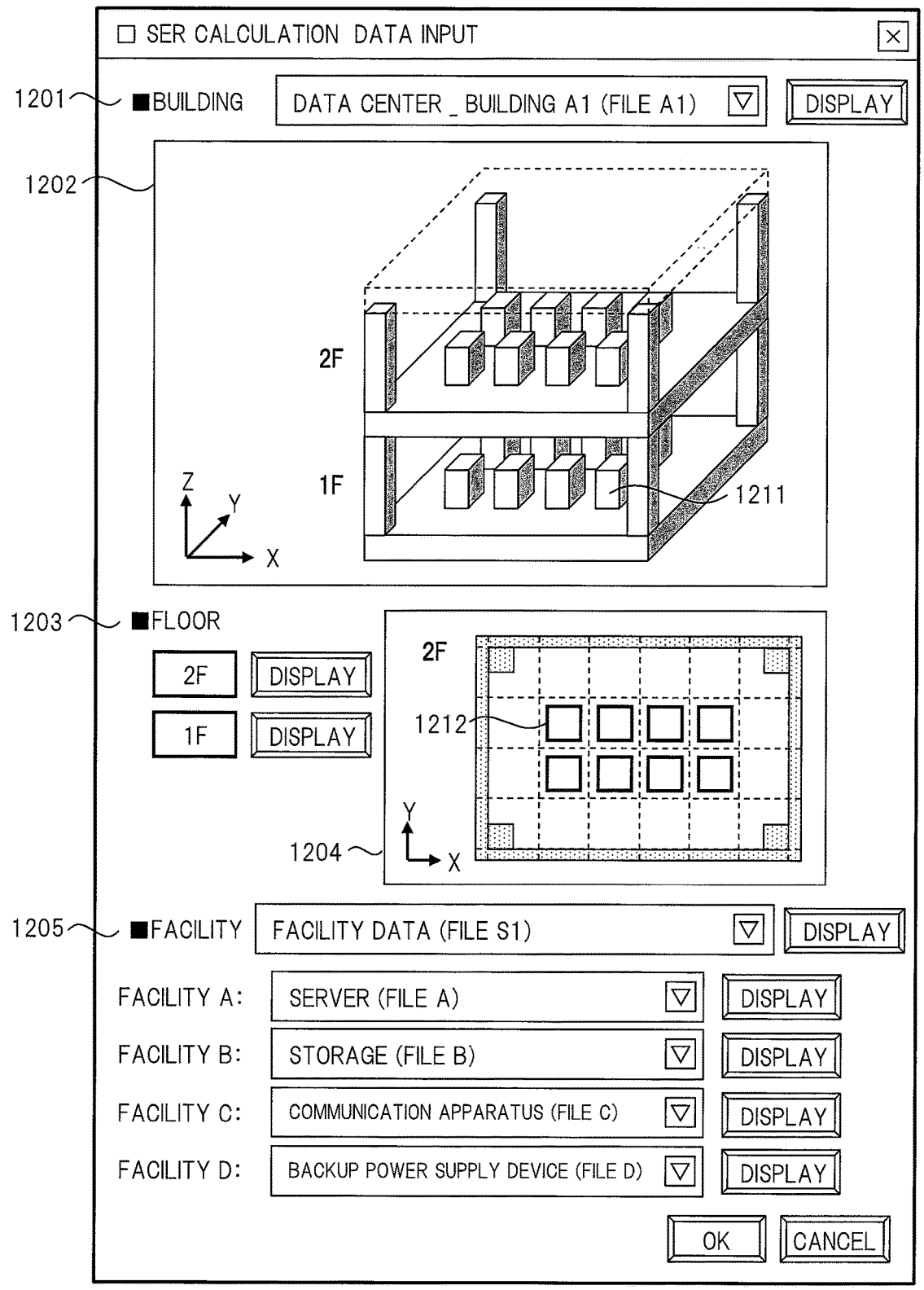
FIG. 12 is a diagram showing a screen example of data input of the first embodiment.

FIG. 12 shows a data input screen as a screen example provided by the input/output controlling unit 51 of the SER calculating device 1. On this screen, the building data 32 and the facility data 33 can be inputted, checked, and edited by the user UA. On the data input screen, in an item 1201, a file, etc., of the building data 32 to be inputted can be specified by the user UA. In an item 1202, the structure of the building based on the building data 32 specified in the item 1201 is displayed in a three-dimensional format of (X, Y, Z). In an item 1202, if the facility data 33 of the facility arranged in the building is specified, the building and the facility are displayed together. An item 1211 is an example of the facility.

In an item 1203, a floor in the building specified in the item 1201 is specified by the user UA, and the configuration of the specified floor is displayed in a two-dimensional format in an item 1204. In the item 1204, if the facility data 33 of the facility arranged on the floor is specified, the floor and the facility are displayed together. An item 1212 is an example of the facility.

In an item 1205, a file, etc. of the facility data 33 to be inputted can be specified by the user UA. The contents of the facility data 33 to be inputted include the facility positional information 33b showing the arrangement of each facility in the building. Moreover, the item 1205 shows an example in which the file of the facility data 33 of each facility of a plurality of types can be inputted. The facility types have, for example, a facility A to a facility D, such as a server, a storage, a communication device, a backup power supply device, and others. The contents of the facility data 33 specified in the item 1205 may be displayed in the item 1202 or the item 1204, or information of only the facility may be displayed on another screen or in an item not shown.

[Data Output Screen]

Figure 13:
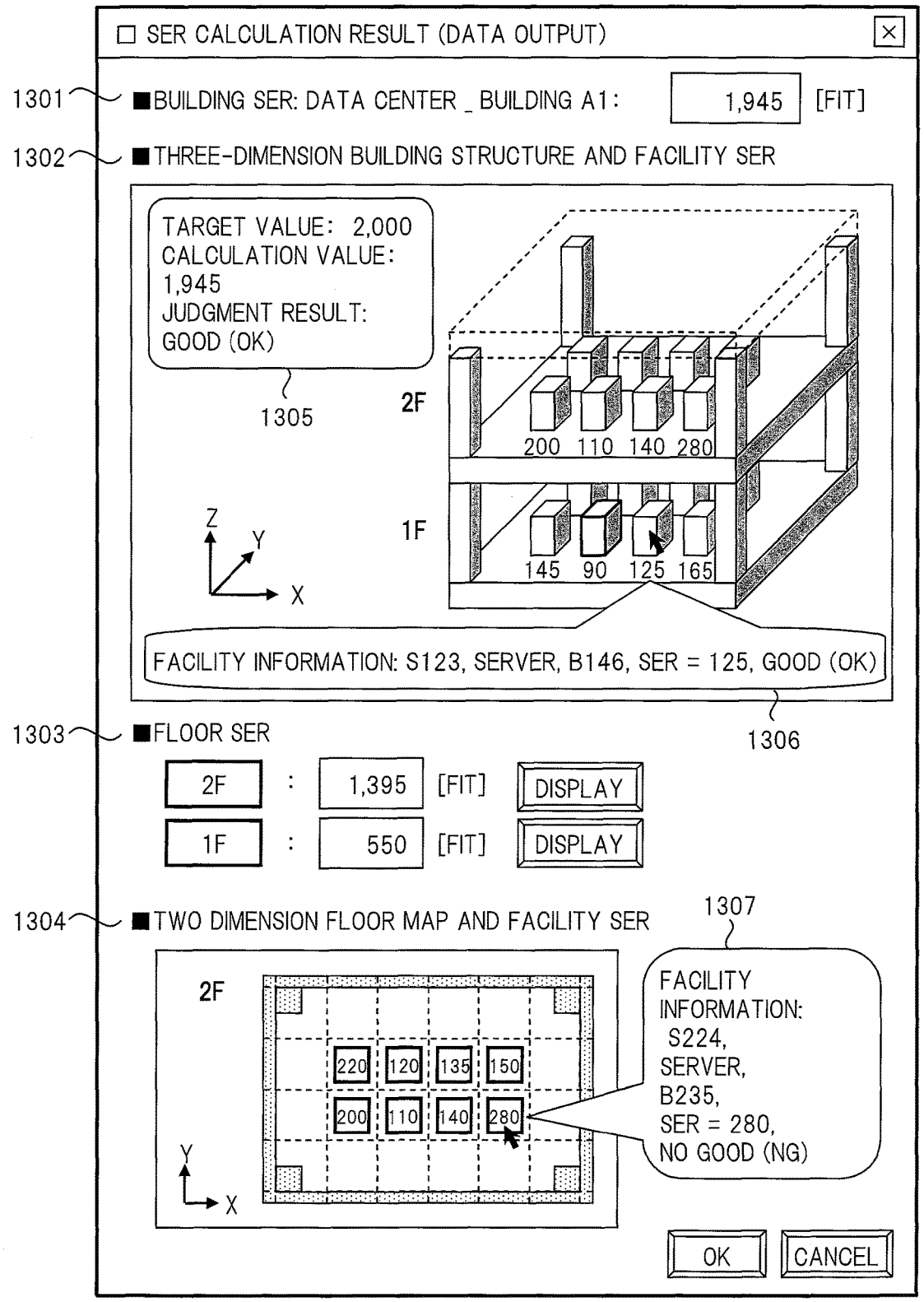
FIG. 13 is a diagram showing a screen example of a soft-error-rate calculation result of the first embodiment.

FIG. 13 shows a data output screen including the SER calculation result as a screen example provided by the input/output controlling unit 51 of the SER calculating device 1. The SER calculating device 1 displays the results of the SER calculation and judgement processing described above on a data output screen while using the building data 32 and the facility data 33 in a state in which a plurality of facilities are arranged in a building as input data. On this screen, the results of the SER calculation and judgement can be checked by the user UA, and the results can be outputted as data.

On the data output screen, the input/output controlling unit 51 displays the information of the structure of the building, the arrangement of the facility in the building, the facility SER at each position of the facility, etc. in a format specified by the user UA or by previous setting. This format is a format indicating how to show the data information, and can be selected from a plurality of formats including a two-dimensional format and a three-dimensional format.

On the data output screen, an item 1301 displays a building SER of a target building. Based on the building data 32, the facility data 33, and the SER data 34, an item 1302 displays information such as the structure of the building, the arrangement of the facility in the building, the facility SER at each position of the facilities, and others in a three-dimensional format of (X, Y, Z). In the present example, the item 1302 displays the building in a direction viewed from an oblique upper side, and displays the facility SER of each of the facilities which are seen so as to be next to each other on one side of the building. As the displayed contents of the item 1302, a direction in which the building is viewed, a viewed part of the building, a size thereof, etc., can be appropriately changed by operations of the user UA.

An item 1305 displays a building SER, a target value, and a judgement result. If a facility is selected in the item 1302 by an operation of the user UA, the input/output controlling unit 51 displays detailed information of the facility in an item 1306. The detailed information of the facility includes, for example, the ID, type, position, facility SER, judgement result, etc. of the facility based on the facility data 33, the SER data 34, etc. The item 1306 may display them in pop-up display, or in another item or screen. In the present example, the item 1306 displays 5123 as the facility ID, a server as the facility type, a division area B123 as the arranged position of the facility, 125 as the facility SER, and being good as the SER judgement result.

An item 1303 displays the floor SER of each floor of the target building. An item 1304 displays information such as the configuration of the floor specified by the user UA in the item 1303, the arrangement of the facility on the floor, and the facility SER of each facility in a format of a two-dimensional floor map of (X, Y). In the present example, the item 1304 displays the value of the facility SER inside a frame showing an outer shape of the facility. Moreover, if a facility is selected by an operation of the user UA in the item 1304, the input/output controlling unit 51 displays detailed information of the facility in an item 1307.

The input/output controlling unit 51 may directly display the SER judgement result information, for example, in the item 1302 or the item 1304 on the above-described screen. The displayed information may be, for example, information of being good (OK) or not good (NG) or may be information of changing a color or a shape of the facility depending on the good/not-good state. For example, the facility having a result as being not good may be displayed with a red color. In this manner, the user UA can easily recognize the facility whose SER does not satisfy the condition of the target value, and easily examine the design change, etc., of the facility.

[Floor Map and Division Area]

Figure 14:
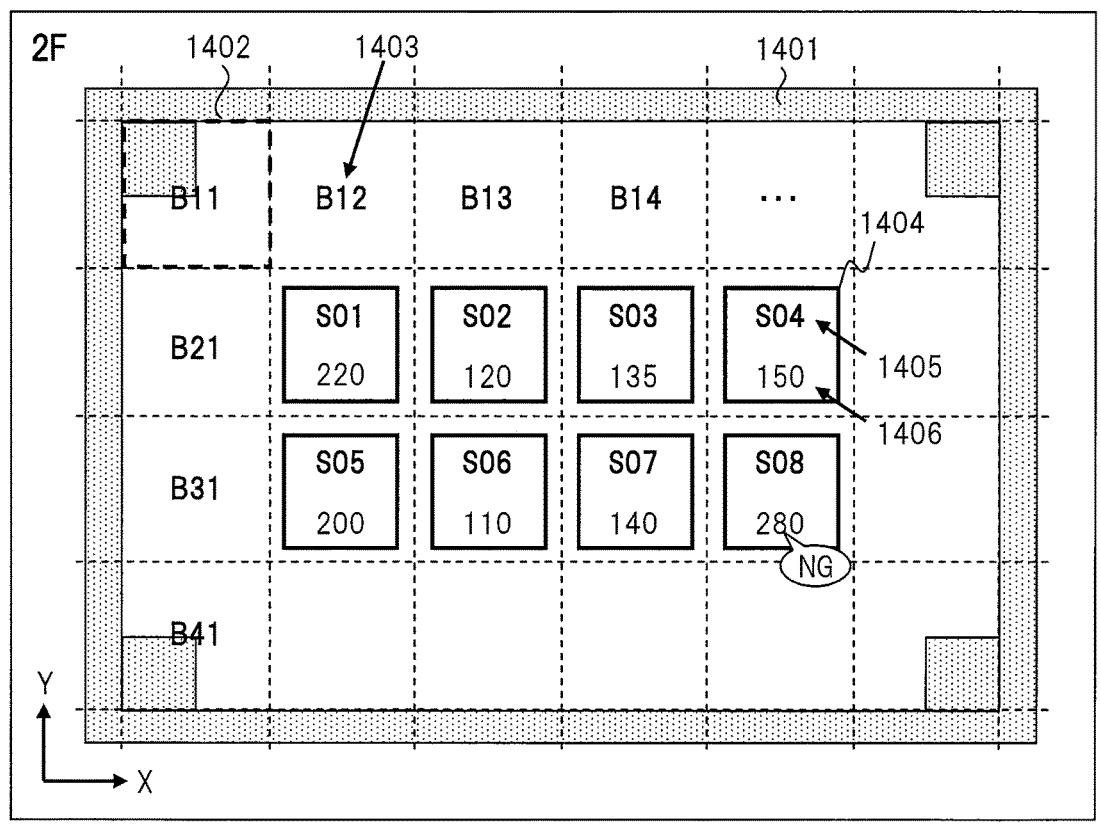
FIG. 14 is a diagram showing a first configuration example of a two-dimensional floor map of the first embodiment.

FIG. 14 shows a configuration example of display of the two-dimensional floor map and the facility SER in the item 1304 of the screen of FIG. 13. This floor map is a display example in the X-Y plane format of the floor of the building. If the structural object 1401 such as a wall and a pillar existing on the floor and the area sectioning the floor are set based on the building data 32, the facility data 33, the SER data 34, etc., this floor map displays information such as the configuration of the area, the configuration of the below-described division area, the shape of each facility arranged on the floor, and the ID and the facility SER of each facility. The area may be a region sectioned by, for example, a wall.

The division area is a two-dimensional or three-dimensional region which is set and managed for the SER calculation in the SER calculating device 1. A plurality of division areas 1402 shown by broken lines are formed by dividing the entire X-Y plane region including the floor of the building into a mesh form of a shape such as a square having a predetermined size. Moreover, in the three-dimensional space of (X, Y, Z), the division area is formed by, for example, a cube or cuboid region. The division area 1402 is identified by a division area ID 1403. The division area ID 1403 is represented by, for example, a number of the mesh matrix or others. The plurality of division areas 1402 have the same shape as each other.

The division area may be automatically generated by the SER calculating device 1 in the SER calculation or may be manually set by the user UA. The information of the division area is stored in, for example, the setting information 31 or the building data 32. The information of the division area 1402 is displayed in the item 1304 in accordance with the setting or the specifying by the user UA.

On the floor, for example, a facility 1404 is arranged in the division area 1402. The arrangement correspondence between the division area 1402 and the facility 1404 is not limited to one to one. The facility 1404 is identified by a facility ID 1405. In the facility 1404, information such as the facility ID 1405, a facility SER 1406, and others are displayed based on the facility data 33 and the SER data 34. The facility 1404 may be displayed so as to be changed with a color or a shape in accordance with the facility type, the facility SER, and/or the SER judgement result. In the facility 1404, the good/not-good information of the SER judgement result may be displayed.

Figure 15:
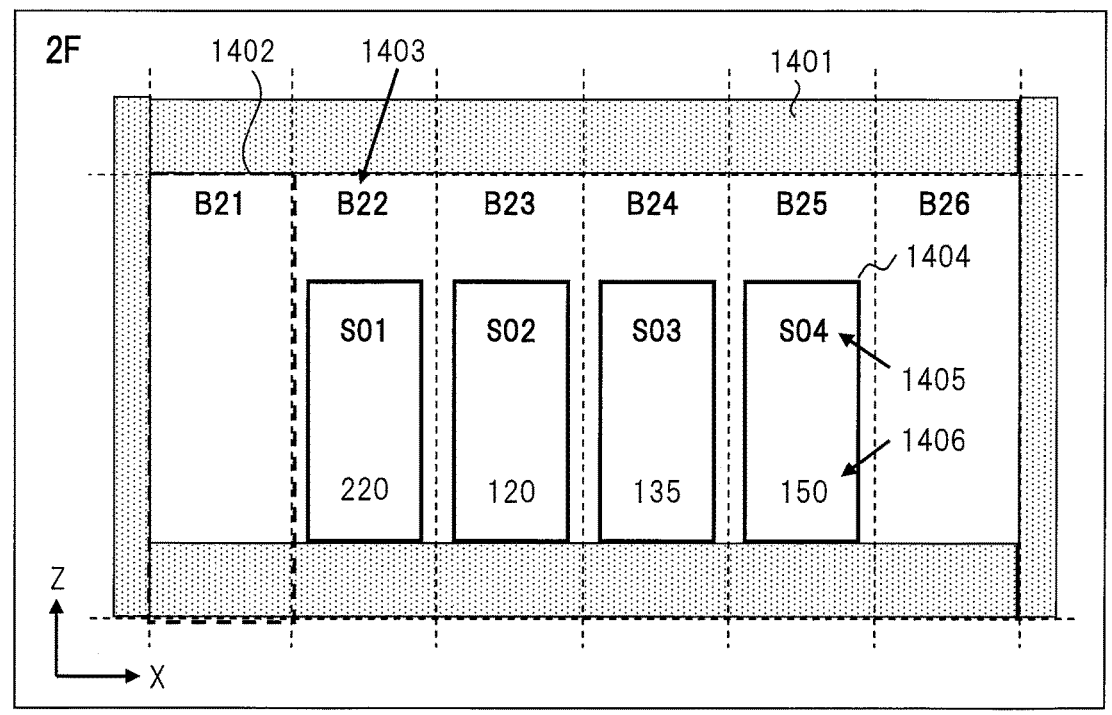
FIG. 15 is a diagram showing a second configuration example of a two-dimensional floor map of the first embodiment.

FIG. 15 shows a display example in a X-Z cross-sectional format of the building as another display configuration example of the above-described two-dimensional floor map and the facility SER. On the data output screen, the user UA can specify and display a surface which is desired to be seen. The division area 1402 is such an example as being set as a cuboid which is long in a Z-direction so as to be one division area in a vertical direction of the floor. In the facilities 1404, an example of arrangement of a server rack or others which is long in the Z-direction is shown.

The SER calculating device 1 automatically divides the entire space region in the building into the division areas based on the setting of the division area, and calculates the facility SER in accordance with the position of the division area where the facility is arranged. In this case, the facility SER can be also interpreted as the SER in the division area unit. A spatial position corresponded to each division area can be set by, for example, a gravity center point. For example, the gravity center point of the division area is automatically set as position coordinates.

A target position for the SER calculation and the division area which is a unit region corresponding to this position can be set in accordance with a required resolution capability. For example, on a setting screen of later-described FIG. 16, the user UA can set the size of the mesh of the above-described division area in accordance with the size of the target building, the quantity of the facilities, etc. The SER calculation can be performed relatively at high speed if the size of the division area is large while can be performed relatively with high accuracy if it is small.

[Setting Screen]

FIG. 16 shows an example of a setting screen provided by the input/output controlling unit 51 of the SER calculating devices 1 of the first embodiment and the second embodiment. On this setting screen, various pieces of the setting information 31 can be set by the user UA. Note that a similar setting screen is provided in the later-described second embodiment, and an item 1606 and an item 1611 are used in the second embodiment.

On the setting screen, in an item 1601, a target value of the building SER can be set. In an item 1602, a target value of the floor SER of each floor can be set. In an item 1603, for example, a target value of the facility SER of each facility type can be set. For example, a different value can be set for each facility type such as a server, a storage, a communication device, and a backup power supply device. The item 1603 is not limited to them, but may be able to set a target value for each individual facility or a certain target value regardless of any facility. In the present example, each target value is set as an allowable value and a judgement threshold value. Two or more threshold values may be set for one SER. In that case, the SER judgement result is categorized as a ternary or more value instead of a binary value.

An item 1612 of the item 1603 shows an example in which the degree of importance or a protection level can be set for each facility. The degree of importance is the degree of importance about the facility itself or the handled data stored in the facility. The protection level is the level of protection against the soft error about the facility, and is a unique index value for preventing erroneous operations even when exposed to radiation. The item 1612 can be selected and set by the user UA from, for example, some levels. The setting unit 52 may automatically set the target SER in accordance with the level set in the item 1612. In that case, the user UA can elimination the setting of the target SER. As the facility data 33, the information of the above-described level may be set.

In an item 1604, property information of each structural object configuring the building can be set. In the item 1604, for example, an attenuation coefficient which is property in accordance with a material such as concrete or iron steel and the material of the structural object or others can be set for each of the individual structural objects or each type thereof. Note that the SER can be calculated even if the setting of the item 1604 is eliminated.

In an item 1605, the above-described division area can be set. In the item 1605, for example, a size of a mesh configuring the division area can be selected and set by the user UA. Note that the SER can be calculated even if the setting of the division area of the item 1605 is eliminated.

[Calculation Model]

Figure 17:
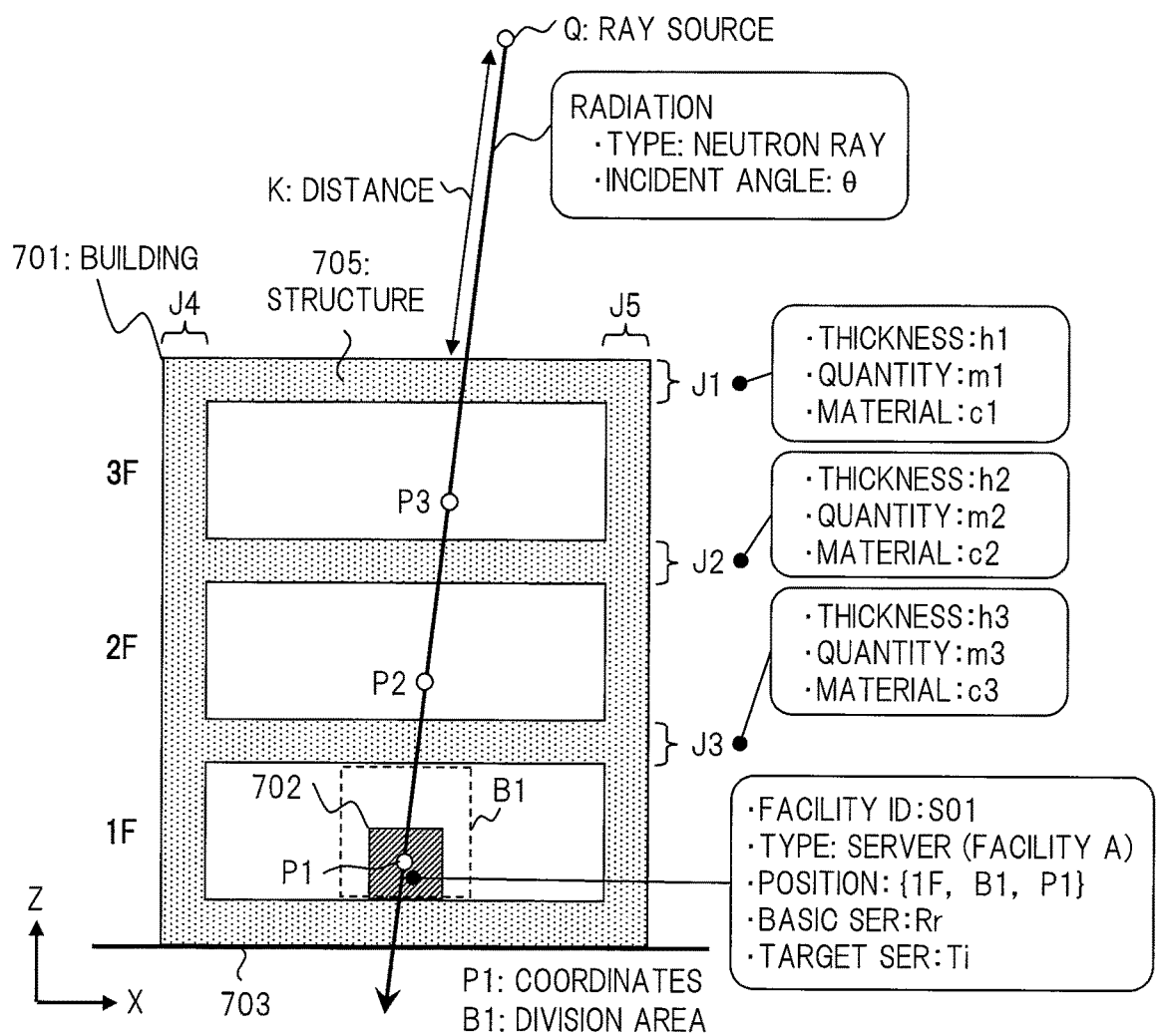
FIG. 17 is a diagram showing an example of a calculation model of the first embodiment.
Figure 18:
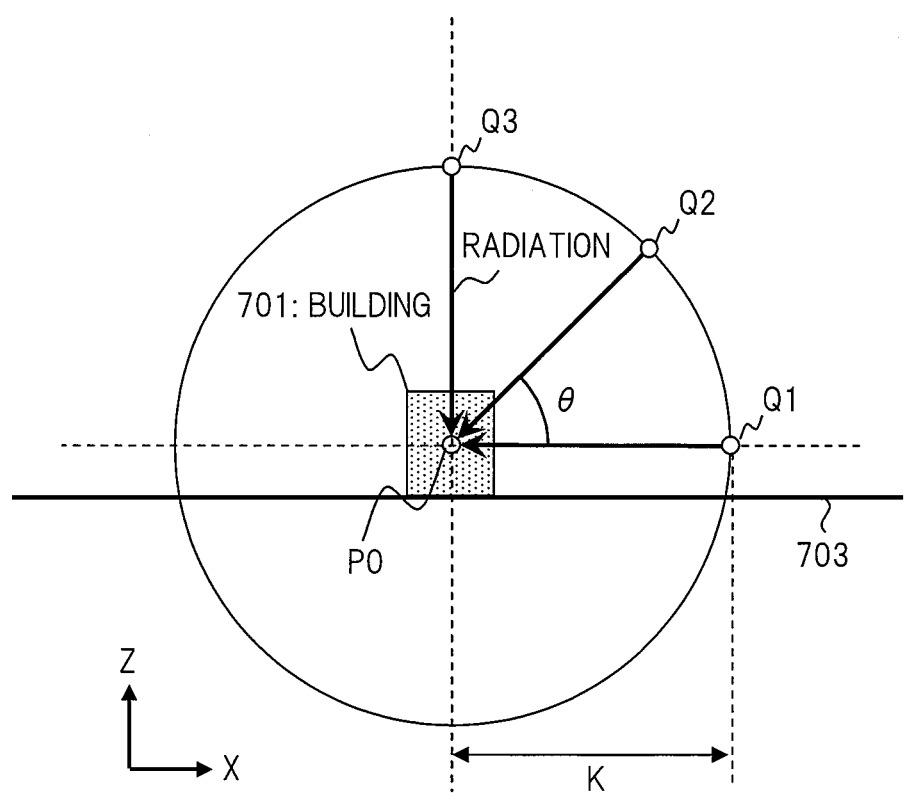
FIG. 18 is a diagram showing an example of a radiation source of the first embodiment.

As supplements about the first embodiment, FIG. 17 and FIG. 18 briefly show a model used for calculating the SER. This calculation model is a model for calculating the facility SER based on the attenuation rate G at each arranged position of the facilities in the building calculated by reflecting the attenuation effect caused by the radiation shield because of the structural body of the building. This calculation model includes a radiation model including the entrance of the radiation from an external ray source to the building and a model of a shield structure by the building.

(1) First, the model about the building and the facility is described below. Based on the building data 32, the structural body of the building has a three-dimensional shape of (X, Y, Z), and has the structural objects such as a floor, a ceiling, a beam, a wall, and a pillar as components. The structural objects become radiation shielding objects. The radiation which has entered the building is shielded and attenuated by the shielding objects. Here, an example in which the neutron rays which are radiation enter a building 701 and a ground surface 703 from a Z-direction which is a vertical direction is briefly described.

In the example of FIG. 17, the structural body of the building 701 is a three-story structural body on the ground surface 703. The building 701 has structural objects J1 to J3 and structural objects J4 and J5 as a structural object 705. The structural objects J1 to J3 are structural objects such as flat-plate-shaped floor or ceiling in an X-direction and a Y-direction horizontal to the ground surface 703. The structural objects J4 and J5 are structural objects such as a wall in the Z-direction vertical to the ground surface 703.

For example, a facility 702 serving as a target of the SER calculation is arranged at a coordinate "P {X, Y, Z}" at a certain position on a first floor denoted by "1F" of the building 701 and in a division area "B1" corresponding to this position. The facility 702 has "S01" as a facility ID, is, for example, a server as a facility type, and is in the division area "B1" and at a coordinate "P1" on the first floor as a facility position. For the facility 702, a basic SER (Rr) and a target facility SER (Ti) are set as the facility property information 33c.

There are the three structural objects J1 to J3 between a portion above the facility 702 and outside of the building in the Z-direction. The first structural object J1 corresponding to a third-floor ceiling has "h1" as a Z-direction thickness, "m1" as a quantity, "c1" as a material, and "g1" as an attenuation coefficient. Similarly, the second structural object J2 corresponding to a second-floor ceiling has "h2" as a Z-direction thickness, "m2" as a quantity, "c2" as a material, and "g2" as an attenuation coefficient, and the third structural object J3 corresponding to a first-floor ceiling has "h3" as a Z-direction thickness, "m3" as a quantity, "c3" as a material, and "g3" as an attenuation coefficient.

The attenuation coefficient g is an attenuation rate of each structural object. As the attenuation coefficient g, a different value can be set in accordance with the material, thickness, quantity, etc. of the structural object. For example, the attenuation coefficient g about the neutron rays may be set as a value of each material. Alternatively, if simple calculations are performed, the attenuation coefficient g may be set as a constant value regardless of the material.

Herein, for simple explanations, the structural objects J1 to J3 are assumed to be the same unit structural objects as each other, and the attenuation coefficients g1 to g3 which are the attenuation coefficients g are assumed to be the same as each other and be a constant value. The quantities m1 to m3 are 1. The thicknesses h1 to h3 are assumed to be the same as each other and be a thickness h. The materials c1 to c3 are the same as each other and are, for example, concrete of a predetermined type.

The radiation that enters from outside of the building 701 in the Z-direction passes through each of the structural objects J1 to J3 until it reaches the position of the facility 702. The radiation is attenuated by the shield at the passed structural object 705. By the attenuation, for example, the neutron dose of the neutron rays is reduced, and the shape in the neutron spectrum data is changed.

(2) The radiation model is as described below. In the example of FIG. 17, a ray source Q is a radiation source outside the building 701, and is a neutron source here. An incident angle "θ" of the radiation is about 90 degrees when the ground surface 703 is at 0 degree. A distance "K" is a distance between the building 701 and the ray source Q. The radiation radiated from the ray source Q enters the model of the building 701 and passes through an inside of the building 701. The larger the distance K between the ray source Q and the building 701 is, the more the attenuation of the radiation that enters the building is. The distance K may be set based on the publicly-known information so as to be the same as the radiation dose of the nature. The distance K may also be previously set as a constant value. It is desired to calculate the attenuation rate G by using the distance K or a parameter representing the intensity of the ray source Q.

As the information of the neutron source, the above-described neutron-source setting unit 161 sets information of the position of the ray source Q, the distance K, the incident angle θ or direction, the radiation intensity per unit time, and others. The information of the neutron source may be set by the user UA as the setting information 31.

FIG. 18 briefly shows the radiation model. In the model of FIG. 17, the ray source Q is arranged above the building 701 in the Z-direction. However, in detailed calculations, as shown in FIG. 18, a plurality of ray sources Q are set on a spherical surface having a radius of the distance K with taking the building 701 as a central point. A point "P0" is assumed to be a central position of the building 701 in a three-dimensional space. A ray source Q1 is one radiation source in the X-direction horizontal to the ground surface 703 and has an incident angle "θ=0 degree". A ray source Q3 is one radiation source in the Z-direction vertical to the ground surface 703 and has an incident angle "θ=90 degrees". For example, the building 701 positioned below in the Z-direction is uniformly radiated with the radiation rays from the ray source Q3.

If the attenuation calculation is performed in detail, the SER calculating device 1 performs the calculation by computation of total of the influences which are caused by the entrance of the radiation from each of the plurality of radiation sources Q on the spherical surface. And, if the attenuation calculation is simply performed, the SER calculating device 1 performs the calculation while appropriately reducing the number of the radiation sources Q.

[Effect and Others]

According to the first embodiment, the SER can be calculated and judged for the soft errors including the neutron soft error of the facilities including an electronic device arranged in a building such as a data center and configuring a system of the data center or others. In this manner, for the building and facility, high reliability because of the low SER can be achieved and ensured.

According to the first embodiment, by the SER calculating function, the attenuation rate and SER at each facility position in a building to which the attenuation effect caused by the shield of the radiation including the neutron rays by the structural bodies of the building are reflected can be calculated. Moreover, by the SER calculating function, the SER in each of various units such as the facility, floor, area, and building can be calculated. Moreover, by the SER judging function, it can be judged whether the calculated value of the SER in the unit of the building or facility satisfies the condition of the target value or not.

On a screen including the SER calculation and judgement results shown in FIG. 13 or others, the user UA can reference and check the SER at each arranged position of the facilities in the building and the calculated value of each of the various SERs such as the entire building SER as an index value of the soft error. Moreover, on the above-described screen, an automatic judgement result of the SER can be referenced and checked. According to the information of the magnitude and/or the good/not-good information of each of the above-described various SERs, the user UA can understandably judge the degree of the easiness of the soft error in the arrangement of the facility in the building and appropriateness of the arrangement of the facility in the building.

In this manner, the user UA can easily consider such a design of the building and facility as reducing the SER. Based on the reference of the above-described result, the user UA can also change the state of the arrangement of the facility in the building on the screen of FIG. 12 or others. The user UA, for example, changes the arrangement of the facility having the SER judgement result as being not good, and causes the SER calculating device 1 to execute the above-described SER calculation and judgement again while using the changed facility data 33, etc. as the input data. In this manner, on a screen shown in FIG. 13 or others, the user UA can similarly check the SER in the changed state or others.

Modification Example

As a modification example of the first embodiment, the following manner is possible. The SER calculating device 1 of the modification example has a building-property calculating function. This function calculates an index value of the building property about the SER reduction or radiation attenuation by using the building data 32 as the input data. This function does not require the facility data 33 of the information of the facility arrangement in the building as the input data. This function is for calculating the above-described index value of each position in the building or each division area associated with the position by the input of the building data 32 including a building structure in a state in which the facilities are not arranged in the building and by the usage of the calculation model including the above-described shield structure model of the building. The index value of the above-described building property is calculated as the index value using the above-described attenuation rate G at each position in the building.

Figure 19:
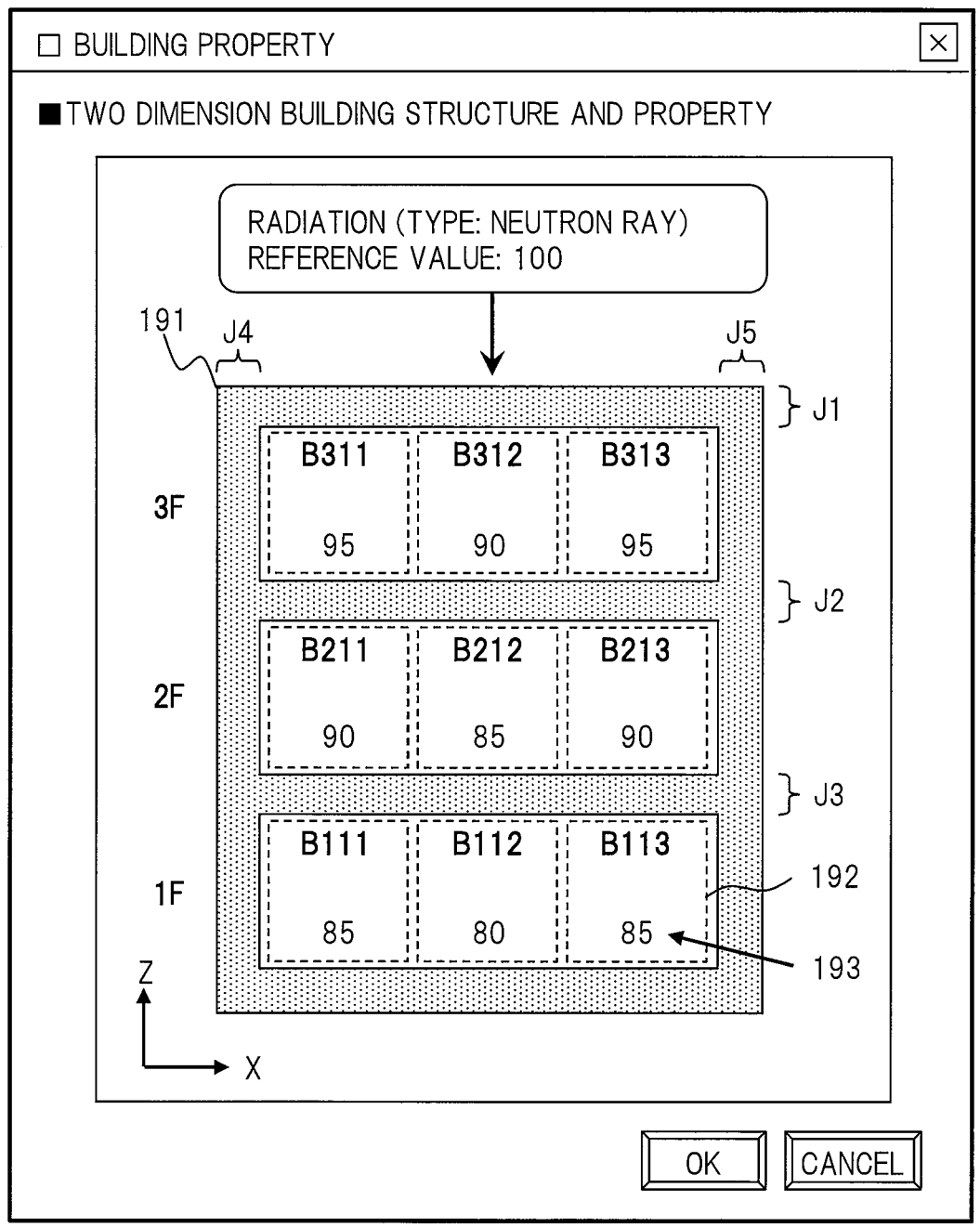
FIG. 19 is a diagram showing a screen example according to a modification example of the first embodiment.

FIG. 19 shows a screen example of data output of the building property information by the building-property calculating function. The user UA specifies execution of the building-property calculating function from, for example, a menu on the screen. On the other hand, the building-property calculating function generates a screen including the information of the above-described index values by the input/output controlling unit 51 and displays that to the user UA. This screen displays the building structure, for example, two-dimensionally, and displays the information of the above-described index values. In the present example, the building structure is shown on an X-Z cross-sectional surface, and the information of the division area corresponded to the position in the building is displayed.

The present example has a three-story building 191 based on the building data 32, the structural objects J1 to J3 such as a floor and a ceiling as the structural objects configuring the building, and others. Each floor has three division areas 192. And, for each of the division areas 192, an index value 193 which is the building property using the above-described attenuation rate G is displayed.

In the present example, for example, the amount of neutron rays which are the radiation entering the building from outside is assumed to be 100 as a reference value. For each of the division areas 192 which are positions in the building, the building-property calculating function calculates and displays the index value 193 representing the degree of the radiation attenuation caused by the structural object and the degree of the SER reduction. The form of the display of the index value 193 is not limited to the present example, but others are possible.

A division area represented by "B312" in the middle of a third floor represented by "3F" is assumed to have an attenuation rate "G=90/100=0.9". Correspondingly, the building-property calculating function displays the index value 193 of the position of the division area B312 as, for example, 90. This index value 193 shows that 10 of 100 of the external radiation is shielded by the structural object J1, etc. at this position and that 90 thereof transmits therethrough and reaches this position. Meanwhile, in division areas B311 and B313 at the positions close to the outer wall structural objects J4 and J5 on the third floor, the index value 193 is 95. It can be understood that the index value 193 is smaller and the attenuation effect is larger in the position close to the center inside the building than the position close to the outer wall on the same floor.

Similarly, in a division area B212 at the center of a second floor, the index value 193 is assumed to be 85 so as to correspond to, for example, an attenuation rate "G=0.85". It shows that 15 of 100 of the external radiation is shielded by the structural objects J1, J2, etc., and 85 thereof transmit therethrough and reach this position. It can be understood that the index value 193 is smaller and the attenuation effect is larger in a position on a low floor than a high floor of the building in the Z-direction.

The user UA can check the property of the radiation attenuation or the SER reduction for each of the positions in the building by referencing the building property information on the above-described screen. The user UA can understand that, for example, the SER reducing effect is larger at a position having the smaller index value 193. In this manner, the user UA can effectively utilize the information in designing of the arrangement of the facilities in the building or others. The user UA can design, for example, a facility having a large basic SER or a facility having a low target SER so as to be preferentially arranged at the positions having the low index values 193.

In the case of the building-property calculating function of the modification example, note that it is not required to calculate absolute SERs since high/low (good/bad) of relative SERs at the positions in the building are calculated and displayed. Therefore, the SER calculating device 1 can calculate the above-described index value in a simple form of the calculation model including the above-described information of neutron sources, etc.

Second Embodiment

Next, the SER calculating device 1 of the second embodiment of the present invention will be explained by using FIG. 20 to FIG. 29. The SER calculating device 1 of the second embodiment provides a design changing function which is a function which supports the design of the arrangement of the plurality of facilities including the electronic device in the building and which changes the design. The design changing function provides a function which not only supports a manual design by the user UA but also automatic generation and submission of an optimum or effective design plan. In order to reduce the SER, the design changing function includes a function to analyze the arrangement and SERs of the facilities in the building and change the design of the facilities and a function to analyze the structure and SER of the building and change the design of the building.

[SER Calculating Device]

Figure 20:
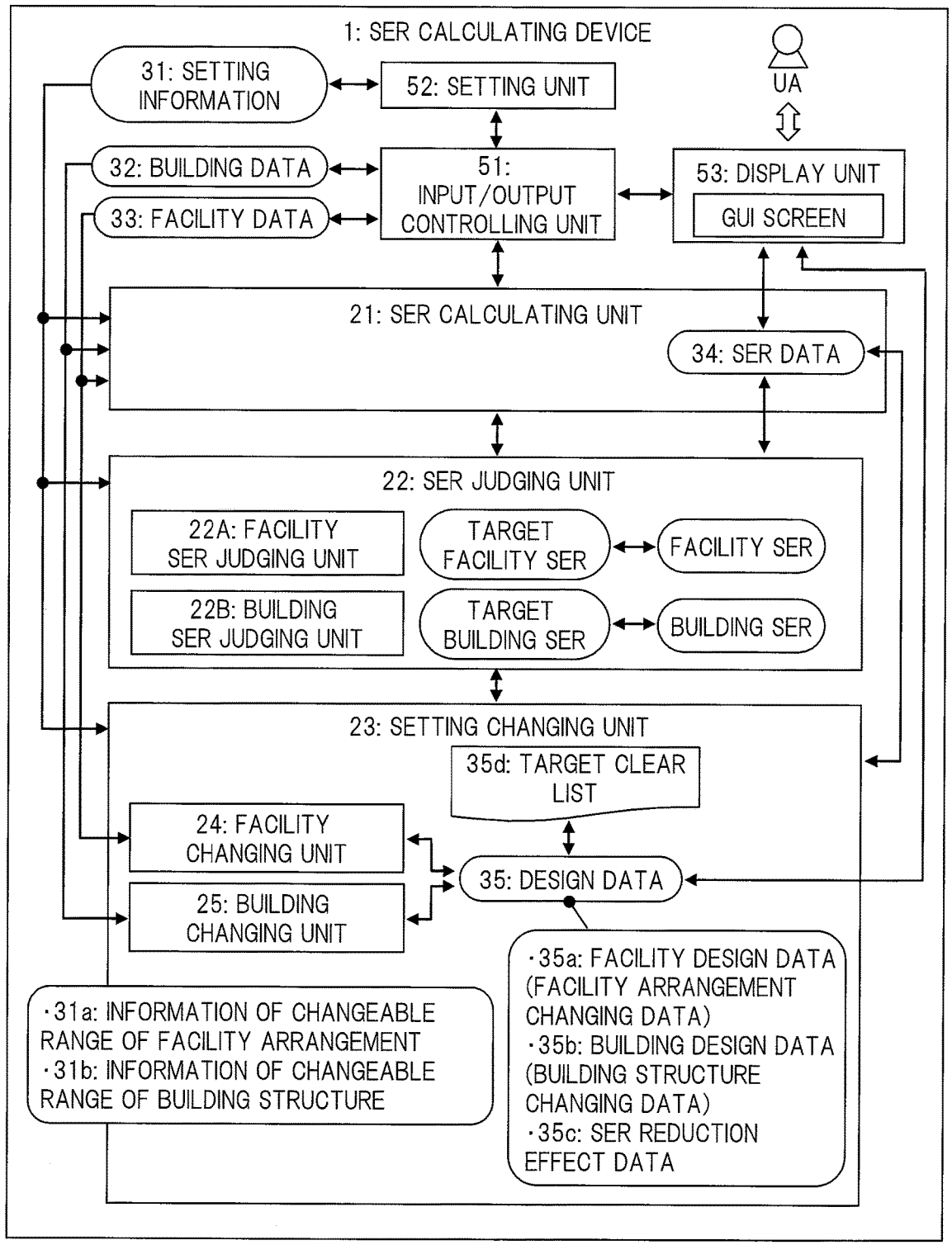
FIG. 20 is a diagram showing an outline of a configuration of a soft-error-rate calculating device of the second embodiment of the present invention.

FIG. 20 shows the configuration of the SER calculating device 1 of the second embodiment. The configuration of the SER calculating device 1 of the second embodiment of FIG. 20 has the design changing unit 23 and the design data 35 in addition to the components of the first embodiment of FIG. 1 and FIG. 2. The design changing unit 23 has a facility changing unit 24 and a building changing unit 25. The design data 35 is managed in the DB 30.

Based on input of the building data 32, the facility data 33, etc., the design changing unit 23 performs processing of analyzing the design of the building and the facility and the state of the design change so as to satisfy the conditions of target values about the SERs of the facilities and the building as much as possible and outputting the analyzed results. The design changing unit 23 saves and outputs the design data 35 including the analyzed results as the design plan. The input/output controlling unit 51 performs processing of generating a screen including design-change result information based on the design data 35 and displaying the screen to the user UA.

The facility changing unit 24 achieves a facility-arrangement changing function of analyzing and changing the arrangement of the facilities in the building so that facility SERs and the building SER are reduced. In the facility changing unit 24, for example, the design of the building is not changed while taking the state of the structure of the building of the building data 32 which is the input data as a fixed condition, but the arrangement of the facilities in the building is changed, and this state is saved and outputted as the design plan and the facility-arrangement design data 35*a*.

The building changing unit 25 achieves a building-structure changing function of analyzing and changing the structure of the building so that the facility SERs and the building SER are reduced. In the building changing unit 25, for example, the design of the facility arrangement is not changed while taking the state of the facility arrangement in the building of the facility data 33 which is the input data as a fixed condition, but the structural object configuring the structure of the building is changed so as to be added, and this state is saved and outputted as the design plan and the building design data 35*b*.

Note that the second embodiment is provided with both of the facility changing function performed by the facility changing unit 24 and the building-structure changing function performed by the building changing unit 25 as the design changing functions. However, a form provided with only one of them is also possible.

The design data 35 is the data showing the state of the design, the design plan, etc., in a case of, for example, the design of the arrangement of facilities in the building, the design change, or others by using the building data 32 and the facility data 33 by using the SER calculating device 1 and by the user UA. The design data 35 includes the facility design data 35*a*, the building design data 35*b*, and SER reducing effect data 35*c*. The design data 35 also includes the data of a target clear list 35*d* and one or more design plan(s) corresponded to the list.

The facility design data 35*a* is design data including facility-arrangement change data in a case in which the facility arrangement is changed by the facility changing unit 24. The facility-arrangement change data includes the data indicating what facility at what position in the building is to be moved to what position as difference data before/after the change. The building design data 35*b* is design data including building-structure change data in a case in which the building structure is changed by the building changing unit 25. The building-structure change data includes the data indicating how to change the structural object (s) configuring the structural body of the building as difference data before/after the change. The SER reducing effect data 35*c* includes the data indicating how the SER is changed by the design change of the facility or building.

The target clear list 35*d* is the data which describes and manages the information of one or more design plan(s) as a list in the descending order of the degree of satisfying the conditions of target SERs, etc. about building and facility designs and design changes thereof. Each of the design plans is, for example, associated and managed as an individual design-data-35 file(s). The data of the design plan is managed in association with the facility design data 35*a*, the building design data 35*b*, the SER-reducing effect data 35*c*, etc. The design data 35 may be integrated and managed with the building data 32 and/or the facility data 33.

In the second embodiment, in the good/not-good information which is the comparison judgement result between the SER and the target SER by the SER judging unit 22, being good (OK) means to satisfy the target value, and therefore, it shows that the arrangement of the facility at the position in the building is enabled or appropriate. Being not good (NG) means not to satisfy the target value, and therefore, it shows that the arrangement of the facility at the position in the building is disabled or not appropriate.

The design changing unit 23 executes processing of changing the design in accordance with being good/not-good as the SER judgement result of the SER judging unit 22. For example, the design changing unit 23 determines that the design change is required for the facility and building having the not-good result, and creates one or more design plan(s) of changing the arrangement of the facilities in the building or the state of the structure of the building by analysis processing. In the target clear list 35*d*, the design changing unit 23 stores the design plan which satisfies the condition of the target SER. Also, when the plurality of design plans in the target clear list 35*d* are outputted, the design changing unit 23 outputs the design plans so as to put a higher priority order on a design plan as the degree of satisfying the condition of the target SER is higher, as the recommended design plan.

[Design Changing Policy]

The setting unit 52 can set a policy of the design change made by the design changing unit 23, a changeable range which is an allowable range of the design change, etc., as the setting information 31. For example, in a case of an already-provided building, the building data D2 and the building data 32 are the fixed conditions, and therefore, the building structure cannot be changed. In this case, the arrangement of the facilities in the building is changed by the facility changing unit 24 while the facility data 33 is set to be changeable. Also, in a case of a newly-provided building, the building structure can be changed in some cases. In this case, the building structure can be changed by the building changing unit 25 while the building data 32 is set to be changeable.

Both of the change of the facility arrangement by the facility changing unit 24 and the change of the building structure by the building changing unit 25 can be simultaneously used. In the case of the simultaneous usage of both of them, the priority orders of the change of the facility arrangement and the change of the building structure can be set. The design changing unit 23 performs processing of the design changes in accordance with the set priority orders.

The setting information 31 in the second embodiment includes information 31*a* indicating the changeable range of the facility arrangement and information 31*b* indicating the changeable range of the building structure. The information 31*a* of the changeable range of the facility arrangement can set, for example, a region such as the floor, the area, and the division area in the building where the facilities can be arranged and the arrangement thereof can be changed or can set an arrangement-change-permitted facility or others. The information 31*b* of the changeable range of the building structure can set, for example, a region such as the floor, the area, and the division area in the building where the structural object can be installed and the change therefor is enabled or can set a structure-change-permitted structural object or others. The design changing unit 23 performs processing of the design changes for the building or facility in the above-described set changeable ranges.

As the above-described setting of the changeable range, for example, setting which enables changes of particular floor, area, and division area in the building, a particular structural object, a particular facility, etc., and setting which disables change of a particular target are possible. As a specific example, such a limiting condition that a particular facility has to be arranged on a particular floor or area can be set. Also, such a limiting condition that does not allow additional provision of the floor and the ceiling but allows additional provision of the wall and the pillar can be set.

[Facility Changing Unit]

Figure 21:
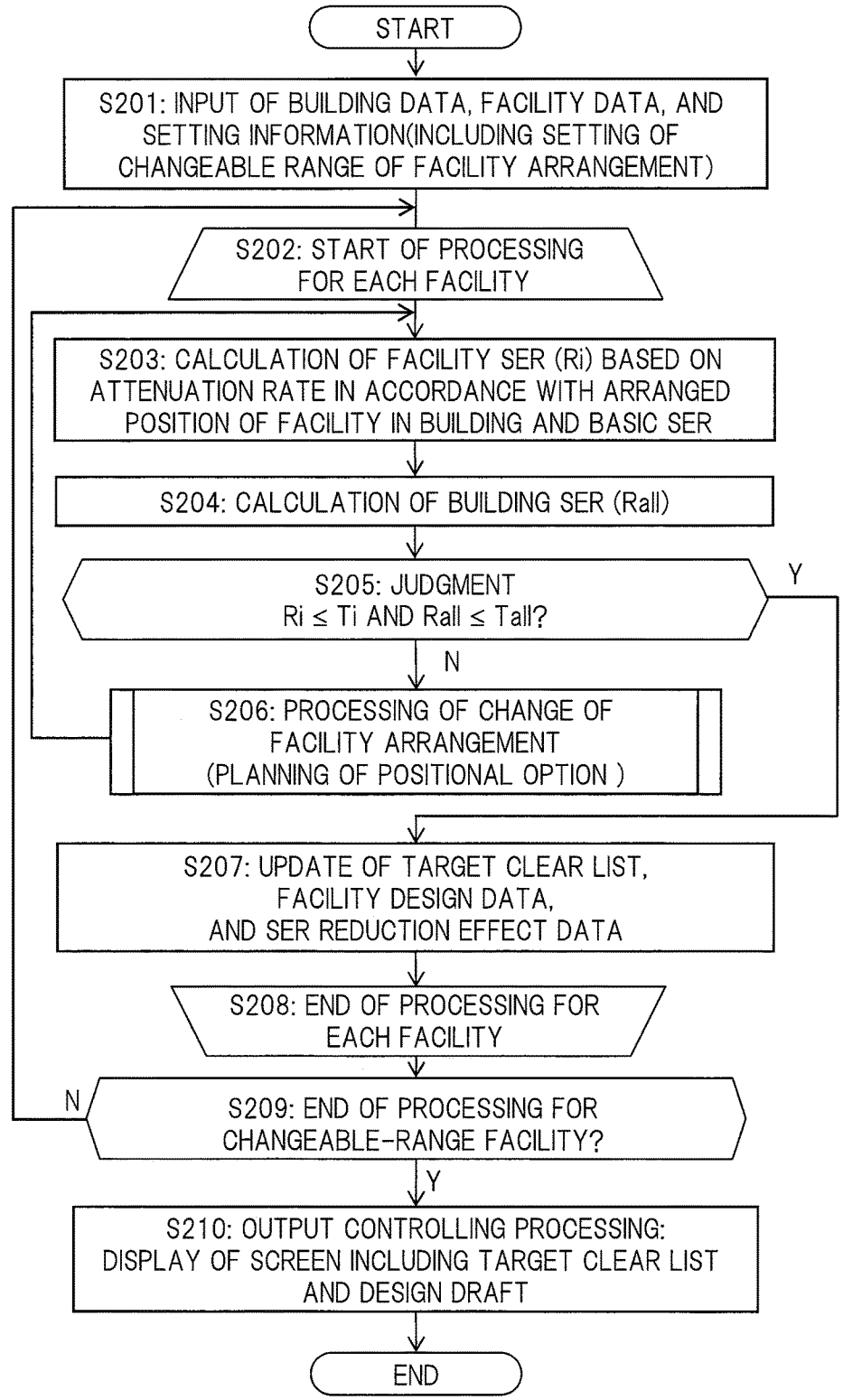
FIG. 21 is a flowchart of a facility arrangement changing processing of the soft-error-rate calculating device of the second embodiment.

First, the facility-arrangement changing function by the facility changing unit 24 will be explained. The facility changing unit 24 executes facility-arrangement changing processing as shown in FIG. 21 described below for the facility having the SER judgement result as being not good. As options for a basic policy or a facility arrangement change in the facility-arrangement changing processing, the facility changing unit 24 includes (1) movement of the facility as being not good" to a vacant position on a lower floor in the Z-direction or (2) movement of the facility as being not good to a vacant position that is far from the outer periphery of the building but close to the center of the building on the same floor in the XY-direction.

By the arrangement change of the facility based on the above-described option (1) or (2), it can be expected to reduce the SER calculated value. The SER calculating device 1 checks the SER reducing effects caused by the options of the position by similarly calculating and judging the above-described SER for the options of the position of the facility after the above-described arrangement change. As a result, since an option is effective if the option has the SER reducing effect, the facility changing unit 24 saves the facility-arrangement change data 35a and the SER reducing effect data 35c about the option so as to be included in the design data 35. If the option has no effect, the option is rejected.

The above-described policies (1) and (2) of the facility arrangement change are used in a case of simple calculation, but are not limited thereto, and others are possible. That is, as planning of a facility-arrangement change position in the facility changing unit 24, a position of movement by an arbitrary distance in an arbitrary direction in a three-dimensional space of (X, Y, Z) may be set. Particularly, a position of movement to an immediately-next division area in the X, Y, or Z direction in the division area unit may be set. If the SER calculated value at the position after the movement is lower than the SER calculated value before the movement, the SER calculating device 1 may take the movement as a suitable option.

[Facility-Arrangement Changing Processing]

FIG. 21 shows a flow example of the facility-arrangement changing processing by the facility changing unit 24. When the design change from a menu on the screen or the facility arrangement change of the menu is selected and executed by the user UA, the SER calculating device 1 starts the following processing. The facility changing unit 24 performs the facility-arrangement changing processing based on an algorithm corresponding to the above-described policy and/or setting.

(S201) In S201, the SER calculating device 1 inputs the building data 32, the facility data 33, the setting information 31, etc. The setting information 31 includes various target SERs and the information 31a of the changeable range of the facility arrangement set on the setting screen by the user UA.

(S202) In S202 to S208, the SER calculating device 1 repeats processing of each facility. The facility changing unit 24 selects one facility in the building as a processing target.

(S203) In S203, as similar to the above-described S110, the SER calculating device 1 calculates the facility SER corresponding to the arrangement position of the target facility in the building based on the attenuation rate G and the basic SER.

(S204) In S204, as similar to the above-described S107, the SER calculating device 1 calculates the building SER by, for example, summation of all facility SERs. The building SER calculated herein is updated by using the facility SER newly calculated in S203.

(S205) In S205, the facility changing unit 24 determines whether the position of the target facility satisfies the conditions about the SER or not. That is, the facility changing unit 24 checks whether the facility SER of S203 is equal to or lower than the target facility SER or not and whether the building SER of S204 is equal to or lower than the target building SER. The processing proceeds to S207 if it satisfies the condition (Y), or the processing proceeds to S206 if it does not satisfy the condition (N).

(S206) In S206, the facility changing unit 24 performs processing of changing the arranged position of the target facility based on the facility data 33 within the changeable range set in S201. That is, the facility changing unit 24 plans the post-change arranged position of the facility as an option. The facility changing unit 24 moves the position of the facility to, for example, a position on a lower floor in the Z-direction or a position close to the inner side of the building in the XY-direction by a unit of one floor, one division area, or others. Then, the processing of S203 to S205 is similarly performed for the option of the position of the facility planned in S206.

(S207) In S207, the facility changing unit 24 saves the information about the option of the position of the facility, which has satisfied the above-described conditions, as the design data 35, and updates the state of the data about the design plan. The facility changing unit 24 appropriately updates the data contents of the target clear list 35d, the facility design data 35a, the SER reducing effect data 35c, etc. The facility design data 35a includes the information of the pre/post-change position of the facility.

Also, the facility changing unit 24 stores the SER value corresponding to the pre-change position of the facility, the SER value corresponding to the post-change position of the facility, and the value of the difference, ratio, or others among them in the SER reducing effect data 35c or the SER data 34. If all the facilities in the building satisfy the conditions of the target values of S205, the facility changing unit 24 writes the information in the target clear list 35d as the design plan.

(S209) In S209, the facility changing unit 24 checks whether processing of S202 to S208 has been finished or not for all the facilities in the changeable range set in S201. If not finished (N), the facility changing unit 24 selects a next facility in the changeable range and similarly repeats the processing from S202. If finished (Y), the processing proceeds to S210.

(S210) In S210, based on the design data 35 of the processing results up to the above-described S209, the input/output controlling unit 51 generates a screen including the information of the target clear list 35d and the design plan, and displays the screen on the display unit 53 as output control processing. In this manner, the user UA can reference the information including the target clear list 35d and the design plan on the screen as shown in FIG. 23 described later.

Furthermore, in the above-described S206, etc., the facility changing unit 24 may perform the following processing. The facility changing unit 24 moves the facility to a vacant position in the building. However, if there is no vacancy for arrangement, the facility changing unit 24 may move the facility which has a margin of the SER in comparison with the target value in order to make the vacancy. In this case, the facility changing unit 24 moves the facility having the margin of the SER to, for example, a position on an upper floor in the Z-direction or a position close to the outer side of the building in the XY-direction. The facility has a high possibility that the calculated value of the SER is increased by this movement, and therefore, it is checked whether the conditions are satisfied or not in S203 to S205. By making the above-described vacancy, the facility having no margin of the SER can be moved to the vacant position.

In the above-described S206, etc., the facility changing unit 24 may perform the following processing. As shown in a later-described setting screen, the degree of importance and the protection level can be set in accordance with the facility type, facility storage data, etc. Accordingly, for example, for the facility having a high degree of importance, the facility changing unit 24 preferentially executes the above-described facility arrangement change so as to reduce the SER of the facility as much as possible. For example, if the degree of importance of the facility is high, the facility changing unit 24 makes a plan so that the post-change position of the facility arrangement is a position on the floor which is lower as much as possible in the Z-direction of the building or a center position in the XY-direction of the building.

The flow of the above-described facility-arrangement changing processing is an example of generating the design plan so that the building SER satisfies the target value and the facility SERs of all the facilities in the changeable range satisfy the target values as shown in S205. The flow is not limited to this example, and the facility changing unit 24 may make a plan obtained even when some of the facilities do not satisfy the target values as an effective design plan as long as the building SER satisfies the target value. The facility changing unit 24 may make a plan obtained even when the building SER does not satisfy the target value as the design plan.

[Building Changing Unit]

Next, a building-structure changing function by the building changing unit 25 will be explained. The building changing unit 25 executes a building-structure changing processing for the facility having the SER judgement result as being not good and for a three-dimensional space region including the facility. As an option of a basic policy or a change in the building-structure changing processing, the building changing unit 25 includes (1) addition of a structural object such as a floor, ceiling, beam, etc., serving as a shielding object to a vacant position above the facility as being not good in the Z-direction or (2) addition a structural object such as a wall, pillar, etc., serving as a shielding object to a vacant position at the facility, as being not good, close to the outer periphery of the building in the XY-direction.

In the above-described (1), a thickness or quantity of an existing structural object above the facility as being not good in the Z-direction may be increased. Also, in the above-described (2), a thickness or quantity of an existing structural object of the facility as being not good in the XY-direction may be increased. Alternatively, in the above-described (1) or (2), a structural object in the vicinity of the facility may be changed to a structural object made of a material having a high radiation shielding effect. By the change of the above-described building structure, the total thickness of the structural object, etc., through which the radiation entering the building from outside of the facility and reaching the facility passes is increased, and therefore, the attenuation effect is increased, and the SER reducing effect can be expected.

The SER calculating device 1 checks the SER reducing effect caused by the change, by similarly calculating and judging the above-described SER for each of the facilities affected by the above-described change of the building structure. As a result, if the SER reducing effect is observed, the change is effective, and therefore, the building changing unit 25 saves the change so as to be included in the design data 35 as the building design data 35b and the SER reducing effect data 35c. If no effect is observed, the change is rejected. For example, if such a structural object as a wall is added in the X-direction of a certain facility, each of the facilities arranged in the X-direction is affected by the shielding caused by the added structural object.

[Building-Structure Changing Processing]

Figure 22:
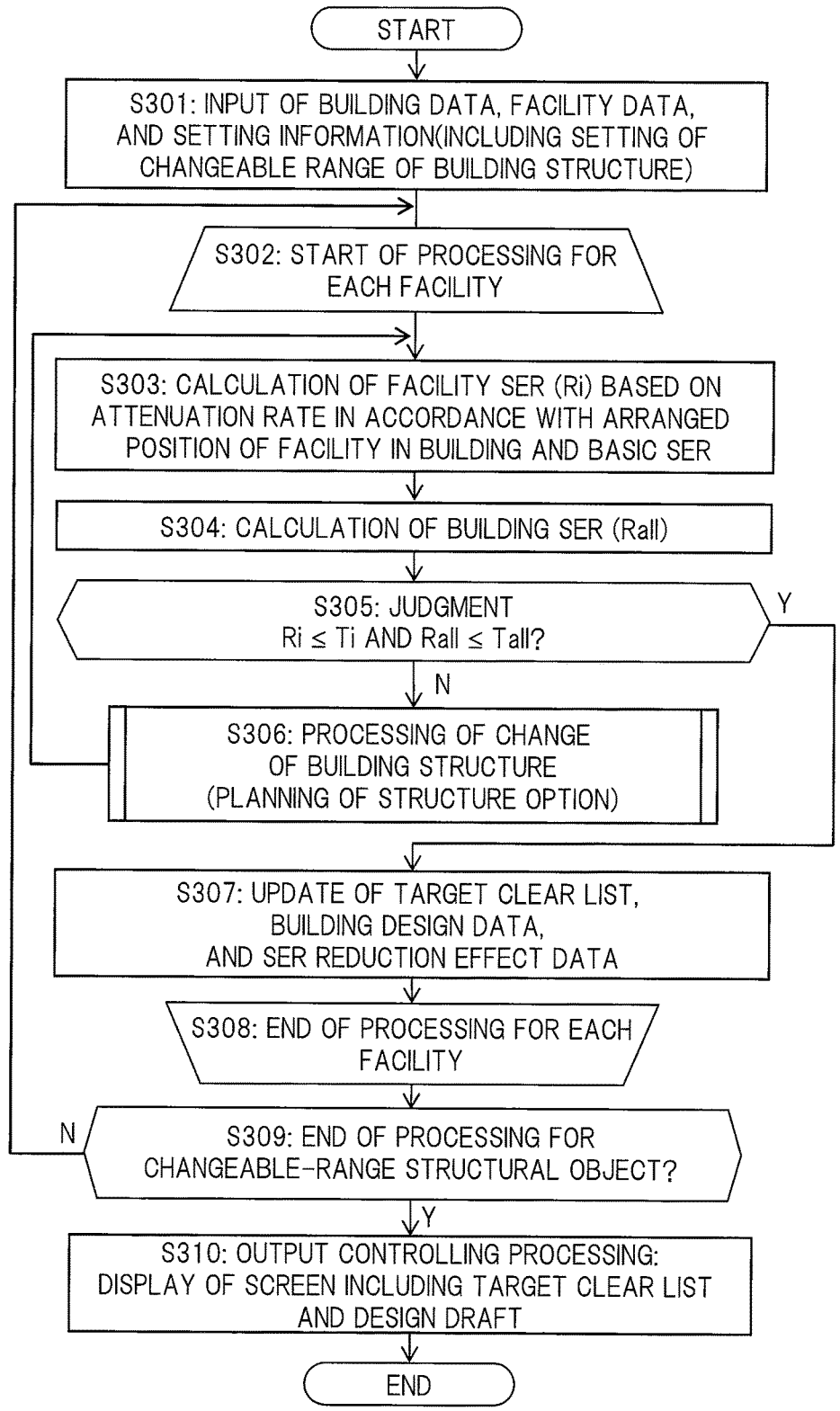
FIG. 22 is a flowchart of a building structure changing processing of the soft-error-rate calculating device of the second embodiment.

FIG. 22 shows a flow example of the building-structure changing processing by the building changing unit 25. When the design change or the building-structure change of the design change is selected and executed by the user UA from a menu on the screen, the SER calculating device 1 starts the following processing. The building changing unit 25 performs the building-structure changing processing based on an algorithm corresponding to the above-described policy and/or setting.

(S301) In S301, the SER calculating device 1 inputs the building data 32, the facility data 33, the setting information 31, etc. At this time, the setting information 31 includes to set the information 31b of the changeable range of the building structure set on the setting screen by the user UA.

(S302) In S302 to S308, the SER calculating device 1 repeats processing of each facility and processing of each structural object. The building changing unit 25 selects one facility and one structural object in the building as a processing target.

(S303) In S303, as similar to the above-described S110, the SER calculating device 1 calculates the facility SER corresponding to the arrangement position of the target facility in the building.

(S304) In S304, as similar to the above-described S107, the SER calculating device 1 calculates the building SER. The building SER calculated herein is updated by using the facility SER newly calculated in S203.

(S305) In S305, the building changing unit 25 determines whether the target facility satisfies the conditions about the SER or not. That is, the building changing unit 25 checks whether the facility SER of S303 is equal to or lower than the target facility SER or not and whether the building SER of S304 is equal to or lower than the target building SER. The processing proceeds to 5307 if it satisfies the condition (Y), or the processing proceeds to S306 if it does not satisfy the condition (N).

(S306) In S306, based on the building data 33, the building changing unit 25 changes the structural object of the target building within the changeable range set in S301. That is, the building changing unit 25 plans the post-change structural object of the building as an option. The building changing unit 25, for example, adds structural objects to the upper side of the facility in the Z-direction or to the vicinity of the outer periphery of the building in the XY-direction. At this time, as a unit of addition of the structural object, the building changing unit 25 may add a predetermined structural object by, for example, a predetermined thickness or quantity. Then, the processing of S303 to S305 is similarly performed for each of the facilities related to the structure of the building planned in S306. Note that the state of the above-described calculation model is updated in accordance with the change of the structural object in S306, and the SER calculating device 1 calculates the attenuated neutron spectrum data and the attenuation rate G based on the post-update model.

(S207) In S207, the building changing unit 25 saves the information about the facility and the building, which have satisfied the above-described conditions of S305, as the design data 35, and updates the state of the data about the design plan. The building changing unit 25 appropriately updates the data contents of the target clear list 35d, the building design data 35*b*, the SER reducing effect data 35*c*, etc. The building design data 35*b* includes the information of the pre/post-change structural object of the building.

Also, the building changing unit 25 stores the SER value of the facility corresponding to the pre-change structural object, the SER value of the facility corresponding to the post-change structural object, and the value of the difference, ratio, or others among them in the SER reducing effect data 35*c*. If all the facilities in the building satisfy the conditions of the target values of S305, the building changing unit 25 writes the information in the target clear list 35*d* as the design plan.

(S309) In S309, the building changing unit 25 checks whether processing of S302 to S308 has been finished or not for all the structural objects and all the facilities in the changeable range set in S301. If not finished (N), the building changing unit 25 selects next structural object and facility in the changeable range and similarly repeats the processing from S302. If finished (Y), the processing proceeds to S310.

(S310) In S310, based on the design data 35 of the processing results up to the above-described S309, the input/output controlling unit 51 generates a screen including the information of the target clear list 35*d* and the design plan, and displays the screen on the display unit 53 as output control processing. In this manner, the user UA can reference the information including the target clear list 35*d* and the design plan on the screen as shown in FIG. 23 described later.

[Setting Screen]

A setting example of the setting screen of the above-described FIG. 16 in the second embodiment will be described below. The setting screen has the item 1606 and the item 1611. The item 1606 can set a policy of the design change using the design changing unit 23. In the item 1606, by the user UA, it can be selected and set, for example, whether or not the facility-arrangement changing function by the facility changing unit 24 is to be used or preferentially taken and whether or not the building-structure changing function by the building changing unit 25 is to be used or preferentially taken.

Moreover, in the item 1606, each of the changeable ranges can be set by the user UA by using, for example, a setting button for the changeable ranges. For example, by using the setting button for the changeable range of the facility arrangement, the input/output controlling unit 51 can display the contents of the facility data 33 on another screen or item, and set the information 31*a* of the changeable range of the facility arrangement by the user UA. In that case, a form of selection of a changeable target or range may be adopted, or a form of selection of unchangeable target or range may be adopted. In this processing, the input/output controlling unit 51 displays, for example, a floor map as shown in FIG. 14, and enables changeable or unchangeable area, division area, etc., on the floor to be specified.

In the item 1611, by the user UA, it can be set whether the design change for each unit such as a floor, facility, and structural object is enabled or not. In the item 1611 of the item 1602, it can be set whether the change for each floor is enabled or not. In the item 1611 of the item 1603, it can be set whether the change for each facility is enabled or not. In the item 1611 of the item 1604, it can be set whether the change for each structural object is enabled or not.

The target set as being, for example, "changeable" in the item 1611 is permitted to change the design by the design changing unit 23, and is included in the above-described changeable range of the facility arrangement or building structure but not included in the "unchangeable" target. For example, if the "unchangeable" state is set for a communication device which is a facility C in the item 1603, the design of the arrangement of the communication device is fixed. For example, if the "unchangeable" state is set for a certain floor which is a structural object A in the item 1604, the design of the floor is fixed.

Furthermore, in the changeable-range information 31*a* of the facility arrangement, the unit or the maximum value of the movement in the change of the facility arrangement can be set. For example, as described above, the setting of the movement in one-division area unit can be adopted.

Furthermore, in the changeable-range information 31*b* of the building structure, it may be set whether the change for each element such as a size such as a thickness, quantity, and material of the structural object is enabled or not, or a change priority order thereof and the changeable range of each element may be set. For example, if it is set that the change of only the size of the structural object is enabled, the building changing unit 25 increases the thickness of the structural object as an option of the change. For example, as the changeable range of the size of the structural object, the setting of the minimum value and maximum value of the thickness, an increasing interval in the change, etc., may be enabled. For example, as the change priority order, such setting as increasing the thickness firstly, increasing the quantity secondly, and changing the material thirdly may be enabled.

In the changeable-range information 31*b* of the building structure, the setting of the information of a product and a member serving as options in the change or addition of the structural object may be enabled. For example, when a member made of a special material having a radiation shielding effect or others is additionally provided for a structural object of an existing building, the setting of the information of the member as the option may be enabled.

In the changeable-range information 31*b* of the building structure, in a case of a newly-provided building, it can be set whether the change of the number of the floors, floor area, etc., is enabled or not, and the changeable range thereof and availability of a specific floor such as an underground floor can be set. For example, when the top floor of the building can be expanded, a region where a facility can be arranged can be increased by the expansion, and the SER reducing effect by the increase in the shielding objects can be expected.

[Design Changing Screen]

FIG. 23 shows an example of a design changing screen for displaying the information of the design changing processing by the design changing unit 23. On the design changing screen, an item 2301 shows the information of the pre-change design data 35. The item 2301 displays file information such as the design data 35, the building data 32, the facility data 33, and the SER data 34 configuring a certain design plan. Each pieces of the information of the item 2301 can be appropriately selected and checked by the user UA while displaying them on the screen.

An item 2302 displays a target value about the design of the building and facility of the item 2301. The item 2302 displays, for example, the target value of the building SER, and the user UA can change the setting of the target value by using a change button.

An item 2303 displays the information of the target clear list 35*d*. The target clear list of the item 2303 displays, for example, the file information of the design data 35, the building data 32, the facility data 33, and the SER data 34, and the data based on the SER reducing effect data 35c. The list of the item 2303 has a row for each of one or more design plans.

In the target clear list of the item 2303, a plurality of design plans are displayed in the recommended order based on the analysis result of the SER calculating device 1. In the item 2303, the priority order of displaying the plurality of design plans in the list can be selected by the user UA. For example, if "the ascending order of the building SER" is selected, the plurality of design plans are sorted and displayed in the ascending order of the building SER from the top of the list. As other priority orders, the ascending order of the maximum value of the facility SER in the building, the ascending order of the degree of the change of the facility arrangement, the ascending order of the degree of the change of the building structure, and others are cited. Note that the degree of the change of the facility arrangement can be checked based on the facility design data 35a. The degree of the change of the building structure can be checked based on the building design data 35b.

An item 2304 displays the contents of the post-change design data 35. The item 2304 displays the information of the most-recommended design plan in the top row of the list of the item 2303 or the information of the design plan arbitrarily selected by the user UA from the list of the item 2303. The user UA can select an arbitrary design plan from the list of the item 2303 and check the contents thereof. An item 2304 has the file information of the design data 35, the building data 32, the facility data 33, and the SER data 34, the SER reducing effect information, etc. The SER reducing effect information shows information of the rate or others showing the degree of reduction of the SER such as the building SER before/after the design change based on the SER reducing effect data 35c.

The user UA can select the information of each of the columns of the item 2304 and display and check the detailed contents thereof on the screen. If the design plan displayed in the item 2304 is applied, the user UA can determine the plan as an independent file of the design data 35 and save it in DB 30 by using an application button. The applied design data 35 is not only used without change, but can be edited in the screen by the user UA as described above and utilized.

Design Change Example (1)

Figure 24:
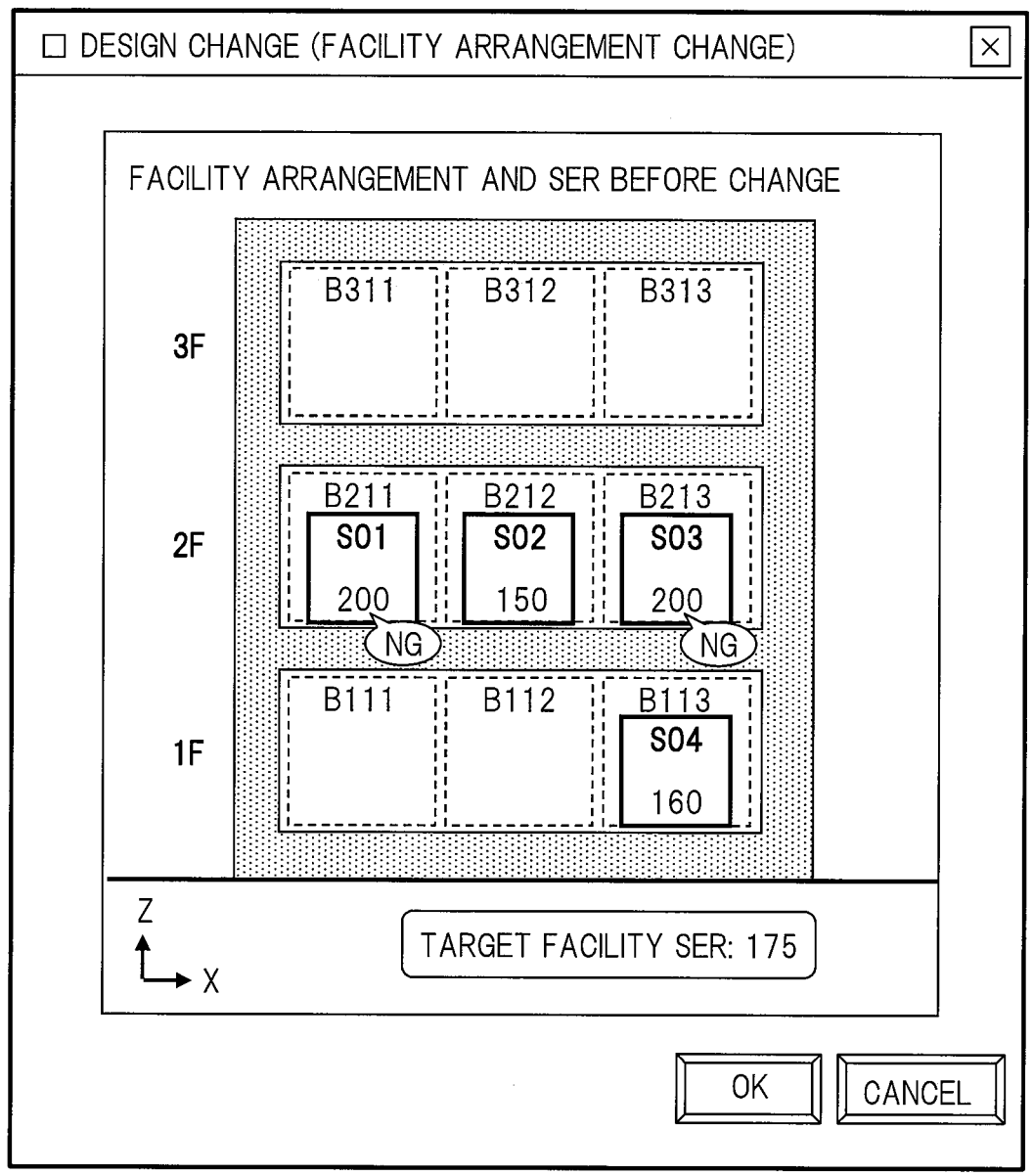
FIG. 24 is a diagram showing a screen example displaying a state before the facility arrangement change of the second embodiment.
Figure 25:
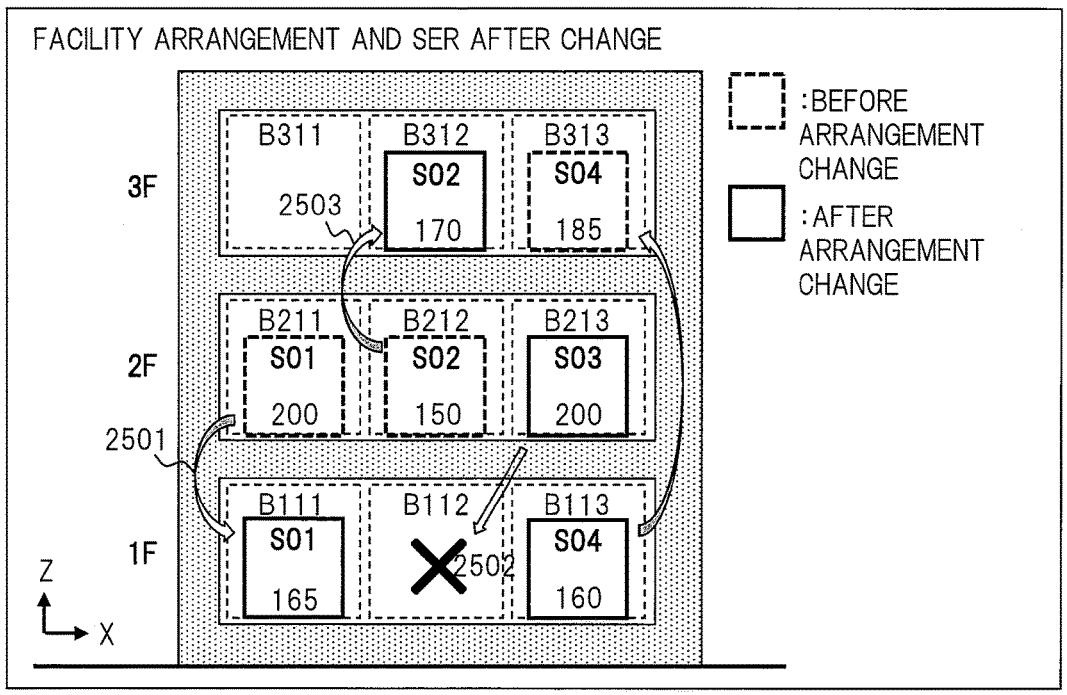
FIG. 25 is a diagram showing a first state after the facility arrangement change of the second embodiment.
Figure 26:
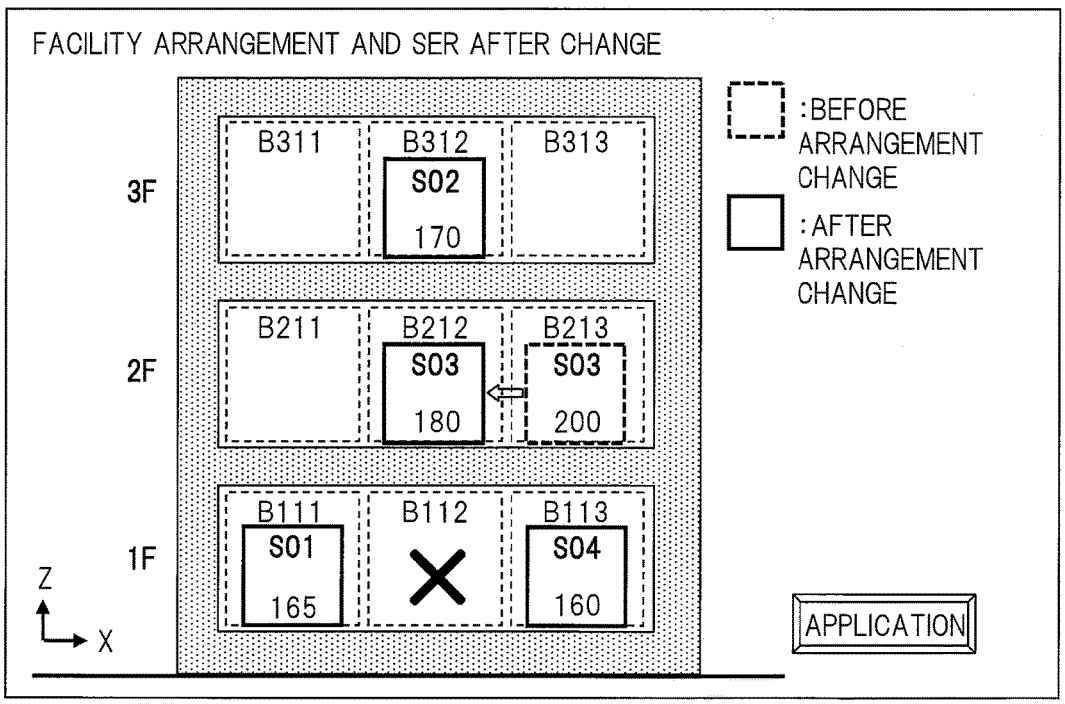
FIG. 26 is a diagram showing a second state after the facility arrangement change of the second embodiment.

An example of the facility arrangement change by the facility changing unit 24 will be explained by using FIG. 24 to FIG. 26 as an example of the design change by the design changing unit 23. FIG. 24 shows a display screen example including a state before the facility arrangement change. FIG. 25 shows a first state after the facility arrangement change from the state of FIG. 24, and FIG. 26 shows a second state after the change from the first state of FIG. 24.

First, in FIG. 24, the information of a building, a facility, a facility SER, etc., before the change is shown by an X-Z cross sectional surface. The building has, for example, three stories, and a cross section of each floor has three division areas in the X-direction. As an example of the facility arrangement, a first facility S01 is in a first division area B211 on a second floor, a second facility S02 is in a second division area B212 thereon, and a third facility S03 is in a third division area B213 thereon. Moreover, a fourth facility S04 is in a division area B113 on a first floor.

As a result of the SER calculation based on the above-described calculation model, the facility SERs at the positions of the facilities S01 to S04 are, for example, 200, 150, 200, and 160, respectively. The set value of the target facility SER of all the facilities is, for example, 175. As a result of the above-described SER judgement, the facilities S01 and S03 are judged as being not good (NG).

In FIG. 25, a broken-line frame of the facility shows a state before the arrangement change, and a solid-line frame thereof shows a state after the arrangement change. For the facilities S01 and S03 as being not good in the state of FIG. 24, the facility changing unit 24 examines movement to the position which is on the lower floor in the Z-direction or closer to the center of the building in the XY-direction. The facility changing unit 24 moves the facility S01 to the position as shown in 2501 since a division area B111 on the first floor is vacant. Although the facility changing unit 24 references the division area B113 on the first floor immediately below S03 in the Z-direction and references the division area B212 which is in the left side in the X-direction on the second floor and which is in the center of the building, the facility changing unit 24 cannot move the facility S03 since both of the areas are not vacant.

Therefore, as making a plan of the arranged position of the facility S03, the facility changing unit 24 may search first a vacant division area on the first floor, and may move the facility S03 to, for example, a division area B112 as shown by 2502 since the division area B112 is vacant. Herein, for the sake of explanation, it is assumed that the division area B112 is not included in the changeable range of the facility arrangement and that the facility cannot be arranged in the division area B112.

As another plan for the facility S03, by making a vacancy in the division area B113 immediately therebelow in the Z-direction or in the division area B212 on the left side thereof in the X-direction, the facility changing unit 24 may examine to move the facility thereto. The SER of the facility S02 in the division area B212 and the SER of the facility S04 in the division area B113 are in a state of target-value satisfaction. Therefore, the facility changing unit 24 examines to move the facilities S02 and S04 to a position on the upper floor in the Z-direction or positions which are on the left/right side in the XY-direction and are closer to the outer periphery of the building. Note that such examination as the design change can be achieved by a recursive processing.

The facility changing unit 24 moves, for example, the facilities S02 and S04 to the vacant division areas B312 and B313 on the third floor thereabove in the Z-direction. At this time, since the values of the facility SERs are varied, the facility changing unit 24 checks them by the above-described SER judgement, and, if being good (OK), moves the facilities. For example, the SER of the facility S02 obtained when being moved to the division area B312 becomes 170, and therefore, the SER satisfies the target value and becomes good. Therefore, the facility changing unit 24 moves the facility S02 to the division area B312 as shown by 2503. In this manner, a vacancy is generated in the division area B212 on the second floor. Meanwhile, the SER of the facility S04 obtained when being moved to the division area B313 becomes 180, and therefore, the SER does not satisfy the target value and becomes not good. Therefore, the facility changing unit 24 does not move the facility S02.

In FIG. 26, the facility changing unit 24 moves the facility S03 of the division area B213 on the second floor to the vacant division area B212 described above. At this time, the facility changing unit 24 checks the SER of the facility S03 obtained when being moved to the division area B212, and moves the facility to the position if the target value is satisfied or does not move the facility if the target value is not satisfied. Alternatively, if the facility SER is reduced even if the SER obtained after the movement of the facility S03 does not satisfy the target value, the facility changing unit 24 may move the facility to the position. If there are a plurality of options of the movement destinations for the facility, the facility changing unit 24 may move the facility to a position at which the SER in any movement destination becomes the smallest.

The user UA can check the contents of the design plan in the state after the facility arrangement change on the screen shown in, for example, FIG. 24 described above, and can perform an operation of applying the design plan if the contents have no problem.

Design Change Example (2)

Figure 27:
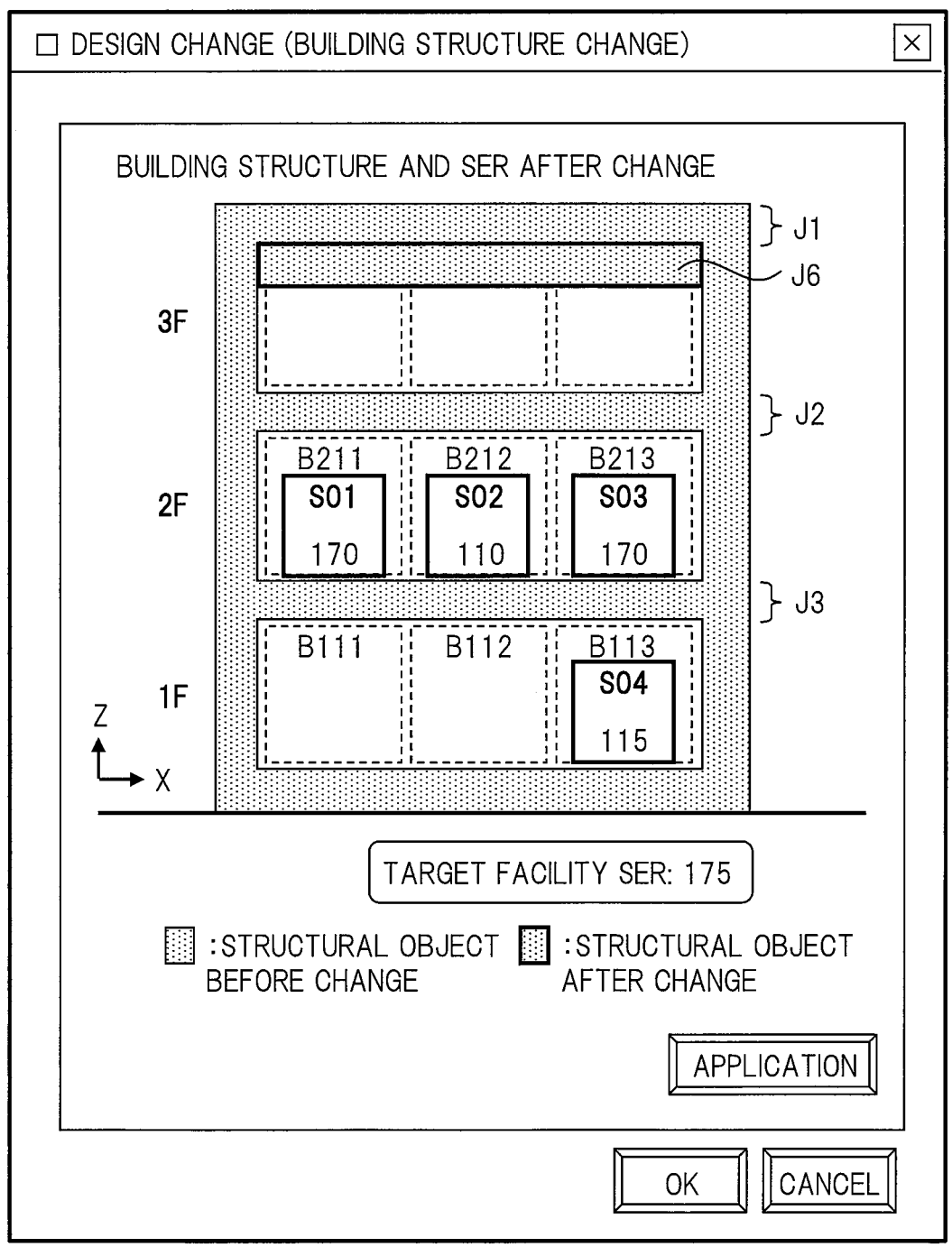
FIG. 27 is a diagram showing a screen example displaying a state after building structuring of the second embodiment.

An example of a case of a building structure change by the building changing unit 25 will be explained by using FIG. 27 as an example of the design change by the design changing unit 23. The state before the building structure change is assumed to be the same as above-described FIG. 24. FIG. 27 shows a display screen example including the state after the building structure change.

In FIG. 27, a structural object J6 is added in the building structure after the change by the building changing unit 25. This is an example in which a flat-plate-shaped structural object J6 on the XY-plane is additionally arranged on the entire surface of the structural object J1, which is the ceiling of the third floor. For each of the facilities S01 to S04 arranged below the structural object J6 in the Z-direction, the structural object J6 is added as a shielding object between the facilities and the outside of the building in the Z-direction. Therefore, the radiation attenuating effect in the Z-direction is increased by the thickness of the structural object J6 in the Z-direction, and the SER reducing effect is generated. As a result of the SER calculation, each of the facilities S01 to S04 has the smaller facility SER than those of the state before the change of FIG. 24, and therefore, all of them are in the state of the satisfaction of the target facility SER.

The options of the change of the structural objects are not limited to the above-described example, the Z-direction thickness of the existing structural objects J1 and J2 may be increased, and a structural object such as a wall may be added in the XY-direction of the facility. Also, the material of the existing structural object J1, etc., may be changed to a material having high neutron-ray shielding effect property. Also, for example, when a newly-provided building is designed, a floor such as a fourth floor may be added. The added structural object may be a structural object which is arranged later in an existing building. For example, a special material may be pasted onto a wall.

Design Change Example (3)

Figure 28:
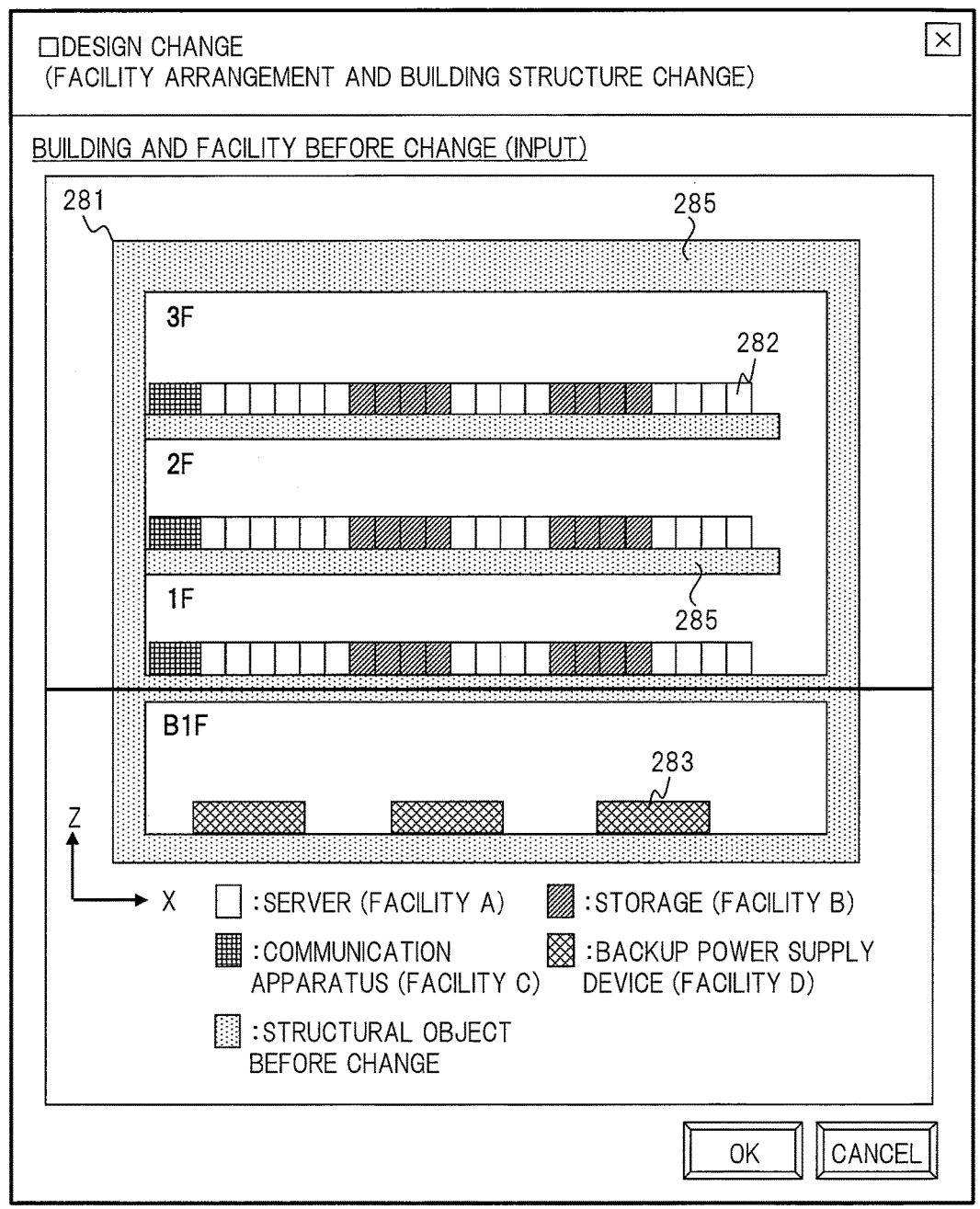
FIG. 28 is a diagram showing a screen example displaying a state before design change of the second embodiment.

An example of a case in which both of the facility arrangement change by the facility changing unit 24 and the building structure change by the building changing unit 25 are used in combination will be explained by using FIG. 28 to FIG. 29 as an example of the design change by the design changing unit 23. FIG. 28 shows a display screen example including a state before the change. FIG. 29 shows a display screen example including a state after the change from FIG. 28.

First, FIG. 28 shows the states of the building and the facility before the design change in an X-Z cross-sectional surface. A building 281 is a building such as a data center including three stories above a ground and one underground floor. Based on the input building data 32 and facility data 33, the SER calculating device 1 creates a shown model. The building 281 has a structural object 285 such as a floor or a wall. On each floor of the first to third floors of the building 281, various types of facilities 282 such as a server, a storage, and a communication device are arranged on an X-Y plane. The facilities 282 may be displayed with a changed shape or color for each type as shown in the drawing. Also, a backup power supply device is arranged on the first underground floor as a facility 283.

FIG. 29 shows a state of one design plan which satisfies the above-described target value such as the target building SER. In the post-change building 281, both of the building structure and the facility arrangement are changed. First, in the post-change facility configuration, the number of the facilities arranged on each of the first to third floors above the ground is smaller as the floor is higher in the Z-direction, and is larger as the floor is lower by the facility-arrangement changing processing. Therefore, the facilities on the upper floors to be decreased are moved to the lower floors. The structural objects 285 which are the shielding objects in the Z-direction are more as the floor is lower, and therefore, the SER reduction by the radiation attenuation can be expected. Particularly, on the first underground floor having the expectation of the high effect, the facilities 282 such as a server having a low target SER and a storage having a high degree of importance are gathered. And, the backup power supply device which is the facility 283 arranged on the first underground floor in the pre-change state is moved to the third floor which is an upper floor. The backup power supply device has such property as, for example, being heavy but having small influence on the soft error. It is conceived that the third floor which is the uppermost floor has the largest influence of the neutron rays, and is handled by arranging the facility 283 thereon having the property of the low influence on the soft error.

In the configuration of the structural object 285 as the floor configuration of the building, the structural object 285 such as the floor in the XY-direction which is a horizontal direction is not changed, and structural objects 291 such as the wall and the pillar standing in the Z-direction which is a vertical direction are added. This corresponds to such setting that the change of the floor, etc., is disabled as the setting of the above-described changeable-range information 31b of the building structure. By the addition of the structural object 291 such as the wall, the shielding objects between the facility and the outside of the building are more in the facility arranged closer to the center of the building in the XY-direction, and therefore, the SER reduction by the radiation attenuation in the XY-direction can be expected. Therefore, the facility changing unit 24 operates to arrange the facility having the large influence on the soft error and the facility having the small target SER at the positions closer to the center of the building.

By the addition of the above-described structural object 291 such as the wall along with the change of the arrangement of the facilities among the above-described floors in the Z-direction, the building strength is also achieved. Particularly, since the backup power supply device which is the heavy object is moved to the upper floor, the building changing unit 25 adds the structural object 291 to the floor below the floor. The design changing unit 23 performs the above-described design changing processing by referencing the weight information included in the building data 32 or the facility data 33, a weight allowance value of each floor included in the setting information 31, and others.

As an optimizing method of the designing in the building and facility design changing processing by the above-described design changing unit 23, an optimum value, etc., may be guided by using a local search method or others represented by a hill climbing method which is a type of a publicly-known algorithm.

[Effects and Others]

According to the second embodiment, in addition to the effects of the first embodiment, for the soft error of a plurality of facilities arranged in an existing or newly-provided building such as a data center, designing of the building, facility, etc., which achieves the high reliability because of the low SER can be supported. According to the second embodiment, optimum or efficient facility arrangement and building structure because of the low SER and the large SER reducing effect can be proposed. According to the second embodiment, by the design changing function, the facility arrangement and the building structure in the building can be analyzed, and a design changing plan capable of reducing the SER can be automatically created and outputted.

In this manner, the user UA is easy to design the optimum building and facility including the soft error measures. By the designing of achieving the SER reduction based on the devising of the facility arrangement and the building structure, the user UA can reduce an unnecessary or redundant facility because of a conventional redundant method, etc., and a structural object, etc., required for the facility. In this manner, a building and a system such as a data center having high reliability and low cost and electric power consumption can be achieved.

Based on the referencing of the screen shown in FIG. 23 or others, the user UA can change the state of the design of the building and the facility by performing an operation of editing the contents of the design data 35, etc., on the screen shown in FIG. 12 described above or others. For example, the user UA can change the arranged position of the facility by performing, for example, an operation of dragging the facility on the screen or others. Then, the user UA can cause the SER calculating device 1 to execute the above-described SER calculation and judgement again for the post-change design data 35, and can check whether the result thereof is appropriate or not on a screen.

Moreover, in the second embodiment, by the design changing function, the facility arrangement, the building structure, the SER, etc., are analyzed, and a plurality of design plans are automatically created, and then, the plurality of design plans and a list of the design plans are proposed to the user UA on the screen of FIG. 23 as recommended information. The user UA can select a suitable design plan from among the proposed design plans, and apply or edit this. Therefore, the user UA can achieve such an optimum building and facility design as reducing the SERs, with spending a small work.

Moreover, the SER calculating device 1 of the second embodiment saves the above-described design plan and the design data 35, which has been created by the user UA, in the DB 30. Moreover, the SER calculating device 1 of the second embodiment saves the design data 35 including the design change data of the facility arrangement, the building structure, etc., and including the SER reducing effect, in the DB 30. The user UA can also reference the past design data 35 from the DB 30. The user UA can compare a plurality of design plans including the past design data 35, and select such a design plan as having the lowest SER.

Modification Example

As a modification example about the second embodiment, the following is enabled. In a first modification example, as an option of the design change, the design changing unit 23 may replace a facility itself by another facility without changing the position of the facility or the building structure. For example, if the facility SER does not satisfy the target SER as a result of the SER judgement caused by the design change, the design changing unit 23 replaces the facility as the above-described option. Also, as the above-described option, the design changing unit 23 may add a rack which houses the facility, such as a rack having the radiation shielding effect.

In this case, as the changeable-range information 31*a* of the facility arrangement, the information of the facility to be the option can be set. For example, if there are a plurality of servers having different basic SERs and target SERs in a case of designing of a newly-provided data center, the information of the server may be set as the information 31*a*. For example, a first server cannot satisfy the target value, but the target value can be satisfied by replacing the first server by a second server, and therefore, the design changing unit 23 can make such a plan as replacing the server by the second server.

In a second modification example, the SER calculating device 1 sets the property about the radiation shielding on the facility itself, and reflects the property of the facility to the above-described attenuation calculation. In this case, for a direction of the radiation between the position of the facility serving as the target for calculating the SER and the outside of the building, the SER calculating device 1 reflects the shielding property of the facility, which is interposed as the shielding object, to the attenuation calculation, so that the above-described attenuation rate G, etc., is calculated. For example, in a case of a facility in which a plurality of devices are housed in a rack as a type of the facility, the rack itself can be expected to have the shielding effect. In this case, as the facility data 33, the information of the rack and the information of the shielding property corresponding to the rack are set.

Another Embodiment

In the foregoing, the invention made by the present inventors has been concretely described based on the embodiments. However, it is needless to say that the present invention is not limited to the foregoing embodiments and various modifications and alterations can be made within the scope of the present invention. The present invention is applicable to not only the data center but also to various buildings where electric devices are provided and to an information processing system, such as a building or a factory in a company or a public institution and a system of the building or the factory.

(1) A SER calculating device of an embodiment has: a storing unit for data information such as setting information, building data, facility data, radiation data, and a calculation model; an attenuation calculating unit; a SER calculating unit; a SER judging unit; a design analyzing unit; an output controlling unit; and a design data storing unit. As an attenuation index value, the attenuation calculating unit calculates an index value representing a degree of attenuation of radiation entering a building attenuated by a structural object of the building until the radiation reaches a position of a facility arranged in the building. The SER calculating unit calculates a SER at each facility position as a facility SER based on the attenuation index value, and calculates a SER in the unit of the entire building as a building SER by using the facility SER of each facility in the building. The SER judging unit compares the calculated value of the facility SER or the building SER with a condition included in the setting information and judges whether the calculated value satisfies the condition or not.

The design analyzing unit analyzes the conditions of the facility arrangement in the building or the conditions of the building structure, and creates such a design plan or a design change plan as satisfying the conditions so that the calculated values of the SERs satisfy the conditions. The output controlling unit outputs data information including the SER calculation result, the SER judgement result, and the design plan or the design change plan to a user in a selected form. In a database, the design data storing unit can store and reference the design data including the design plan of designing of the building and the facility including the SER calculation result or the design change plan including the information of the SER change.

(2) The SER calculating device of the above-described aspect (1) stores neutron spectrum data, which is radiation spectrum data in a case in which the radiation is neutron rays. The above-described model calculating unit calculates a model including the attenuation index value by using the neutron spectrum data of the neutron rays which enter the building.

(3) The SER calculating unit of the above-described aspect (1) calculates the building SER by computation including summation of the facility SERs of all the facilities in the building.

(4) The output controlling unit of the above-described aspect (1) provides a screen on which a threshold value of the facility SER is set by the user, and, if the facility SER is equal to or lower than the threshold value, the above-described SER judging unit judges that it is as being good. Moreover, the above-described output controlling unit provides a screen on which a threshold value of the building SER is set by the user, and, if the building SER is equal to or lower than the threshold value, the above-described SER judging unit judges that it is as being good.

(5) The SER calculating device of the above-described aspect (1) has a floor SER calculating unit which calculates a SER of each floor of the building as a floor SER by using the facility SER, and a floor SER judging unit which compares the floor SER with a set threshold value and judges that the floor SER is either good or not good. The above-described output controlling unit outputs information including the floor SER and a judgement result of the floor SER.

(6) The SER calculating device of above-described aspect (1) has an area SER calculating unit which calculates a SER of each area in the building as an area SER by using the facility SER, and an area SER judging unit which compares the area SER with a set threshold value and judges that the area SER is either good or not good. The above-described output controlling unit outputs information including the area SER and a judgement result of the area SER.

(7) The model calculating unit of the above-described aspect (1) calculates an attenuation rate of the radiation at the arranged position of the facility in the building by using the total thickness or quantity of the structural object(s) between the facility arranged in the building and outside of the building.

(8) The model calculating unit of the above-described aspect (1) calculates the attenuation rate of the radiation at the arranged position of the facility by computation including superposition of the soft-error cross-sectional-area data applied to the facility and the spectrum data of the radiation which enters the building.

(9) The SER calculating unit of the above-described aspect (1) calculates the facility SER by computation of a basic SER which is property of the facility, and the attenuation rate of the radiation at the arranged position of the facility in the building.

(10) The model calculating unit of the above-described aspect (1) calculates the geographically-corrected radiation spectrum data which corresponds to the position of the building and which is spectrum data of the radiation which enters the building, by geographical correction calculation using the nature radiation spectrum data at a geographical position serving as a reference and the position information of the building, and calculates the attenuated radiation spectrum data at the arranged position of the facility in the building.

(11) The model calculating unit of the above-described aspect (1) creates a model of a structure of the radiation shield by the building by using the building data, sets information of a radiation ray source of the radiation which enters the building, and calculates the attenuated radiation spectrum data at the arranged position of the facility in the building by using the information of the radiation ray source of the radiation and the model of the shield structure.

(12) The output controlling unit of the above-described aspect (1) provides a screen on which information including the facility SER of each of the plurality of facilities arranged in the building is displayed in a form of a table.

(13) The output controlling unit of the above-described aspect provides a screen on which a division area to be an area obtained by dividing an inner space of the building is set by the user. The above-described model calculating unit calculates the attenuation index value in a unit of the position corresponded the division area. The above-described SER calculating unit calculates the facility SER in a unit of the position corresponded to the division area.

(14) The output controlling unit of the above-described aspect (1) provides a screen on which the state of the design including the building and facility are displayed and on which the state of the design can be manually changed by the user. The above-described SER calculating unit recalculates the facility SER while using the post-change design state by the user as input data. The above-described output controlling unit displays a screen including information of the post-change design state by the user and the facility SER by the recalculation.

(15) A SER calculating device of an embodiment has a building property calculating unit which calculates an index value representing a degree of attenuation of radiation entering a building attenuated by a structural object of the building until the radiation reaches a position in the building by using building data but not using facility data and which calculates an index value of reduction of a SER at each position in the building by using the index value, and an output controlling unit which outputs information including the above-described index value or the index value of reduction of the SER.

(16) The SER calculating device of the above-described aspect (1) has a design changing unit which performs processing of changing at least either one of the facilities arranged in the building or a structure of the building so as to satisfy a condition set for the SER by using the building data, the facility data, and the information of the SER. The above-described output controlling unit outputs information including a design change result of the building and facility by the design changing unit. The above-described design changing unit generates one or more design plan (s) based on the design change of the building and the facility which satisfy the conditions set for the SER, and writes the design plan including the SER information in a list. The above-described output controlling unit arranges and outputs the one or more design plans of the list in a recommended order by using the SER information, and provides a screen on which the design plan can be selected from the list by the user.

(17) The design changing unit of the above-described aspect (16) has a facility changing unit which performs processing of changing the arranged position of the facility in the building by using the building data, the facility data, and the facility SER so that the facility SER or the building SER is lower than that before the change. The above-described output controlling unit outputs information including a result of changing arrangement of the facility by the facility changing unit. When the arranged position of the facility in the building is changed, the above-described facility changing unit includes, as options for the change, to move the position in a down direction in a vertical direction of the building by a predetermined unit or move the position to a position closer to the center of the building in a horizontal direction of the building by a predetermined unit.

(18) The design changing unit of the above-described aspect (16) has a building changing unit which performs processing of changing a structural object configuring the building by using the building data, the facility data, and the facility SER so that the facility SER or the building SER is lower than that before the change. The above-described output controlling unit outputs information of the change result of the structural object of the building by the building changing unit. When the structural object of the building is changed, the above-described building changing unit includes to add a structural object to a position between the facility and outside of the building, to increase a thickness of the structural object at the position between the facility and outside of the building, or to change a material of the structural object, as options for the change.

(19) The output controlling unit of the above-described aspect (16) provides a screen on which a changeable range of design of the facility arranged in the building or the structural object of the building is set by the user. The above-described design changing unit changes the arrangement of the facility or the structural object in the changeable range.

REFERENCE SIGNS LIST

1 . . . SER CALCULATING DEVICE, 2 . . . DESIGN DEVICE, 3 . . . DESIGN DEVICE, 12 . . . BUILDING-DATA STORING UNIT, 13 . . . FACILITY-DATA STORING UNIT, 14 . . . NEUTRON DATA UNIT, 15 . . . SOFT-ERROR CROSS-SECTIONAL-AREA DATA UNIT, 16 . . . NEUTRON ATTENUATION CALCULATING UNIT, 17 . . . SOFT-ERROR CALCULATION CONTROLLING UNIT, 21 . . . SER CALCULATING UNIT, 21A . . . MODEL CALCULATING UNIT, 21B . . . FACILITY SER CALCULATING UNIT, 21C . . . BUILDING SER CALCULATING UNIT, 21a . . . RADIATION CALCULATING UNIT, 21b . . . BUILDING CALCULATING UNIT, 21c . . . FACILITY CALCULATING UNIT, 21d . . . ATTENUATION CALCULATING UNIT, 22 . . . SER JUDGING UNIT, 22A . . . FACILITY SER JUDGING UNIT, 22B . . . BUILDING SER JUDGING UNIT, 23 . . . DESIGN CHANGING UNIT, 24 . . . DESIGN CHANGING UNIT, 25 . . . BUILDING CHANGING UNIT, 30 . . . DB, 31 . . . SETTING INFORMATION, 32, D2 . . . BUILDING DATA, 33, D3 . . . FACILITY DATA, 34 . . . SER DATA, 35 . . . DESIGN DATA, 51 . . . INPUT/OUTPUT CONTROLLING UNIT, 51 . . . SETTING UNIT, 53 . . . DISPLAY UNIT, D4 . . . NEUTRON DATA, D5 . . . SOFT-ERROR CROSS-SECTIONAL-AREA DATA.

The invention claimed is:

1. A soft-error-rate calculating device comprising:
a building data storing unit that stores building data including information of a structural object of a building;
a facility data storing unit that stores facility data including information of a plurality of facilities including an electronic device arranged in the building;
a model calculating unit that calculates, by using the building data and the facility data, a model including an attenuation index value representing a degree of attenuation of radiation entering the building by the structural object of the building until the radiation reaches a position of the facility arranged in the building;
a soft-error-rate calculating unit that calculates a soft error rate at each position of the facility arranged in the building by using the model including the attenuation index value; and
an output controlling unit that outputs information including the soft error rate at each position of the facility to a user.

2. The soft-error-rate calculating device according to claim 1, comprising:
a soft-error-rate judging unit that compares the soft error rate at each position of the facility with a set threshold value and judges that the soft error rate is either good or not good,
wherein the output controlling unit outputs information including a result of the judgement for the soft error rate at each position of the facility.

3. The soft-error-rate calculating device according to claim 1, comprising:
a building soft-error-rate calculating unit that calculates a soft error rate in a unit of the entire building as a building soft error rate by using a soft error rate at each position of the facility; and
a building soft-error-rate judging unit that compares the building soft error rate with a set threshold value and judges that the building soft error rate is either good or not good,
wherein the output controlling unit outputs information including the building soft error rate and a result of the judgement for the building soft error rate.

4. The soft-error-rate calculating device according to claim 1,
wherein the soft-error-rate calculating unit calculates the soft error rate at each position of the facility based on the attenuation index value at each position of the facility in the building and soft-error cross-sectional-area data applied to the facility.

5. The soft-error-rate calculating device according to claim 4, comprising:
a soft-error cross-sectional-area data storing unit that stores the soft-error cross-sectional-area data uniquely applied to each of the facilities,
wherein the soft-error-rate calculating unit calculates the soft error rate at each position of the facility by using the soft-error cross-sectional-area data uniquely applied to each of the facilities.

6. The soft-error-rate calculating device according to claim 1 comprising:
a radiation spectrum data storing unit that stores radiation spectrum data of the radiation entering the building, wherein the soft-error-rate calculating unit calculates the attenuation index value based on a ratio between the radiation spectrum data before entrance to the structural object of the building and the radiation spectrum data after the entrance to the structural object of the building.

7. The soft-error-rate calculating device according to claim 1,
wherein the soft-error-rate calculating unit calculates the soft error rate at each position of the facility by computation of a basic soft error rate which is property of the facility and the attenuation index value.

8. The soft-error-rate calculating device according to claim 1,
wherein the output controlling unit performs processing of generating and displaying a screen on which information including the building, the facility, and the soft error rate is outputted in a specific form among a plurality of forms including a three-dimensional display form and a two-dimensional display form.

9. The soft-error-rate calculating device according to claim 1, comprising:
a design changing unit that performs processing of changing at least either one of the facility arranged in the building or a structure of the building by using the building data, the facility data, and the soft error rate at each position of the facility so that the soft error rate at the position of the facility is lower than that before change,
wherein the output controlling unit outputs information including a result of change of design of the building and the facility by the design changing unit.

10. The soft-error-rate calculating device according to claim 9, comprising:
a design data storing unit that stores design data including pre/post-change data of the design of the building and the facility by the design changing unit, the data including the soft error rate at each position of the facility, or including change difference data including information of change of the soft error rates before and after the change,
wherein the output controlling unit generates and displays a screen including contents of the design data.

11. The soft-error-rate calculating device according to claim 9,
wherein the design changing unit generates one or more design plans based on the change of the design and writes information of the design plan in a list, and
the output controlling unit generates and displays a screen including the list and the design plan.

12. The soft-error-rate calculating device according to claim 9,
wherein the design changing unit has a facility changing unit that performs processing of changing an arranged position of the facility in the building by using the building data, the facility data, and the soft error rate at each position of the facility so that the soft error rate at each position of the facility is lower than that before change, and
the output controlling unit outputs information including a result of change of the arrangement of the facility by the facility changing unit.

13. The soft-error-rate calculating device according to claim 12, comprising:
a soft-error-rate judging unit that compares the soft error rate at each position of the facility with a set threshold value and judges that the soft error rate is either good or not good,
wherein, for the position of the facility having a result of the judgement for the soft error rate at each position of the facility as being not good, the facility changing unit changes the arranged position of the facility so that the result of the judgement is as being good.

14. The soft-error-rate calculating device according to claim 9,
wherein the design changing unit has a building changing unit that performs processing of changing a structural object which affects a position of the facility and which configures the building by using the building data, the facility data, and the soft error rate at each position of the facility so that the soft error rate at each position of the facility is lower than that before change, and
the output controlling unit outputs information of a result of change of the structural object of the building by the building changing unit.

15. The soft-error-rate calculating device according to claim 14, comprising:
a soft-error-rate judging unit that compares the soft error rate at each position of the facility with a set threshold value and judges that the soft error rate is either good or not good,
wherein, for the position of the facility having a result of the judgement for the soft error rate at each position of the facility as being not good, the building changing unit changes at least one of a size, a quantity, or a material of the structural object which affects the position of the facility so that the result of the judgement is as being good.

* * * * *